United States Patent
Van Brandenburg et al.

(10) Patent No.: US 10,715,843 B2
(45) Date of Patent: Jul. 14, 2020

(54) FORMING ONE OR MORE TILE STREAMS ON THE BASIS OF ONE OR MORE VIDEO STREAMS

(71) Applicant: Koninklijke KPN N.V., Rotterdam (NL)

(72) Inventors: Ray Van Brandenburg, The Hague (NL); Emmanuel Thomas, Delft (NL); Mattijs Oskar Van Deventer, Leidschendam (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 15/752,559

(22) PCT Filed: Aug. 19, 2016

(86) PCT No.: PCT/EP2016/069732
§ 371 (c)(1),
(2) Date: Feb. 13, 2018

(87) PCT Pub. No.: WO2017/029400
PCT Pub. Date: Feb. 23, 2017

(65) Prior Publication Data
US 2019/0208234 A1    Jul. 4, 2019

(30) Foreign Application Priority Data
Aug. 20, 2015    (EP) .................... 15181669

(51) Int. Cl.
*H04N 7/173*    (2011.01)
*H04N 21/235*    (2011.01)
(Continued)

(52) U.S. Cl.
CPC ....... *H04N 21/2353* (2013.01); *H04N 21/231* (2013.01); *H04N 21/23439* (2013.01);
(Continued)

(58) Field of Classification Search
CPC ............ H04N 21/2353; H04N 21/231; H04N 21/23439; H04N 21/437; H04N 21/8455; H04N 21/8586; H04N 21/26258
(Continued)

(56) References Cited

U.S. PATENT DOCUMENTS

| 7,894,531 B1 | 2/2011 | Cetin et al. |
| 9,699,465 B2 * | 7/2017 | Ouedraogo .......... H04N 19/159 |

(Continued)

FOREIGN PATENT DOCUMENTS

| EP | 1672925 A1 | 6/2006 |
| EP | 2775701 A1 | 9/2014 |

(Continued)

OTHER PUBLICATIONS

Lee, et al., "Scalable roi Algorithm for H.264/SVC-based Video Streaming," Consumer Electronics, IEEE Transactions 57(2): 882-887 (2011).

(Continued)

*Primary Examiner* — Pankaj Kumar
*Assistant Examiner* — Sahar Aqil Riaz
(74) *Attorney, Agent, or Firm* — Hamilton, Brook, Smith & Reynolds, P.C.

(57) ABSTRACT

Methods and systems are described for forming one or more tile streams comprising: providing media data of at least one composite video stream to the input of at least one encoder, the media data of said composite video stream representing video frames comprising an image region having one or more subregions, each of said one or more subregions comprising visual content of one of said one or more video streams; providing encoder information to said encoder for configuring said encoder to generate encoded media data representing tiled video frames, a tile in said tiled video frames matching at least one of said one or more subregions;
(Continued)

encoding media data of said composite video stream, wherein media data associated with a subregion of a video frame are encoded into independently encoded media data that have no spatial decoding dependency on media data of other subregions in said video frame, said independently encoded media data forming a tile of a tiled video frame, preferably said tile being arranged in said image region on the basis of a tile grid; and, storing said encoded media data as one or more tile streams on a storage medium, preferably on a storage medium of one or more network nodes, a tile stream comprising media data of at least one tile and tile position information for signaling a decoder to decode the media data of said tile stream into tiled video frames comprising a tile at a position as indicated by the tile position information.

18 Claims, 22 Drawing Sheets

(51) Int. Cl.
| | |
|---|---|
| *H04N 21/2343* | (2011.01) |
| *H04N 21/262* | (2011.01) |
| *H04N 21/845* | (2011.01) |
| *H04N 21/854* | (2011.01) |
| *H04N 21/231* | (2011.01) |
| *H04N 21/437* | (2011.01) |
| *H04N 21/858* | (2011.01) |

(52) U.S. Cl.
CPC .............. *H04N 21/234345* (2013.01); *H04N 21/26258* (2013.01); *H04N 21/437* (2013.01); *H04N 21/8455* (2013.01); *H04N 21/8456* (2013.01); *H04N 21/8586* (2013.01); *H04N 21/85406* (2013.01)

(58) Field of Classification Search
USPC .......................................................... 725/115
See application file for complete search history.

(56) References Cited

U.S. PATENT DOCUMENTS

| | | | | |
|---|---|---|---|---|
| 9,749,627 | B2 * | 8/2017 | Wu | H04N 19/105 |
| 9,794,649 | B2 * | 10/2017 | Denoual | H04N 21/23439 |
| 9,860,572 | B2 | 1/2018 | van Deventer et al. | |
| 9,883,011 | B2 | 1/2018 | Denoual et al. | |
| 9,906,807 | B2 * | 2/2018 | Denoual | H04N 19/46 |
| 10,182,241 | B2 * | 1/2019 | Li | H04N 19/176 |
| 10,200,721 | B2 * | 2/2019 | Denoual | H04N 21/4728 |
| 10,212,491 | B2 * | 2/2019 | Denoual | H04N 19/70 |
| 10,257,247 | B2 * | 4/2019 | Denoual | H04N 19/70 |
| 10,397,666 | B2 * | 8/2019 | Thomas | H04N 21/4728 |
| 10,542,258 | B2 * | 1/2020 | Wang | H04N 19/167 |
| 10,542,274 | B2 * | 1/2020 | Li | H04N 19/176 |
| 10,547,914 | B2 * | 1/2020 | Denoual | H04N 21/4728 |
| 2006/0120610 | A1 | 6/2006 | Kong et al. | |
| 2006/0262345 | A1 | 11/2006 | Le Leannec et al. | |
| 2009/0300692 | A1 | 12/2009 | Mavlankar et al. | |
| 2010/0135575 | A1 | 6/2010 | Guo | |
| 2010/0232504 | A1 | 9/2010 | Feng | |
| 2011/0096990 | A1 | 4/2011 | Lu | |
| 2013/0235270 | A1 | 9/2013 | Sasaki et al. | |
| 2014/0079126 | A1 | 3/2014 | Ye et al. | |
| 2014/0089990 | A1 | 3/2014 | van Deventer et al. | |
| 2014/0341549 | A1 | 11/2014 | Hattori | |
| 2015/0032901 | A1 * | 1/2015 | Wang | H04L 65/4092 709/231 |
| 2015/0095450 | A1 | 4/2015 | Vitthaladevun | |
| 2015/0208103 | A1 | 7/2015 | Guntur et al. | |
| 2015/0237166 | A1 | 8/2015 | Denoual et al. | |
| 2015/0264404 | A1 | 9/2015 | Hannuksela | |
| 2016/0165309 | A1 | 6/2016 | Thomas et al. | |
| 2016/0182927 | A1 * | 6/2016 | Denoual | H04N 21/234345 725/109 |
| 2017/0013279 | A1 * | 1/2017 | Puri | H04N 19/176 |
| 2017/0118540 | A1 | 4/2017 | Thomas et al. | |
| 2017/0155912 | A1 | 6/2017 | Thomas et al. | |
| 2017/0180444 | A1 | 6/2017 | Denoual et al. | |
| 2017/0223083 | A1 * | 8/2017 | Maze | H04N 21/234327 |
| 2018/0242028 | A1 | 8/2018 | Van Brandenburg et al. | |
| 2018/0295400 | A1 | 10/2018 | Thomas | |

FOREIGN PATENT DOCUMENTS

| | | | |
|---|---|---|---|
| EP | 2 814 243 | 12/2014 | |
| GB | 2505912 | 3/2014 | |
| GB | 2 513 139 | 10/2014 | |
| GB | 2513139 A * | 10/2014 | ......... H04N 21/2335 |
| GB | 2524531 | 9/2015 | |
| JP | 2005142654 | 6/2005 | |
| JP | 2012049806 | 3/2012 | |
| WO | WO 2001/95513 | 12/2001 | |
| WO | WO 2008/088772 | 7/2008 | |
| WO | WO 2009/003885 | 1/2009 | |
| WO | WO 2012/168356 | 12/2012 | |
| WO | WO 2012/168365 | 12/2012 | |
| WO | WO 2013/063094 | 5/2013 | |
| WO | WO 2014/057131 | 4/2014 | |
| WO | WO 2014/0106651 | 7/2014 | |
| WO | WO 2014/111423 | 7/2014 | |
| WO | WO 2014/168972 | 10/2014 | |
| WO | WO 2015/004276 A2 | 1/2015 | |
| WO | WO 2015/008774 A1 | 1/2015 | |
| WO | WO 2015/011109 | 1/2015 | |
| WO | WO 2015/014773 | 2/2015 | |
| WO | WO 2015/059194 | 4/2015 | |
| WO | WO 2015/104451 | 7/2015 | |
| WO | WO 2015/197815 | 12/2015 | |
| WO | WO 2015/197818 | 12/2015 | |
| WO | WO 2017/029400 | 2/2017 | |
| WO | WO 2017/029402 | 2/2017 | |
| WO | WO 2017/060423 | 4/2017 | |

OTHER PUBLICATIONS

Le Feuvre, J., et al., "Support for Efficient Tile Access in the HEVC File Format," Telecom Paris Tech, Canon Research Centre France (2013).

Hannuksela, M.M., et al., "Isolated Regions in Video Coding," IEEE Transactions on Multimedia, 6(2): 259-267 (Apr. 1, 2004).

Mavlankar, A., et al., "An Interactive Region-of-Interest Video Streaming System for Online Lecture Viewing," Information Systems Laboratory, Department of Electrical Engineering, Stanford University, Proc. of 18th International Packet Video Workshop, pp. 64-71, Dec. 2010.

Ye, Y., et al., "ROI Tile Sections," MPEG Meeting, Shanghai, pp. 1-7 (2012).

Wang, Y-K., et al., "Tile Groups," Joint Collaborative Team on Vide Coding (JCT-VC) of ITU-T SG16 WP3 and ISO/IEC JTC1/SC29/WG11, 7th Meeting: Geneva, CH, pp. 1-9 (Nov. 21-30, 2011).

Sanchez, et al., "Low Complexity Cloud-video-mising using HEVC," 11th annual IEEE CCNC—Multimedia networking, services and applications, 214-218 (2014).

Hirabayashi, M., et al., "Consideration on HEVC Tile Tracks in MPD for DASH SRD," ISO Contribution ISO/IEC JTC1/SC29/WG11 MPEG2014 (2014).

Concolato, C., et al., "Usage of DASH SRD for HEVC Tiling," ISO Contribution ISO/IEC JTC1/SC29/WG11 MPEG2014 (2014).

Tokumo, Y, et al., "Dash: Signaling Tile Encapsulation Modes," ISO Contribution ISO/IEC JTC1/SC29/WG11 MPEG2014 (2014).

Notification of Transmittal of the International Searching Report and the Written Opinion of the International Searching Authority, or the Declaration, from International Application No. PCT/EP2016/069732; dated Oct. 12, 2016; Entitled: "Forming One or More Tile Streams on the Basis of One or More Video Streams".

(56) References Cited

OTHER PUBLICATIONS

European Search Report for EP Application No. 15181669.1, dated Nov. 3, 2015.
Giladi, A. et al, "Descriptions of Core Experiments on DASH Amendment," Systems subgroup/DASH, International Organisation for Stardardisation Organisation Internationale de Normalisation ISO/IEC JTC1/SC291WG11 Coding of Moving Pictures and Audio, ISO/IEC JTC1/SC29/WG11 MPEG2013/N13977, Geneva, Switzerland, 24 pages (Nov. 2013).
Hirabayashi, M. et al, "Improvement on HEVC Tile Track for WD of 14496-15 AMD1," SONY Corporation Proposal, International Organisation for Stardardisation Organisation Internationale de Normalisation ISO/IEC JTC1/SC29/WG11 Coding of Moving Pictures and Audio, ISO/TEC JTC1/SC29/WG11 MPEG2014/M33083, Valencia, Spain, 4 pages (Mar. 2014).
U.S. Office Action in U.S. Appl. No. 15/752,564, entitled "Forming a Tiled Video on the Basis of Media Streams." dated May 30, 2019.

\* cited by examiner

```xml
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
[...]>
  <Period>
  <!--Mosaic -->
  <AdaptationSet [...]>                                                                                    — 740₁
    <EssentialProperty schemeIdUri="urn:mpeg:dash:srd:2014" value="1, 0, 0, 0, 0, 0, 0, 1"/>               — 742₁
    <Representation width=0 height=0 id="mosaic-base" bandwidth="5000000">
      <BaseURL>mosaic-base.mp4</BaseURL>                                                                   — 744₁
    </Representation>                                                                                      — 746₁
  </AdaptationSet>
  <AdaptationSet [...]>                                                                                    — 740₂
    <SupplementalProperty schemeIdUri="urn:mpeg:dash:srd:2014" value="1, 0, 0, 960, 540, 1920, 1080, 1"/>  — 742₂
    <Representation id=" mosaic-tile1" bandwidth="512000" depedencyId="mosaic-base">
      <BaseURL> mosaic-videoA.mp4</BaseURL>                                                                — 744₂
      <SegmentBase indexRange="7632" />
    </Representation>                                                                                      — 746₂
  </AdaptationSet>
  <AdaptationSet [...]>                                                                                    — 740₃
    <SupplementalProperty schemeIdUri="urn:mpeg:dash:srd:2014" value="1, 960, 0, 960, 540, 1920, 1080, 1"/> — 742₃
    <Representation id=" mosaic-tile2" bandwidth="512000" depedencyId="mosaic-base">
      <BaseURL> mosaic-videoB.mp4</BaseURL>                                                                — 744₃
      <SegmentBase indexRange="7632" />
    </Representation>                                                                                      — 746₃
  </AdaptationSet>
  <AdaptationSet [...]>                                                                                    — 740₄
    <SupplementalProperty schemeIdUri="urn:mpeg:dash:srd:2014" value="1, 0, 540, 960, 540, 1920, 1080, 1"/> — 742₄
    <Representation id="mosaic-tile3" bandwidth="512000" depedencyId="mosaic-base">
      <BaseURL>mosaic-videoC.mp4</BaseURL>                                                                 — 744₄
      <SegmentBase indexRange="7632" />
    </Representation>                                                                                      — 746₄
  </AdaptationSet>
  <AdaptationSet [...]>                                                                                    — 740₅
    <SupplementalProperty schemeIdUri="urn:mpeg:dash:srd:2014" value="1, 960, 540, 960, 540, 1920, 1080, 1"/> — 742₅
    <Representation id="mosaic-tile4" bandwidth="512000" depedencyId="mosaic-base">
      <BaseURL>mosaic-videoD.mp4</BaseURL>                                                                 — 744₅
      <SegmentBase indexRange="7632" />
    </Representation>                                                                                      — 746₅
  </AdaptationSet>
  </Period>
</MPD>
```

FIG. 7C

FORMING ONE OR MORE TILE STREAMS ON THE BASIS OF ONE OR MORE VIDEO STREAMS

This application is the U.S. National Stage of International Application No. PCT/EP2016/069732, filed Aug. 19, 2016, which designates the U.S., published in English, and claims priority under 35 U.S.C. §§ 119 or 365(c) to Europe Application No. 15181669.1, filed Aug. 20, 2015. The entire teachings of the above applications are incorporated herein by reference.

FIELD OF THE INVENTION

The invention relates to forming one or more tile streams on the basis of one or more video streams, and, in particular, though not exclusively, to methods and systems for forming one or more tile streams on the basis of one or more video streams, a decoder enabling the generation of tile streams, a manifest file generator for forming manifest file defining tile streams, manifest file data structures for enabling a client computer to request and combine tile streams and a computer program product using such methods.

BACKGROUND OF THE INVENTION

A tiled video such as a video mosaic is an example of the combined presentation of multiple video streams of visually unrelated or related video content on one or more display devices. Examples of such video mosaics include TV channel mosaics comprising multiple TV channels in a single mosaic view for fast channel selection and security camera mosaics comprising multiple security video feeds in a single mosaic for a compact overview. Often personalization of a video mosaics is desired when different persons require different video mosaics, e.g.: a personalized TV channel mosaic wherein each user may have his own preferred set of TV channels, a personalized interactive electronic program guide (EPG) wherein each user is able to compose a video mosaic associated with TV programs indicated by the EPG or a personalized security camera mosaic wherein each security officer may have his own set of security feeds. The personalization may vary over time as user TV channel preferences may change, or as TV channels viewing rates fluctuate, in case when the video mosaic shows the currently most watched TV channels, and other security video feeds may become relevant for the security officer when he changes location. Additionally and/or alternatively, video mosaics may be interactive, i.e. configured to be responsive to user inputs. For example, the TV may switch to a particular channel when the user selects a specific tile from a TV channel mosaic.

WO2008/088772 describes a conventional process for generating a video mosaic. This process includes selecting different video's and a server application processing the selected video's such that a video stream representing the video mosaic can be transmitted to a client device. The video processing may include decoding the video's, spatially combining and stitching video frames of the selected video's in the decoded domain and re-encoding the video frames into a single video stream. This process requires a lot of recourses in terms of decoding/encoding and caching. Further, the double encoding process, firstly at the video source and secondly at the server, results in quality degradation of the original source videos.

The article by Sanchez et al, "Low Complexity cloud-video-mixing using HEVC", $11^{th}$ annual IEEE CCNC—Multimedia networking, services and applications 2014, pp. 214-218, describes a system for creating a video mosaic for video conferencing and surveillance applications. The article describes a video-mixer solution that is based on the standard-compliant HEVC video compression standard. Different HEVC video streams associated with different video content are combined in the network by rewriting metadata associated with NAL units in these video streams. A server thus rewrites incoming NAL units comprising encoded video content of a video streams and combines/interlaces those into an outgoing stream of NAL units representing a tiled HEVC video stream wherein each HEVC tile represents a subregion of the image region of a video mosaic. The output of the video mixer can be decoded by a standard-conformant HEVC decoder module by putting special constraints on the encoder module. Hence, Sanchez describes a solution for combining the video content in the encoded domain so that the need for resource intensive processes including decoding, stitching in the decoded domain and re-encoding is eliminated or at least substantially reduced.

A problem with the solution proposed by Sanchez is that the created video mosaic requires dedicated processes on the server so the required server processing capacity only scales linearly, i.e. poorly, with the number of users. This is a major scalability issue when offering such services at a large scale. Further, the client-server signaling protocol introduces a delay as it takes time to send a request for a specific mosaic and then—in response to the request—compose that video mosaic and transmit the video mosaic to the client. Additionally, the server forms both a single point of failure for all streams delivered by that server as well as a single point of control, which poses a risk in terms of privacy and security. Finally, the system proposed by Sanchez et al does not allow third party content providers. All the content offered to the clients need to be known by a central server responsible for combining the video's.

Transferring the video mixer functions of Sanchez to the client-side may partly solve the above-mentioned problems. However, this would require the client to parse the HEVC encoded bitstream, to detect the relevant parameters and headers, and to rewrite the headers of the NAL units. Such capabilities require data storage and processing power that go beyond a commercial off-the-shelf standard-conformant HEVC decoder module.

Further, current HEVC technology does not offer functionality that is needed for selecting different HEVC tile streams associated with different tile positions and different content sources. For example, in the ISO contribution ISO/IEC JTC1/SC29/WG11 MPEG2014/M33210 of March 2014, scenarios are described how spatially related HEVC tiles can be signaled to an DASH client and how such HEVC tile can be downloaded without the need to download all other tiles. This document describes a scenario wherein one video source is encoded in HEVC tiles that are stored as HEVC tile tracks in a single file (a single ISOBMFF data container produced by one encoding process) stored on a server. A manifest file (referred to in DASH as a media presentation description or MPD) describing the HEVC tiles in the data container can be used for selecting and playout one of the stored HEVC tile tracks. Similarly, WO2014/057131 describes a process for selecting a subset of HEVC tiles (a region of interest) from a set of HEVC tiles originating from one single video (i.e. HEVC tiles that are formed by encoding a single video source) on the basis of an MPD.

MITSUHIRO HIRABAYASHI ET AL: "Considerations on HEVC Tile Tracks in MPD for DASH SRD", 108. MPEG MEETING; 31Mar. 2014-4Apr. 2014; VALENCIA; MOTION PICTURE EXPERT GROUP OR ISO/IEC JTC1/SC29/WG11, m33085, 29 Mar. 2014 describes manners for annotating HEVC Tile Tracks of a HEVC Stream with DASH SRD descriptors. Two use case are described. One use case assumes all HEVC Tile Tracks and associated HEVC Base Tracks to be included in a single MP4 file. In this case it is suggested to map all HEVC Tile Tracks and the HEVC Base Track to subrepresentations. The other use case assumes each of the HEVC Tile Tracks and the HEVC Base Track to be included in separate MP4 files. In this case it is suggested to map all HEVC Tile Tracks MP4 files and the HEVC Base Track MP4 files onto Representations within an AdaptationSet.

It should be noted that according to section 2.3 and 2.3.1 all HEVC Tile Tracks describing tile video's relate to the same HEVC Stream, which implies they are the result of a single HEVC encoding process. This further implies all these HEVC Tile Tracks relate to the same input (video) stream entering the HEVC encoder.

GB 2 513 139 A (CANON KK [JP]), 22 Oct. 2014 discloses a method for streaming video data using the DASH standard, each frame of the video being divided into n spatial tiles, n being an integer, in order to create n independent video sub-tracks. The method comprises: transmitting, by a server, a (MPD) media presentation description file to a client device, said description file including data about the spatial organization of the n video sub-tracks and at least n URLs respectively designating each video sub-track, selecting by the client device one or more URLs according to one Region Of Interest chosen by the client device or a client device's user, receiving from the client device, by the server, one or more request messages for requesting a resulting number of video sub-tracks, each request message comprising one of the URLs selected by the client device, and transmitting to the client device, by the server, video data corresponding to the requested video sub-tracks, in response to the request messages.

WO 2015/011109 A1 (CANON KK [JP]); CANON EUROP LTD (GB), 29 Jan. 2015 discloses encapsulating partitioned timed media data in a server, the partitioned timed media data comprising timed samples, each timed sample comprising a plurality of subsamples. After having selected at least one subsample from amongst the plurality of subsamples of one of the timed samples, one partition track comprising the selected subsample and one corresponding subsample of each of the other timed samples is created for each selected subsample. Next, at least one dependency box is created, each dependency box being related to a partition track and comprising at least one reference to one or more of the other created partition tracks, the at least one reference representing a decoding order dependency in relation to the one or more of the other partition tracks. Each of the partition tracks is independently encapsulated in at least one media file.

The above described processes and MPDs however do not allow a client device to flexibly and efficiently "compose" video mosaics on the basis of a large number of tile tracks associated with different tile positions and originating from different source video files (e.g. different ISOBMFF data containers produced by different encoding processes) that may be stored in different locations in the network.

Hence, there is a need in the art for improved methods, devices, systems and data structures that enable efficient selection and composition of a video mosaic on the basis of tile streams that are associated with different tile positions and that originate from different content sources. In particular, there is a need in the art for methods and systems that enable efficient and scalable solutions for composition of a video mosaic that can be delivered via a scalable transport scheme, e.g. multicast and/or CDNs, to a large number of client devices.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In particular, one of the aims of the invention is to generate tile streams, i.e. media streams comprising media data that can be decoded by a decoder into video frames comprising tiles at predetermined positions in said video frames. Selecting and combining different tile streams with tiles at different positions allows the formation of a video mosaic that can be rendered on one or more displays.

In an aspect, the invention relates to a method of forming one or more tile streams on the basis of one or more media streams comprising the steps of: providing media data of at least one composite video stream to the input of at least one encoder, the media data of said composite video stream representing video frames comprising an image region having one or more subregions, the subregions preferably arranged according to a grid of subregions, each of said one or more subregions comprising visual content of one of said one or more video streams; providing encoder information to said encoder for configuring said encoder to generate encoded media data representing tiled video frames, a tile in said tiled video frames matching at least one of said one or more subregions; and, encoding media data of said composite video stream, wherein media data associated with a subregion of a video frame are encoded into independently encoded media data that have no spatial decoding dependency on media data of other subregions in said video frame, said independently encoded media data forming a tile of a tiled video frame, preferably said tile being arranged in an image region of said tiled video frame on the basis of a tile grid, the tile grid preferably matching the grid of subregions ('the subregion grid').

Thus the media data of a composite video stream are all subjected to a single encoding process, whereby the output of the encoding process is one or more different collections (sets) of encoded media data, whereby each collection (set) comprises independently encoded media data associated with one or more subregions. The collections each comprise different subregions. The encoder information thus contains information, about the subregions, in particular about how the subregions are positioned in the image region. The subregions may be organized according to a grid, also called the grid of subregions. The encoder information may comprise information about the grid of subregions (subregions grid). Based on the encoder information the encoder can be configured such that the output of the encoding process results in (collections of) independently encoded media data which each represent tile video frames, whereby a tile (e.g. the image region of such tile video frame) corresponds (e.g. matches) to preferably one, but possible more subregions of videoframes of the composite videostream, and whereby for each collection of independently encoded media data the tile corresponds to a different one or more subregions.

The output of a single encoding process may thus provide for a tiled stream having tiled video frames comprising tiles, whereby each tile comprises (encoded visual content of) different subregions of the image region of the composite video stream. In a preferred embodiment, the tiles are encoded according to a tile grid that preferably matches the grid of subregions.

A tiled video frame has an image region that is preferably the same as the image region of a video frame of the composite video stream.

In an embodiment one or more subregions contain visual content that is similar to the visual content of another subregion. That is at least two subregions contain similar (e.g. identical or the same) visual content. In a preferred embodiment all subregions contain similar visual content.

In one embodiment the composite video stream is generated on the basis of said one or more video streams. In a further embodiment said generating comprises multiplicating visual content from at least one of said videostreams, whereby said multiplicating causes said visual content to be comprised in a plurality of said subregions.

The manner in which a composite videostream may be generated using multiplication of visual content has the advantage, in particular when the encoder is a HEVC encoder, that following a single encoding process, a multitude of, preferably HEVC compliant, independently encoded, preferably HEVC based, tile streams may be generated, whereby each (HEVC) tile stream contains similar visual content, but also contains metadata (which is automatically generated by the (HEVC) encoder) determining the position of the visual content (the tile) in an output frame of a corresponding decoder.

As the position of the tile in the output frame of a decoder correlates with the position/location of the associated one or more subregions in the image region (as the encoding process makes use of encoder information that defines positions of subregions such that one or more subregions can be independently encoded) of the media data of the composite video stream at the input of the encoder, each (HEVC) tile stream (each comprising a different collection of independently encoded media data from the single encoding process) also comprises metadata defining a different position of the visual content in the output frame (as these metadata are automatically generated during the encoding process). This for example enables, by providing different (HEVC) tile streams to a decoder, to generate (decoded) output frames whereby the position of the visual content in an output frame may differ, in dependency of which tile stream is provided, If the method, as indicated above, is repeated in an identical fashion (e.g. on the basis of the same encoder information) but for different video streams having different visual content (e.g. which leads to a composite video stream with different visual content, but the same positioning of subregions, at the input of an encoder), it can be seen that a rendering device could render mosaic type of content composed on the basis of a plurality of tile streams (preferably HEVC tile streams), each of these tile streams having different visual content, which different visual content ends up at a different positions in the rendered images, thus creating the mosaic view.

The special advantage with using HEVC based tile streams that all result from the same or a plurality of similar HEVC encoding processes (e.g. based on the same encoding information as explained above and throughout the application) is that these streams may all be provided to the same HEVC decoder instance, and post decoding processing is much less as compared to when tile streams are fed to different decoding instances. In an embodiment the method may further comprise: storing said encoded media data, preferably provided by the output of the encoder, as one or more tile streams on a storage medium, preferably on a storage medium of one or more network nodes, a tile stream comprising media data of at least one tile and tile position information, preferably at least part of said tile position information provided by an output of said encoder, and preferably said at least part generated during said encoding of said media data, for signaling a decoder to decode the media data of said tile stream into tiled video frames comprising a tile at a position as indicated by the tile position information. In an embodiment, media data of said one or more tile streams may be stored as one or more tile tracks and at least one base track, said at least one base stack comprising metadata for enabling said decoder to decode media data stored in said tile tracks. In an embodiment, the tile tracks and at least one base track may have a data structure format based on the ISO/IEC 14496-12 ISO Base Media File Format (ISOBMFF) or the ISO/IEC 14496-15 Carriage of NAL unit structured video in the ISO Base Media File Format.

The invention allows the formation and rendering of a tiled video composition (e.g. a video mosaic) on the basis of tile streams originating from different content sources, e.g. different video generated by different encoders, or by the same decoder, but using the same encoding information (e.g. the same encoding parameters/restrictions). A tile stream may be defined as a media stream comprising (encoded) media data and preferably tile position information arranged for signaling a decoder a tile position, is the decoder preferably communicatively connected to said client computer, and that is arranged, to decode media data of at least one tile stream into a decoded video stream comprising tiled video frames wherein a tiled video frame may comprise at least one tile at said tile position, wherein a tile may represent at least one subregion of visual content in the image region of the tiled video frames of said decoded video stream.

Tile streams may have a media format wherein tile position information associated with the tile stream signals the decoder to generate tiled video frames comprising a tile at a certain position (a tile position) within the image region of the tiled video frame of the decoded video stream. Tile streams and associated base streams may be stored at different network nodes and are particular advantageous in the process of combining different video streams associated with different or related content into a video mosaic by selecting for each tile position a tile stream from a plurality of tile streams. Distributed storage of tile streams may be of particular advantages when distributing media data in the tile streams via an optimized data delivery system, such as a content delivery network (CDN), wherein "popular" tile streams, e.g. tile streams that are frequently requested, may be stored at different network nodes in the network.

In an embodiment, media data associated with one tile in a video frame of a tile stream may be contained in an addressable data structure that is defined at bitstream level, preferably said addressable data structure being a NAL unit. In one embodiment, encoded media data associated with one tile in a tiled video frame may be structured into network abstraction layer (NAL) units as known from the H.264/AVC and HEVC video coding standards or associated coding standards. In case of a HEVC encoder, this may be achieved by requiring that one HEVC tile comprises one HEVC slice wherein a HEVC slice defines an integer number of coding tree units contained in one independent slice segment and all subsequent dependent slice segments (if any) that precede the next independent slice segment (if any) within the same access unit as defined by HEVC specification. This requirement may be sent in the encoder information to the encoder module. A HEVC tile preferably comprises one, but optionally more than one subregion. Preferably the encoder information provides for instructions that cause the encoder to generate HEVC tiles which each match (e.g. correspond to) one or more different subregions.

In an embodiment, wherein the composite video stream is a MPEG stream that is encoded using an H.264/MPEG-4 based codec, the encoder information is comprised as a SEI message in the bitstream of the composite video stream.

Requiring that media data of one tile of a video frame is contained in a NAL unit, allows easy combination of media data of different tile streams. Hence, media data that form a tile in the video frames of the tile stream may be contained in an addressable data structure, such as NAL units, that can be simply processed by a media engine that is implemented in a media device. Manipulation of the tiles, e.g. combining tiles of different tile streams into a video mosaic, can be realized by simple manipulation of the media data of the tile streams, in particular manipulation of the NAL units of the tile streams, without the need to rewrite information in the NAL units as required in the Sanchez prior art. This way media data of tiles in the video frames of different tile streams may be easily manipulated and combined without the need to change the media data. Further, manipulation of tiles that is e.g. needed in the formation of a personalized or customized video mosaic can be implemented at the client side and the processing and rendering of the video mosaic may be realized on the basis of a single decoder.

The media data of a tile stream is independently encoded. The encoding may be based on a codec supporting tiled video frames such as HEVC, VP9, AVC or a codec derived from or based on one of these codecs. In order to generate independent decodable tile streams on the basis of one or more tiled media streams, the encoder should be configured such that media data of a tile in subsequent video frames of a tiled media stream are independently encoded. Independently encoded tiles may be achieved by disabling the inter-prediction functionality of the encoder. Alternatively, independently encoded tiles may be achieved by enabling the inter-prediction functionality (e.g. for reasons of compression efficiency), however in that case the encoder should be arranged such that:

in-loop filtering across tile boundaries is disabled.
no temporal inter-tile dependency;
no dependency between two tiles in two different frames (in order enable extraction of tiles at one position in multiple consecutive frames).

Hence, in that case the motion vectors for inter-prediction need to be constrained within the tile boundaries over multiple consecutive video frames of the media stream.

In an embodiment said tile position information may further signal said decoder that a tile is part of a set of non-overlapping tiles spatially arranged on the basis of a tile grid. Hence, the tile position information is arranged such that tiles are positioned according to a grid-like pattern within the image region of decoded video streams (e.g. the video mosaics). This way, (tiled) video frames comprising a non-overlapping composition of tiles can be formed using media data of different tile streams.

In an embodiment, the method may further comprise: providing at least one manifest file comprising one or more sets of tile stream identifiers or information for determining one or more sets of tile stream identifiers, preferably one or more sets of URLs. A set of tile stream identifiers may be associated with tile streams of a video content and with multiple tile positions. Further, in an embodiment, the manifest file may comprise at least one base stream identifier or information for determining at least one base stream identifier. The manifest file enables a client computer, that may be communicatively connected to said decoder, to request at least one of said one or more network nodes transmission of media data of one or more tile streams and, optionally, metadata of a base stream, to said client computer.

In an embodiment, a set of tile stream identifiers may be associated with a predetermined video content and each tile stream identifier of said set of tile streams identifiers may be associated with different tile positions. For example, both videos A and B may be available as a set (e.g. collection) of tile streams wherein the tile streams may be available for different tile positions so that a client device may select a tile stream for a certain tile position from a set of different tiles streams associated with different content. This way, different tile streams associated with different tile positions and different video content may be selected on the basis of such manifest file, which may be referred to as a multiple-choice (MC) manifest file. The MC manifest file may allow flexible and efficient formation of a tiled video composition such as a video mosaic, which may be rendered.

In an embodiment, said manifest file may comprise one or more adaptation sets, an adaptation set defining a set of representations, a representation comprising a tile stream identifier. Hence, an adaptation set may comprise representations of a video content in the form of a set of tile streams associated with different tile positions.

In an embodiment, a tile stream identifier in an adaptation set may be associated with a Spatial Relationship Description (SRD) descriptor, wherein said SRD descriptor signals said client computer (e.g. also referred to in this application as client device or media device) information on the tile position of a tile, whereby the tile is the image region of (encompassed by) video frames of a tile stream associated with said tile stream identifier. The tile position can be used to position the decoded media data (e.g. the visual content) in a video frame that can be rendered.

In an embodiment, all tile stream identifiers in an adaptation set are associated with one spatial relationship description (SRD) descriptor, said spatial relationship description (SRD) descriptor signaling said client computer about the tile positions of the tiles in video frames of the tile streams identified in said adaptation set. Hence, in this embodiment, only one SRD descriptor is required for signaling a client multiple tile positions. For example, four SRD may be described on the basis of a SRD descriptor that has a syntax:

<EssentialProperty schemeIdUri="urn:mpeg:dash:srd:2014" value="1, 0 960, 0 540, 960, 540, 1920, 1080, 1"/> wherein the SRD parameters indicating the x and y position of the tile represent as vectors of positions. Hence, on the basis of this new SRD descriptor syntax, a more compact MPD can be achieved. The advantages of this embodiment becomes more apparent in case of manifest files comprising a large number of representations of tile streams.

In an embodiment, a tile stream identifier may be (part of a) uniform resource locator (URL), wherein information on the tile position of the tiles in the video frames of said tile stream is embedded in said tile stream identifier. In an embodiment, a tile stream identifier template in the manifest file may be used for enabling said client computer to generate tile stream identifiers in which information on the tile position of the tiles in the video frames of said tile streams is embedded.

Multiple SRD descriptors in one adaptation set may require a template (e.g. modified SegmentTemplate as defined in the DASH specification) for enabling the client device to determine the correct tile stream identifier, e.g. (part of) an URL, that is needed by the client device for requesting the correct tile stream from a network node. Such segment template may look as follows:
 <SegmentTemplate timescale="90000" initialization = "$object_x$_$object_y$_init.mp4v"
media="$object_x$_$object_y$_$Time$.mp4v">

A base URL BaseURL and the object_x and object_y identifiers of the segment template may be used to generate a tile stream identifier, e.g. (part of) an URL, of a tile stream that is associated with a particular tile position by substituting the object_x and object_y identifiers with the position information in the SRD descriptor of a selected representation of a tile stream.

In an embodiment, the method may further comprise: requesting, preferably one or more network nodes, to transmit a base stream to said client computer, said base stream comprising sequence information associated with the order in which media data of tile streams defined by said tile stream identifiers need to be combined into a bitstream for said decoder.

In an embodiment, said method may further comprise: requesting, preferably one or more network nodes, to transmit a base stream associated with one or more tile streams to said client computer, said base stream comprising sequence information associated with the order in which media data of said one or more tile streams need to be combined into said bitstream. The sequence information may be used by said client computer for combining media data and tile position information of one or more tile streams into said bitstream.

In an embodiment, said one or more tile streams are formatted on the basis of a data container of a media streaming protocol or media transport protocol, an (HTTP) adaptive streaming protocol or a transport protocol for packetized media data, such as the RTP protocol.

In an embodiment, the media data of said tile streams are encoded on the basis of a codec supporting an encoder module for encoding media data into tiled video frames, preferably said codec being selected from one of: HEVC, VP9, AVC or a codec derived from or based on one of these codecs; In a preferred embodiment the media data are HEVC encoded.

In an embodiment media data and tile position information of said tile streams may be structured on the basis of a data structure defined at bitstream level, preferably one the basis of the network abstraction layer (NAL) as defined by the coding standards, such as H.264/AVC and HEVC video coding standards, that can be processed by said decoder.

In an embodiment, said manifest file may comprise one or more dependency parameters associated with one or more tile stream identifiers, a dependency parameter signaling said client computer that the decoding of media data of a tile stream associated with said dependency parameter is dependent on metadata of at least one base stream. In an embodiment, the base stream may comprise sequence information (e.g. extractors) for signaling the client computer the order in which media data of tile streams defined by said tile stream identifiers in said manifest file need to be combined into a bitstream for said decoder. A dependency parameter may thus signal the client computer that media data and tile position information of certain tile streams can be combined on the basis of metadata of a base stream into one bitstream that is decodable by a decoder.

In an embodiment, said one or more dependency parameters may point to one or more representations, said one or more representations defining said at least one base stream. In an embodiment, a representation defining a base stream may be identified by an representation ID.

In an embodiment, said one or more dependency parameters may point to one or more adaptation sets, said one or more adaptation sets comprising at least one representation defining said at least one base stream. In an embodiment, an adaptation set comprising a representation defining a base stream may be identified by an adaptation set ID. For example, a baseTrackdependencyId attribute may be defined in the manifest file for explicitly signaling a client computer that a representation (defining a tile stream stored in a tile track) may be dependent on metadata of a base stream (stored in a base track) that is defined somewhere else (e.g. in another adaptation set identified by an adaptation set ID) in the manifest. The baseTrackdependencyId attribute may trigger searching for one or more base tracks with a corresponding identifier throughout the collection of representations in the manifest file. In an embodiment, the baseTrackdependencyId attribute may be used for signaling if a base track is required for decoding a representation, wherein the base track is not located in the same adaptation set as the representation requested.

When dependency parameters are defined on representation level, a search for through all representations requires indexing of all the representations in the manifest file. Especially in media applications wherein the number of representations in a manifest file may become substantial, e.g. hundreds of representations, a search through all representations in the manifest file may become processing intensive for the client device. Therefore, in an embodiment, one or more parameters may be provided in the manifest file that enable a client device to perform a more efficient search through the representations in the MPD. In particular, in an embodiment, the manifest file may comprise one or more dependency location parameters, wherein a dependency location parameter signals the client computer at least one location in the manifest file in which at least one base stream is defined, said base stream comprising metadata for decoding media data of one or more tile streams defined in said manifest file. In an embodiment, the location in said manifest file being associated with predefined adaptation set identified by an adaptation set ID.

Hence, a representation element in the manifest file may be associated with a dependentRepresentationLocation attribute that points (e.g. on the basis of an AdaptationSet@id) to at least one adaptation set in which the one or more associated representations that comprise the dependent representation can be found. Here, the dependency may a metadata dependency or a decoding dependency. In an embodiment, the value of the dependentRepresentationLocation may be one or more AdaptationSet@id separated by a white-space.

In an embodiment, said manifest file may further comprise one or more group dependency parameters associated with one or more representations or one or more adaptation sets, a group dependency parameter signaling said client device a group of representations comprising a representation defining said at least one base stream. Hence, in this embodiment a dependencyGroupid parameter may be used for grouping of representations within a manifest file in order to enable the client device more efficient searching of representations that are required for playout of one or more dependent representations (i.e. a tile stream representation that requires metadata from an associated base stream in order to playout the stream).

In an embodiment, the dependencyGroupid parameter may be defined at the level of a representation (i.e. every representation that belongs to the group will be labeled with the parameter). In another embodiment, the dependencyGroupid parameter may be defined at the adaptation set level. Representation in one or more adaptation sets that are labeled with the dependencyGroupId parameter may define a group of representations in which client device may look for one or more representations defining a metadata stream such as a base stream.

In an embodiment, the invention may relate to a encoder device comprising a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, wherein the processor is configured to perform executable operations comprising: receiving media data of at least one composite video stream to the input of at least one encoder, the media data of said composite video stream representing video frames comprising an image region having one or more subregions, preferably the one or more subregions arranged according to a grid of subregions, each of said one or more subregions comprising visual content of a video stream; receiving encoder information for configuring said encoder device to generate encoded media data representing tiled video frames, a tile in said tiled video frames matching at least one of said one or more subregions; and, encoding media data of said composite video stream, wherein media data associated with a subregion of a video frame are encoded into independently encoded media data that have no spatial decoding dependency on media data of other subregions in said video frame, said independently encoded media data forming a tile of a tiled video frame, preferably said tile being arranged in an image region of said tile video frame on the basis of a tile grid, the tile grid preferably matching the grid of the subregions. In embodiments the encoder device may be further arranged to generate at least part of tile position information, wherein tile position information is arranged for signaling a decoder to decode the media data of a tile into tiled video frames comprising a tile at a position as indicated by the tile position information.

In an embodiment, the media data of said one or more tile streams may be encoded on the basis of a codec supporting tiled video frames, preferably said codec being selected from one of: HEVC, VP9, AVC or a codec derived from or based on one of these codecs.

In an embodiment, the media data associated with a tile in a tiled video frame may be formatted as an addressable data structure defined at bitstream level.

In an embodiment, the addressable data structure may be a network abstraction layer (NAL) unit, e.g. a NAL unit as defined in H.264/AVC or HEVC video coding standard or a video coding standard associated with said H.264/AVC or HEVC video coding standard.

In an embodiment, the encoder information may be embedded in the media data of said composite video stream, e.g. as one or more SEI messages in an MPEG bitstream or one or more video containers defined in the MPEG-4 standard. In a further embodiment, (at least part of) said encoder information may be provided via a separate communication channel to the encoder device.

The subregions in the composite video stream (also referred to as mosaic stream) are predefined, and preferably arranged according to a grid of subregions.

In an embodiment the encoder information may comprise instructions for the encoder to produce tiled video frames that have a tile grid that matches the grid of subregions in the video frames of the mosaic stream. Hence the image region of the tiled video frames is made out of tiles arranged according to a tile grid.

In a further embodiment, the encoder information may comprise information for encoding media data of a tile in a video stream into an addressable data structure (e.g. a NAL unit).

In a further aspect, the invention may relate to a tile stream generator device arranged to form and store one or more tile streams on the basis of one or more video streams. The tile stream generator device may comprise a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, wherein the processor may be configured to perform executable operations comprising: providing media data of at least one composite video stream to the input of at least one encoder, the media data of said composite video stream representing video frames comprising an image region having one or more subregions, preferably the one or more subregions arranged according to a grid of subregions, each of said one or more subregions comprising visual content of one of said one or more video streams, preferably at least two, or all of said subregions having the same visual content; providing encoder information to said encoder for configuring said encoder to generate encoded media data representing tiled video frames, a tile in said tiled video frames matching at least one of said one or more subregions; encoding media data of said composite video stream, wherein media data associated with a subregion of a video frame are encoded into independently encoded media data that have no spatial decoding dependency on media data of other subregions in said video frame, said independently encoded media data, of preferably one subregion, but optionally more subregions, forming a tile of a tiled video frame, preferably said tile being arranged in an image region of said tiled video frame on the basis of a tile grid, preferably the tile grid matching the grid of subregions; and, storing said encoded media data as one or more tile streams on a storage medium, preferably on a storage medium of one or more network nodes, a tile stream comprising media data of at least one tile and tile position information for signaling a decoder to decode the media data of said tile stream into tiled video frames comprising a tile at a position as indicated by the tile position information.

In yet a further aspect, the invention may relate to a manifest file generator comprising a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: providing information for determining one or more sets of tile stream identifiers, preferably sets of URLs, each set of tile stream identifiers being associated with predetermined video content and with multiple tile positions; a tile stream identifier identifying a tile stream comprising media data and, preferably, tile position information arranged for signaling a decoder to generate tiled video frames (having decoded media data) comprising at least one tile at a tile position, said tile defining a subregion of visual content in the image region of said video frames; and, associating one or more dependency parameters with one or more tile stream identifiers of said one or more sets of tile stream identifiers, said one or more dependency parameters pointing to a base stream identifier, said one or more dependency parameters signaling said client computer that media data and tile position information of tile streams can be combined on the basis of metadata of said base stream into one bitstream for said decoder.

In a further aspect the invention relates to a manifest file generator which comprises a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising:

providing information for determining one or more sets of tile stream identifiers, preferably sets of URLs, each of said one or more sets being associated with a different predetermined video content, each tile stream identifier of a set being associated with a different tile position of said predetermined video content; a tile stream identifier identifying a tile stream, the tile stream comprising media data and preferably tile position information arranged for signaling a decoder, preferably a HEVC decoder, to generate tiled video frames comprising at least one tile at a tile position, said tile defining a subregion of visual content in the image region of said video frames; and, associating one or more dependency parameters with one or more, preferably a plurality of, tile stream identifiers of said one or more sets of tile stream identifiers, said one or more dependency parameters pointing to a base stream identifier, each of said one or more dependency parameters signaling said client computer that media data and tile position information of tile streams, having tiles with different tile positions, and identified by tile stream identifiers associated with said dependency parameter, can be combined on the basis of metadata of said base stream into a bitstream having media data, which bitstream is decodable by said decoder, said decoder preferably being a HEVC decoder.

In a further aspect, the invention may relate to a non-transitory computer-readable storage media for storing a data structure, preferably a manifest file, for a client computer, wherein said data structure may comprise: information for enabling a client computer to determining one or more sets of tile stream identifiers, preferably sets of URLs, each set of tile stream identifiers being associated with predetermined video content and with multiple tile positions; a tile stream identifier identifying a tile stream comprising media data and, preferably, tile position information arranged for signaling a decoder to generate tiled video frames comprising at least one tile at a tile position, said tile defining a subregion of visual content in the image region of said video frames; and, one or more dependency parameters associated with one or more tile stream identifiers of said one or more sets of tile stream identifiers, said one or more dependency parameters pointing to a base stream in said data structure, said dependency parameters signaling said client computer that media data and tile position information of tile streams can be combined on the basis of metadata of said base stream into one bitstream for said decoder (e.g. into a bitstream being decodable by said decoder, preferably a HEVC decoder).

In yet a further aspect the invention relates to a data structure and a non-transitory computer-readable storage media for storing a data structure, preferably a manifest file, for use by a client computer, said data structure comprising:

information for determining, preferably by said client computer, one or more sets of tile stream identifiers, preferably sets of URLs, each of said one or more sets being associated with a different predetermined video content, each tile stream identifier of a set being associated with a different tile position of said predetermined video content; a tile stream identifier identifying a tile stream, the tile stream comprising media data and preferably tile position information arranged for signaling a decoder to generate tiled video frames comprising at least one tile at a tile position, said tile defining a subregion of visual content in the image region of said video frames; and, one or more dependency parameters associated with one or more, preferably a plurality of, tile stream identifiers of said one or more sets of tile stream identifiers, said one or more dependency parameters pointing to a base stream identifier defined in said data structure, each of said one or more dependency parameter signaling said client computer that media data and tile position information of tile streams having tiles with different tile positions, and identified by tile stream identifiers associated with said dependency parameter, can be combined on the basis of metadata of said base stream into a bitstream having media data, which bitstream is decodable by said decoder, said decoder preferably being a HEVC decoder.

In a further improvement of the invention, the manifest file contains one or more parameters that further indicate a specific property, preferably the mosaic property of the offered content. In embodiments of the invention, this mosaic property is defined in that a plurality of tile video streams, when selected on the basis of representations of a manifest file and having this property in common, are, after being decoded, stitched together into video frames for presentation, each of these video frames constitute a mosaic of subregions with one or more visual intra frame boundaries when rendered. In a preferred embodiment of the invention, the selected tile video streams are input as one bitstream to a decoder, preferably a HEVC decoder.

In an further embodiment the manifest file, preferably a MPEG DASH based manifest file, comprises one or more 'spatial_set_id' parameters and one or more 'spatial set type' parameters, whereby at least one spatial_set_id parameter is associated with a spatial_set_type parameter.

In an embodiment the mosaic property parameter mentioned above is comprised as a spatial_set_type parameter.

According to a further embodiment of the invention, the semantic of the 'spatial_set_type' expresses that the 'spatial_set_id' value is valid for the entire manifest file, and being applicable to SRD descriptors with different 'source_id' values. This enables the possibility to use SRD descriptors with different 'source_id' values for different visual content, and modifies the known semantic of the 'spatial_set_id' in that its use is confined to within the context of a 'source_id'. In this case, Representations with SRD descriptors have a spatial relationship as long as they share the same "spatial_set_id' with their 'spatial_set_type' of value "mosaic", regardless of the 'source_id' value.

In an embodiment of the invention, the mosaic property parameter, preferably the spatial_set_type parameter is configured to signals, preferably instructs or recommends, the DASH client device to select for each available position as defined by a SRD descriptor, a representation pointing to a tile video stream, whereby the representations are preferably selected from a group of representations sharing the same "spatial_set_id'.

In embodiments of the invention the client computer (for example a DASH client device) is arranged to interpret the manifest file according to the embodiments of the invention, and to retrieve tile video streams through selecting representations from the manifest file, on the basis of the metadata contained in the manifest file.

In aspect the invention also relates to a manifest file generator, arranged for generating a manifest file according to all embodiments of the invention, as described throughout this application.

In a further embodiment, the encoder information may be transported in a video container. For example, the encoder information may be transported in a video container such as the ISOBMFF file format (ISO/IEC 14496-12). The ISOBMFF file format specifies a set of boxes, which constitutes a hierarchical structure to store and access the media data and metadata associated with it. For example, the root box for the metadata related to the content is the "moov" box whereas the media data is stored in the "mdat" box. More particularly, the "stbl" box or "Sample Table Box" indexes the media samples of a track allowing to associate additional data with each sample. In case of a video track, a sample is a video frame. As a result adding a new box called "tile encoder info" or "stei" within the box "stbl" may be used to store the encoder information with the frames of a video track.

The invention may also relate to a program product comprising software code portions configured for, when run in the memory of a computer, executing the method steps according to any of method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 7A-7D depict a process and media formats for forming and storing tile streams according to various embodiments of the invention.

DETAILED DESCRIPTION

Figure 1A:
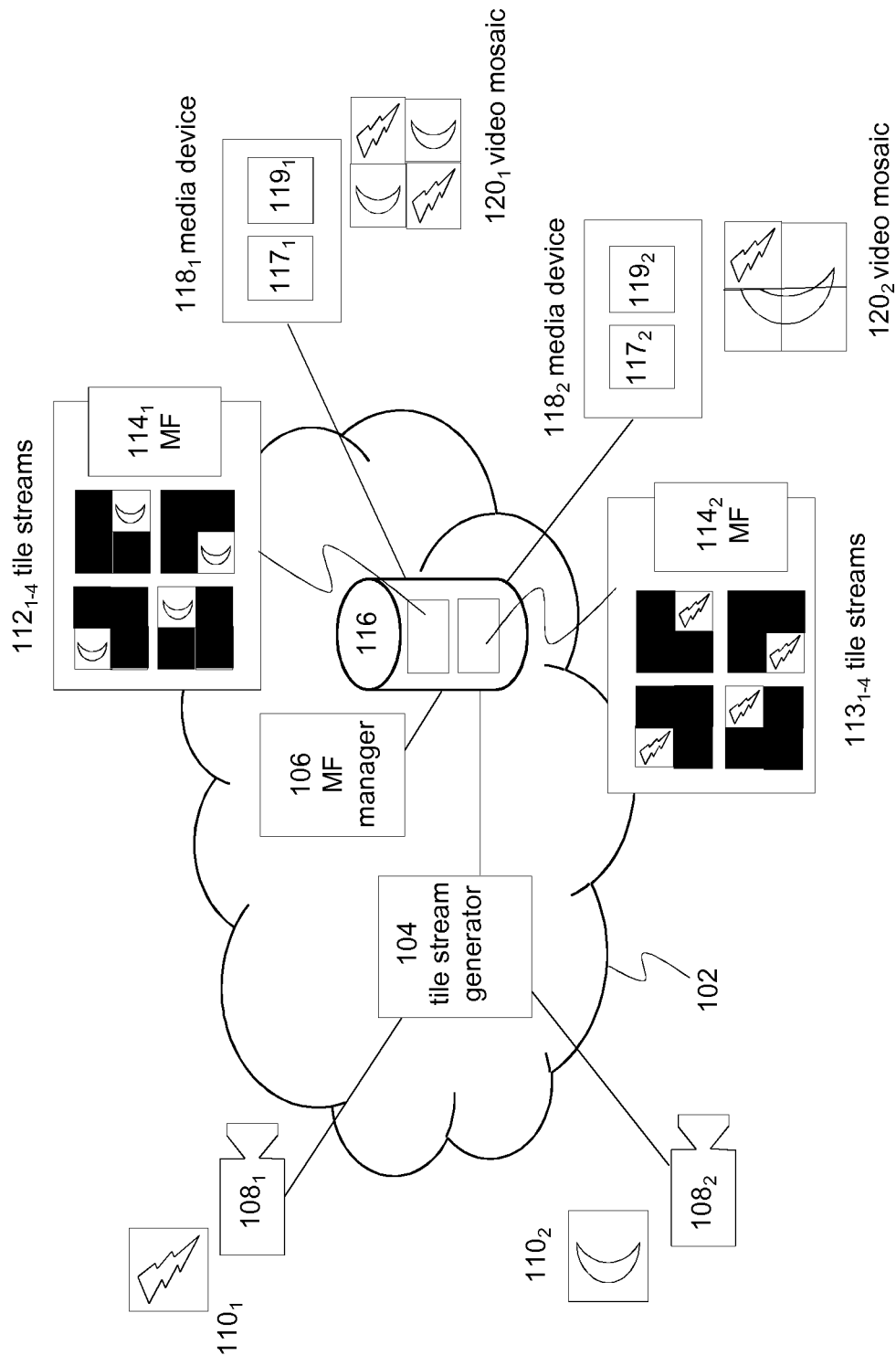
FIG. 1A-1C schematically depict a video mosaic composer according to an embodiment of the invention.
Figure 1B:
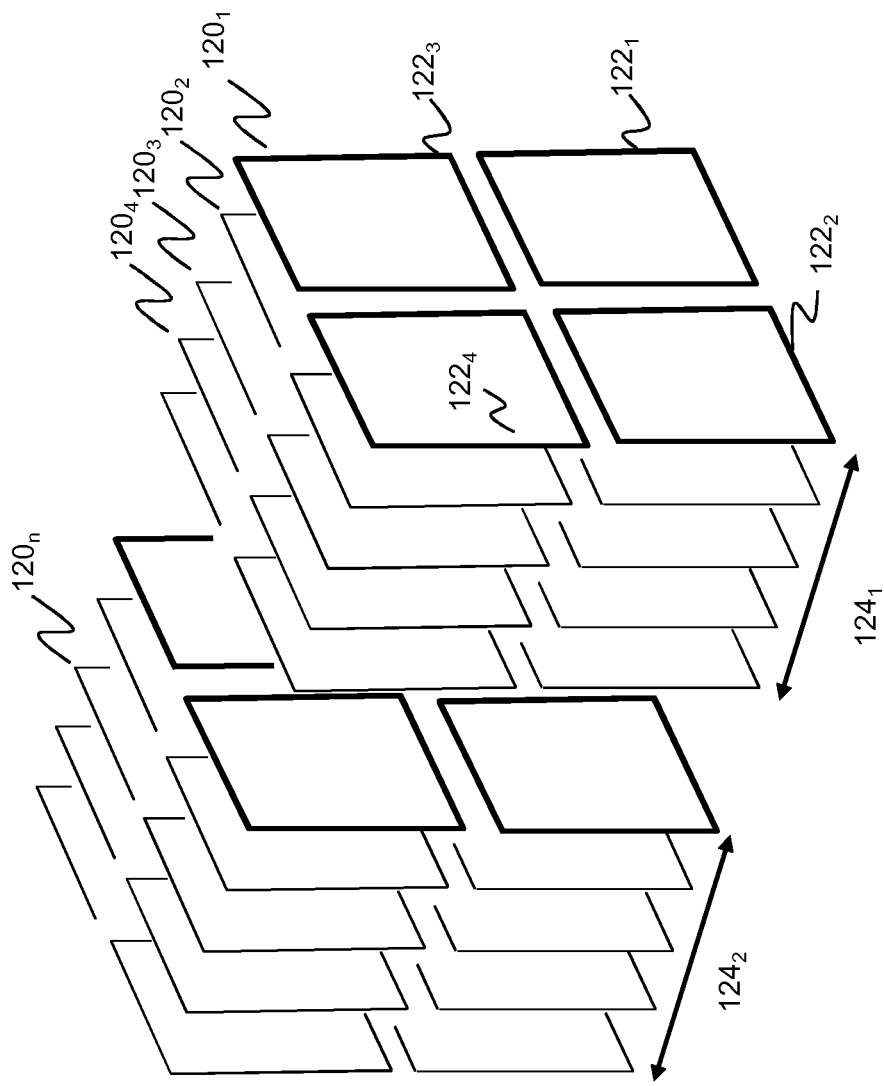
Figure 1C:
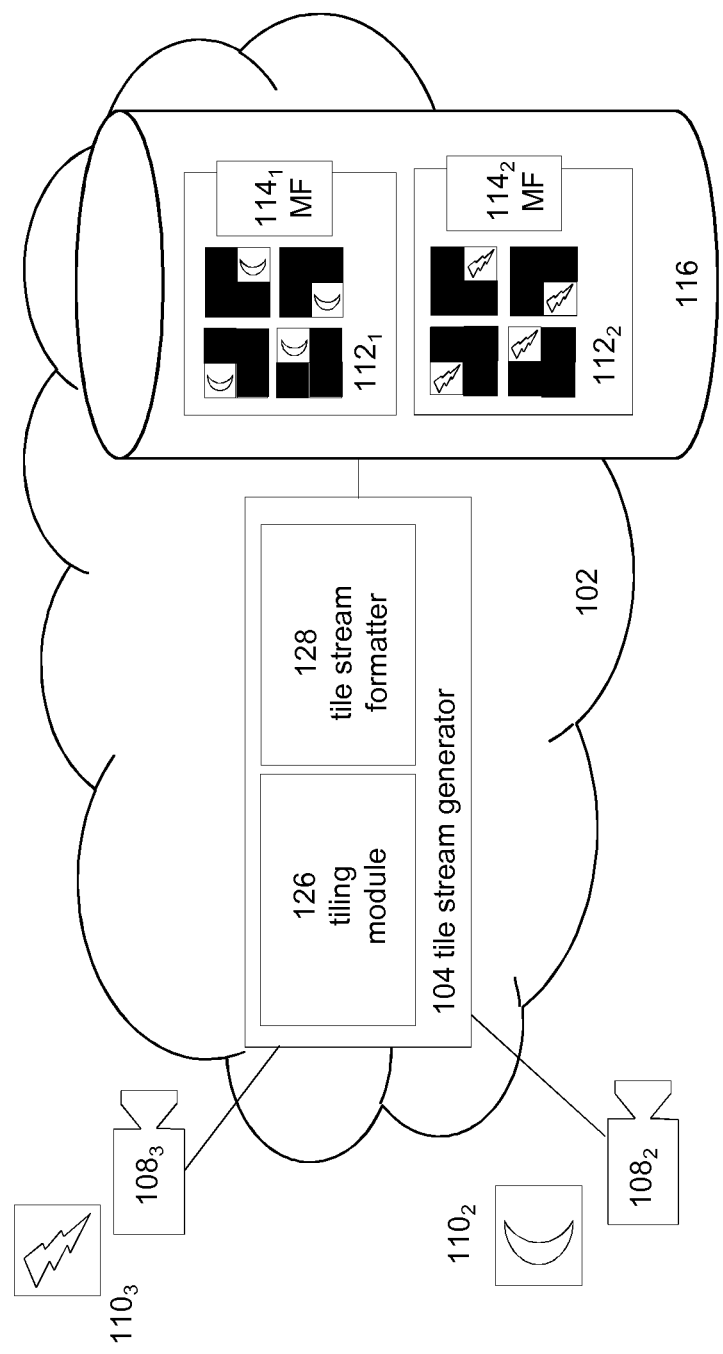

FIG. 1A-1C schematically depicts a video mosaic composer system according to an embodiment of the invention. In particular, FIG. 1A depicts video mosaic composer system 100 that enables selecting and combining different independent media streams into a video mosaic that can be rendered on a display of a media device comprising a single decoder module. As will be described hereunder in more detail, the video mosaic composer may use so-called tiled video streams and associated tile streams in order to structure the media data of the different media streams such that different video mosaics can be formed ("composed") in an efficient and flexible way.

In this disclosure the term "tiled media stream" or "tiled stream" or "tiled mosaic stream" refer to media streams comprising video frames representing (having) image regions wherein each video frame comprises one or more subregions, which may be referred to as "tiles". Each tile of a tiled video frame may be related to a tile position and media data representing the visual content of the tile. A tile in a video frame is further characterized in that the media data associated with a tile are independently decodable by a decoder module. This aspect will be described hereunder in greater detail.

Further, in this disclosure the term "tile stream" refers to a media stream comprising media data and, preferably, decoder information comprising tile position information, for instructing a decoder module to decode the media data of the tile stream into tiled video frames comprising a single tile at a certain tile position within the tiled video frames. In certain embodiments instead of the term "tile stream" the term "mosaic tile stream" is used. The (part of the) decoder information that signals the tile position is referred to as tile position information.

A tiled video frame thus relates to a video frame comprising at least one tile associated with at least one subregion of an image region. The tiled video frame may refer to a video frame generated from an encoding process of a, preferably HEVC, encoder and comprise independently encoded media data according to the invention, in which case the at least one tile is preferably positioned according to a tile grid that preferably matches a grid of subregions of the input video stream of the encoder. A tiled video frame may also refer to a video frame generated on the basis of the decoding of at least one tile stream, in which case the at least one tile is preferably positioned according to tile position information, preferably comprised in the tile stream, and which tile position information comprises information about the tile position of the at least one tile in the tiled video frame. The tile position information may comprise information about a tile grid that preferably matches a grid of subregions of the input video stream of the encoder that generated the independently encoded media data of the at least one tile stream.

As will described hereunder in more detail, tile streams may be generated on the basis of a tiled stream by selecting media data associated with a tile at a certain tile position in the tiled video frames of the tiled media stream and storing the thus collected media data in a media format that can be accessed by a client device.

FIG. 1B illustrates the concept of a tiled media stream and associated tile streams that may be used by the video mosaic composer of FIG. 1A. In particular, FIG. 1B depicts a plurality of tiled video frames $120_{1-n}$, i.e. video frames divided in a plurality of tiles $122_{1-4}$ (in this particular example four tiles). The media data associated with a tile $122_1$ of a tiled video frame do not have any spatial decoding dependency on the media data of other tiles $122_{2-4}$ of the same video frame and any temporal decoding dependency on the media data of other tiles $122_{2-4}$ of earlier or future video frames.

This way, media data associated with a predetermined tile in subsequent tiled video frames may be independently decoded by a decoder module in a media device. In other words, the client device may receive media data of one tile $122_1$ and start decoding, from the earliest random access point received, the media data into video frames without the need of media data of other tiles. Here, a random access point may be associated with a video frame that does not have any temporal decoding dependencies on earlier and/or later video frames, e.g. an I-frame or an equivalent thereof. This way, media data associated with one individual tile may be transmitted as a single independent tile stream to the client device. Examples on how tile streams can be generated on the basis of one or more tiled media streams and how tile streams can be stored on a storage medium of a network node or a media device are described hereunder in more detail.

Different transport protocols may be used to transmit an encoded bitstream to a client device. For example, in an embodiment, an HTTP adaptive streaming (HAS) protocol may be used for delivering a tile stream to a client device. In that case, the sequence of video frames in the tile stream may be temporality divided in temporal segments $124_{1,2}$ (as depicted in FIG. 1B) typically comprising 2-10 seconds media data. Such temporal segment may be stored as a media file on a storage medium. In an embodiment, a temporal segment may start with media data that have no temporal coding dependencies on other frames in the temporal segment or other temporal segments, e.g. an I frame, so that the decoder can directly start decoding media data in the HAS segment.

Hence, in this disclosure the term "independently encoded" media data means that there is no spatial coding dependency between media data associated with a tile in a video frame and media data outside the tile (e.g. in the neighboring tiles) and no temporal coding dependency between media data of tiles at different positions in different video frames. The term independently encoded media data should distinguished from other types of (in)dependencies that media data can have. For example, as will be described hereunder in more detail, media data in a media stream may be dependent on an associated media stream that contains metadata that is needed by a decoder in order to decode the media stream.

The concept of tiles as described in this disclosure may be supported by different video codecs. For example the High Efficiency Video Coding (HEVC) standard allows the use of independently decodable tiles (HEVC tiles). HEVC tiles may be created by an encoder that divides each video frame of a media stream into a number of rows and columns ("a grid of tiles") defining tiles of a predefined width and height expressed in units of coding tree blocks (CTB). An HEVC bitstream may comprise decoder information for informing a decoder how the video frames are divided in tiles. The decoder information may inform the decoder on the tile division (e.g. the tile grid) of the video frames in different ways. In one variant, the decoder information may comprise information on a uniform grid of n by m tiles, wherein the size of the tiles in the grid can be deduced on the basis of the width of the frames and the CTB size. Because of rounding inaccuracies, not all tiles may have the exact same size. In another variant, the decoder information may comprise explicit information on the widths and heights of the tiles (e.g. in terms of coding tree block units). This way video frames can be divided in tiles of different size. Only for the tiles of the last row and the last column the size may be derived from the remaining number of CTBs. Thereafter, a packetizer may packetize the raw HEVC bitstream into a suitable media container that is used by a transport protocol.

Other video codecs that support independently decodable tiles include the video codec VP9 of Google or—to some extent—the MPEG-4 Part 10 AVC/H.264, the Advanced Video Coding (AVC) standard. In VP9 coding dependencies are broken along vertical tile boundaries, which means that two tiles in the same tile row may be decoded at the same time. Similarly, in the AVC encoding, slices may be used to divide each frame in multiple rows, wherein each of these rows defines a tile in the sense that the media data is independently decodable. Hence, in this disclosure the term "tile" is not limited to HEVC tiles but generally defines a subregion of arbitrarily shape and/or dimensions within the image region of the video frames wherein the media data within the boundaries of the tile are independently decodable. In other video codecs other terms such as segment or slice may be used for such independently decodable regions.

The video mosaic composer of FIG. 1A may comprise a mosaic tile generator 104 connected to one or more media sources $108_{1,2}$, e.g. one or more cameras, and/or one or more (content) servers of a third-party content provider (not shown). The media data, e.g. the video data, audio data and/or text data (e.g. for subtitles), captured by a camera or provided by a server may be encoded (compressed) on the basis of a suitable video/audio codec stored in a container format according to a data container format (e.g. ISO/IEC 14496-12 ISO Base Media File Format (ISOBMFF) or its variant for AVC and HEVC ISO/IEC 14496-15 Carriage of NAL unit structured video in the ISO Base Media File Format). The thus encoded and formatted media data may be packetized for transmission in a media stream $110_{1,2}$ via one or more network nodes, e.g. routers, to the mosaic tile generator in the network 102.

The mosaic tile generator may generate one or more tile streams $112_{1-4}, 113_{1-4}$ for forming a video mosaic (which hereafter may be referred to as a "mosaic tile streams"). The mosaic tile streams may be stored as a data file of a predetermined media format on the storage medium of the network node 116. These mosaic tile streams may be formed on the basis of one or more media streams $110_{1,2}$ originating from one or more media sources. Each mosaic tile stream of the set of mosaic tile streams comprises decoder information for instructing a decoder to generate video frames comprising a tile at a predetermined tile position wherein the media data associated with the tile represent a visual copy of the media data of the original media stream.

For example, as shown in FIG. 1A, each of the four mosaic tile streams $112_{1-4}$ is associated with video frames comprising a tile representing a visual copy of the media stream $110_2$ that was used for forming the mosaic tile streams. Each of the four mosaic tile streams $112_{1-4}$ is associated with a tile at a different tile position. During the generation of the mosaic tile streams, the tile stream generator may generate metadata defining the relation between tile streams. These metadata may be stored in a manifest file $114_{1,2}$. A manifest file may comprise tile stream identifiers (e.g. (part of) a file name), location information for locating one or more network nodes where tile streams identified by said tile stream identifiers may be retrieved (e.g. (part of) a domain name), and a so-called tile position descriptor associated with each or at least part of the tile stream identifiers. Hence, the tile position descriptor signals the client device, e.g. a DASH client, on the spatial position of a tile and the dimensions (size) of the tile in video frames of tile stream identified by a tile stream identifier, whereas the tile position information of a tile steam signals the decoder on the spatial position and the dimensions (size) of a tile in the video frames of the tile stream. The manifest file may further comprise information on media data contained in the tile stream (e.g. quality level, compression format, etc.).

A manifest file (MF) manager 106 may be configured to administer the one or more manifest files defining tile streams that are stored in the network (e.g. one or more network nodes) and that may be requested by a client device. In an embodiment, the manifest file manager may be configured to combine information of different manifest files $114_{1,2}$ into a further manifest file that can be used by a client device to request a desired video mosaic.

For example, in an embodiment, the client device may send information on a desired video mosaic to the network node and in response, the network node may request the manifest file manager 106 to generate a further manifest file (a "customized" manifest file) comprising tile stream identifiers of the tile streams forming the video mosaic. The MF manager may generate this manifest file by combining (parts of) different manifest files or by selecting parts of a single manifest file wherein each tile stream identifier may be related to a tile stream of a different tile position of the video mosaic. The customized manifest file thus defines a specific manifest file that is generated "on the fly" (defining the requested video mosaic). This manifest file may be sent to the client device that uses the information in the manifest file in order to request media data of the tile streams forming video mosaic.

In another embodiment, the manifest file manager may generate a further manifest file on the basis of manifest files of stored tile streams wherein the further manifest file comprises multiple tile stream identifiers associated with the same tile position. The further manifest file may be provided to the client device that may use the further manifest file to select a desired tile stream at a particular tile position from a plurality of tile streams. Such further manifest file may be referred to a "multiple-choice" (MC) manifest file. The MC manifest file enables the client device to compose a video mosaic on the basis of multiple tile streams that are available for each of the tile positions of a video mosaic. Customized manifest files and multiple-choice manifest files are described hereunder in more detail.

Once the mosaic tile streams and the associated manifest files are stored on a storage medium of one or more network nodes 116, the media data may be accessed client devices $117_{1,2}$. The client device may be configured for requesting tile streams on the basis of information on the mosaic tile streams, such as a manifest file or an equivalent thereof. The client device may be implemented on a media device $118_{1,2}$ that is configured to process and render requested media data. To that end, the media device may further comprise a media engine $119_{1,2}$ for combining the media data of the tile streams into a bitstream that is input to a decoder configured to decode the information in the bitstream into video frames of a video mosaic $120_{1,2}$. The media device may generally relate to a content processing device, e.g. a (mobile) content play-out device such as an electronic tablet, a smart-phone, a notebook, a media player, a television, etc. In some embodiment, a media device may be a set-top box or content storage device configured for processing and temporarily storing content for future consumption by a content play-out device.

The information on the tile streams may be provided via an in-band or an out-of-band communication channel to a client device. In an embodiment, a client device may be provided with a manifest file comprising a plurality of tile stream identifiers identifying tile streams from which the user can select from. The client device may use the manifest file to render a (graphical) user interface (GUI) on the screen of a media device that allows a user to select ("compose") a video mosaic. Here, composing a video mosaic may include selecting tile streams and positioning these selected tile streams at a certain tile position so that a video mosaic is formed. In particular, a user of the media device may interact with the UI, e.g. via touch screen or a gesture-based user interface, in order to select tile streams and to assign a tile position to each of the selected tile streams. The user interaction may be translated in the selection of a number of tile stream identifiers.

As will be described hereunder in more detail, the bitstream may be formed by concatenating bitsequences representing video frames of different tile streams, inserting tile position information in the bitstream and formatting the bitstream on the basis of a predetermined codec, e.g. the HEVC codec, so that a single decoder module can decode it. For example, a client device may request a set of individual HEVC tile streams and forward the media data of the requested streams to a media engine that may combine video frames of the different tile streams into a HEVC compliant bitstream, which can be decoded by a single HEVC decoder module. Hence, selected tile streams may be combined into a single bitstream and decoded using a single decoder module that is capable of decoding the bitstream and rendering the media data as a video mosaic on a display of a media device on which the client device is implemented.

The tile streams selected by a client device may be delivered to the client device using a suitable (scalable) media distribution technique. For example, in an embodiment, the media data of the tile streams may be broadcast, multicast (including both network-based multicast, e.g. Ethernet multicast and IP multicast, and application-level or overlay multicasting) or unicast to client devices using a suitable streaming protocol e.g. the RTP streaming protocol or an adaptive streaming protocol, e.g. an HTTP adaptive streaming (HAS) protocol. In the latter embodiment, a tile stream may be temporarily segmented in HAS segments. A media device may comprise an adaptive streaming client device, which may comprise an interface for communicating with one or more network nodes, e.g. one or more HAS servers, in the network and to request and receive segments of the tile streams from a network node on the basis of an adaptive streaming protocol.

FIG. 1C depicts the mosaic tile generator in more detail. As shown in FIG. 1C, the media streams $110_{2,3}$ generated by media sources $108_{2,3}$ may be transmitted to the mosaic tile generator that may comprise one or more tiling modules 126 for transforming a media stream into a tiled mosaic stream wherein the visual content of each tile (or at least part of the tiles) in a video frame of the tiled mosaic stream is a, preferably scaled, copy of the visual content in the video frames of the media stream. The tiled mosaic stream thus represents a video mosaic wherein the content of each tile represents a visual copy of the media stream. One or more tile stream formatters 128 may be configured to generate separate tile streams and an associated manifest file 114$_{1,2}$ on the basis of the tiled mosaic stream, which may be stored on a storage medium of a network node 116. In an embodiment, a tiling module may be implemented at the media source. In another embodiment, a tiling module may be implemented at a network node in the network. Tile streams may be associated with decoder information for informing a decoder module (that supports the concept of tiles as defined in this disclosure) on the particular tile arrangement (e.g. the tile dimensions, the position of the tile in the video frame, etc.).

The video mosaic composer system described with reference to FIG. 1A-1C may be implemented as part of a content distribution system. For example, (part of) the video mosaic composer system may be implemented as part of a content delivery network (CDN). Further, while in the figures the client devices are implemented in a (mobile) media device, (part of the functionality of) the client devices may also be implemented in the network, in particular at the edge of the network.

Figure 2A:
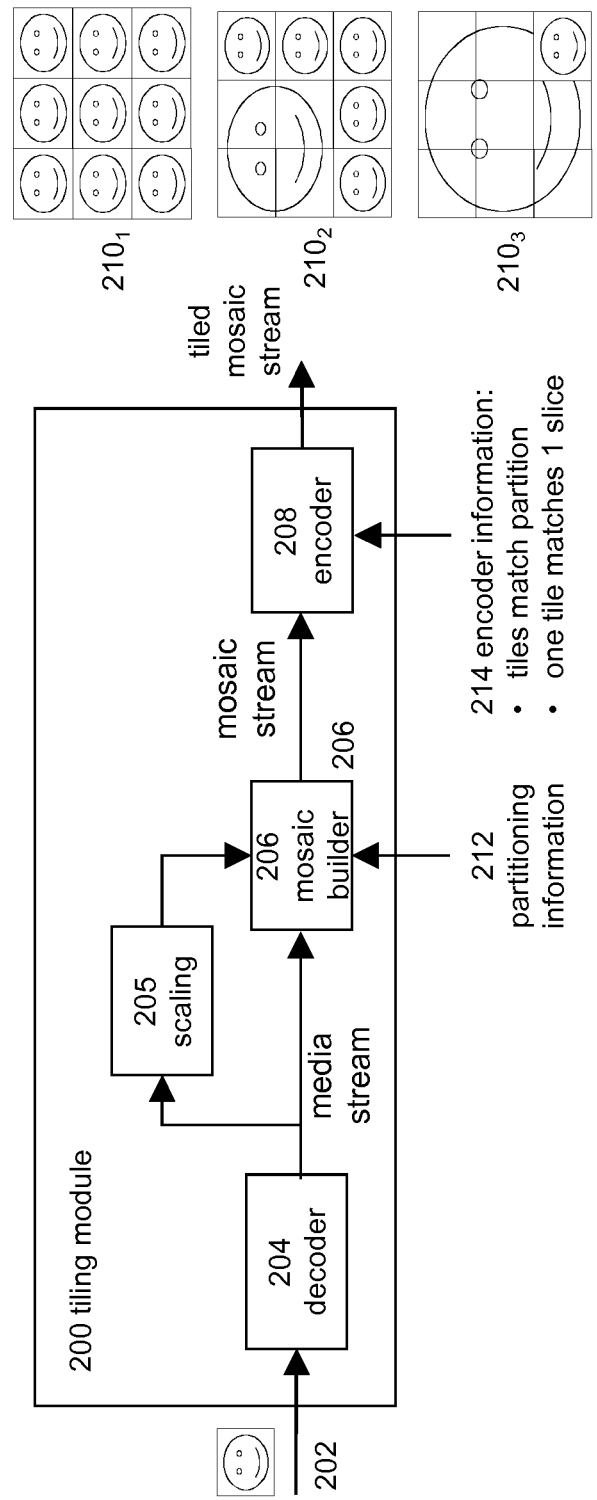
FIG. 2A-2C schematically depict a tiling module according to various embodiments of the invention.
Figure 2B:
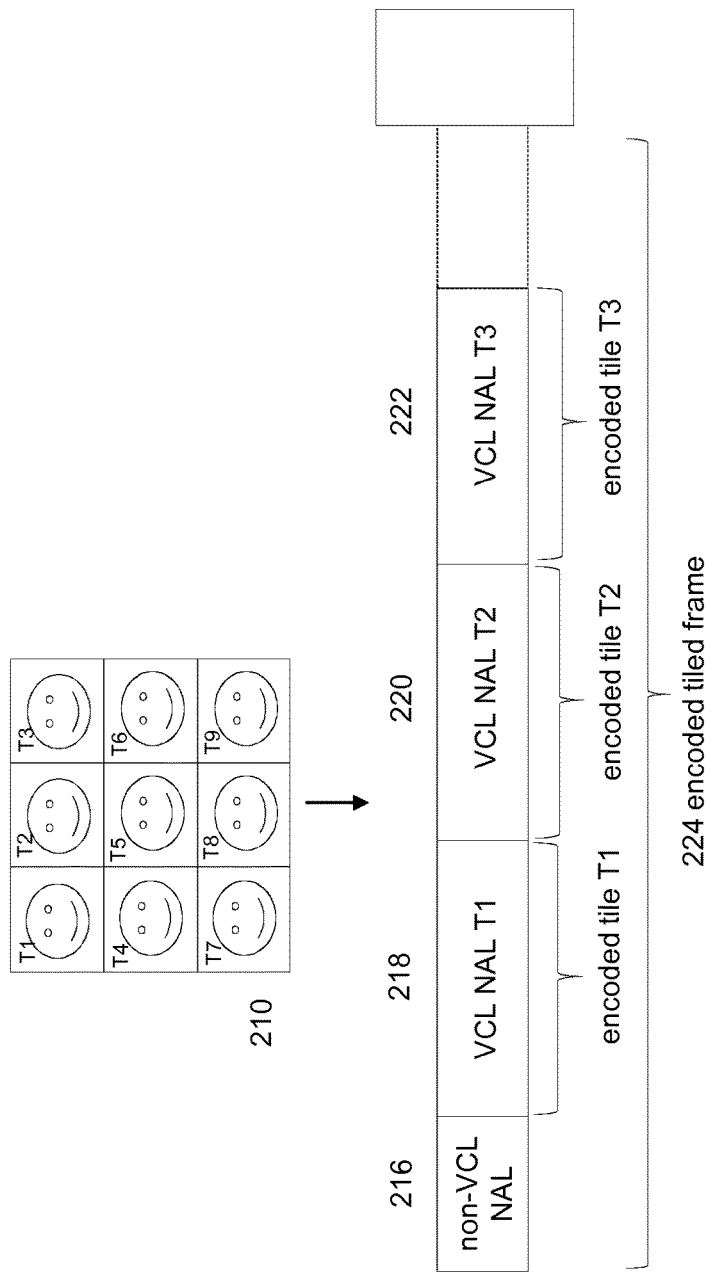
Figure 2C:
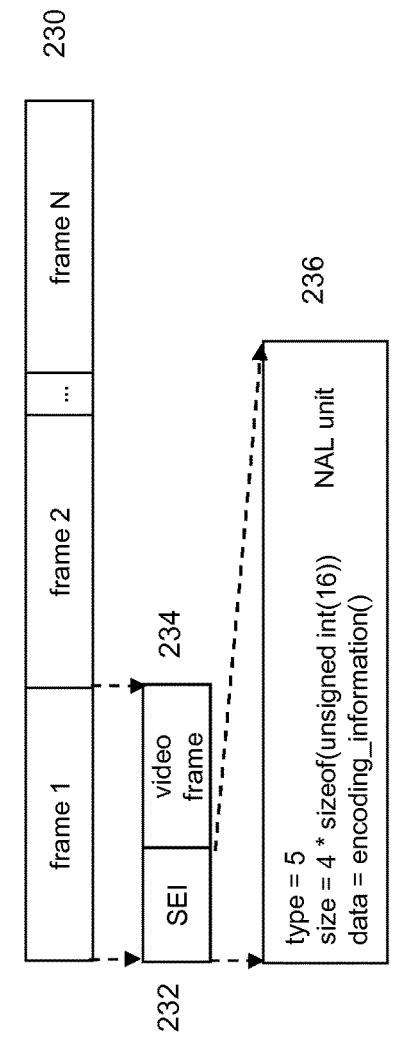

FIG. 2A-2C depict a tiling module according to various embodiment of the invention. In particular, FIG. 2A depicts a tiling module 200 comprising an input for receiving a media stream 202 of a particular media format. When needed, a decoder module 204 in the tiling module may transform the encoded media stream into a decoded uncompressed media stream that allows processing in the pixel-domain. For example, in an embodiment, the media stream may be decoded into a media stream that has a raw video format. The raw media data of the media stream may be fed into a mosaic builder 206 that is configured to form a composite video stream, e.g. a mosaic stream, in the pixel-domain. During this process video frames of the decoded media stream may be scaled and copies of the scaled frames may be ordered in a grid configuration (a mosaic). The thus arranged grid of video frames may be stitched together into a video frame representing an image region that comprises subregions wherein each subregion represents a visual copy of the original media stream. Hence, the composite video stream may comprise a mosaic of N×M visually identical replicas of the video stream. Alternatively, the composite video stream may comprise a mosaic of N×M subregions wherein a subregion represents visual content of a content source. Some subregions may relate to the same visual content while other subregions may relate to different visual content.

The bitstream representing the video mosaic is then forwarded to an encoder module 208 that is configured to encode the bitstream into a tiled mosaic stream 210$_1$ comprising encoded media data representing tiled video frames wherein the media data of each tile in a tiled video frame may be independently encoded. For example, the encoder module may be an encoder that is based on a codec that supports tiles, e.g. an HEVC encoder module, a VP9 encoder module or a derivative thereof.

Here, the dimensions of the subregions in the video frames of the mosaic stream and the dimensions of the tiles in the tiled video frames of the tiled mosaic stream may be selected such that each subregion matches a tile. The mosaic builder may use partitioning information 212 in order to determine the number and/or dimensions of subregions in the video frames of the mosaic stream.

The mosaic stream (e.g. composite video stream) may be associated with, e.g. comprise, encoder information 214, said encoding information being arranged for informing the encoder that the stream represents a mosaic stream having a predetermined grid size (the grid of subregions) and that the mosaic stream needs to be encoded into a tiled mosaic stream (tiled stream) wherein the tile grid matches the grid of subregions of the mosaic stream. Hence, the encoder information may comprise instructions for the encoder to produce tiled video frames that have a grid of tiles that matches the grid of subregions in the video frames of the mosaic stream. Further, the encoder information may comprise information for encoding media data of a tile in a video stream into an addressable data structure (e.g. a NAL unit) and to encode media data of a tile in subsequent video frames that can be independently decoded.

Information on the grid size of the subregions in the video frames of the mosaic stream (e.g. the partitioning information 212) may be used for determining grid size information for setting the dimensions of the tile grid (e.g. the dimensions of the tiles and the number of tiles in a video frame) associated with the tiled video frames it generates.

In order to allow the formation of independent tile streams on the basis of one or more tiled media streams and the formation of a mosaic video by a client device on the basis of tile streams, the media data of one tile of a tile video frame should be contained in well-delimited addressable data structure that can be generated by the encoder and that can be individually processed by the decoder and any other module at the client side that processes received media data before it is fed to the input of the decoder.

For example, in one embodiment, encoded media data associated with one tile in a tiled video frame may be structured into a network abstraction layer (NAL) unit as known from the H.264/AVC and HEVC video coding standards. In case of a HEVC encoder, this may be achieved by requiring that one HEVC tile comprises one HEVC slice. Here, an HEVC slice defines an integer number of coding tree units contained in one independent slice segment and all subsequent dependent slice segments (if any) that precede the next independent slice segment (if any) within the same access unit as defined by HEVC specification. This requirement may be sent in the encoder information to the encoder module.

In case the encoder module is configured for generating one HEVC tile comprising one HEVC slice, the encoder module may produce encoded tiled video frames that are formatted on the level of the network abstraction layer (NAL). This is schematically depicted in FIG. 2B. As shown in this figure, a tiled video frame 210 may comprise a plurality of tiles, e.g. in the example of FIG. 2B nine tiles, wherein each tile represents a visual copy of a media stream, e.g. the same media stream or two or more different media streams. An encoded tiled video frame 224 may comprise a non-VCL NAL unit 216 comprising metadata (e.g. VPS, PPS and SPS) as defined in the HEVC standard. A non-VCL NAL unit may inform a decoder module about the quality level of the media data, the codec that is used for encoding and decoding the media data, etc. The non-VCL may be followed by a sequence of VCL NAL units 218-222, each comprising a slice (e.g. an I-slice, P-slice or B-slice) associated with one tile. In other words, each VCL NAL unit may comprise one encoded tile of a tiled video frame. The header of the slice segment may comprise tile position information, i.e. information for informing a decoder module about the position of a tile (which is equivalent to a slice since the media format is restricted to one tile per slice) in a video frame. This information may be given by the slice_segment_address parameter, which specifies the address of the first coding tree block in the slice segment, in coding tree block raster scan of a picture as defined by the HEVC specification. The slice_segment_address parameter may be used to selectively filter media data associated with a tile out of the bitstream. This way, the non-VCL NAL unit and the sequence of VCL NAL units may form an encoded tiled video frame 224.

In order to generate independent decodable tile streams on the basis of one or more tiled media streams, the encoder should be configured such that media data of a tile in subsequent video frames of a tiled media stream are independently encoded. Independently encoded tiles may be achieved by disabling the inter-prediction functionality of the encoder. Alternatively, independently encoded tiles may be achieved by enabling the inter-prediction functionality (e.g. for reasons of compression efficiency), however in that case the encoder should be arranged such that:

in-loop filtering across tile boundaries is disabled.
no temporal inter-tile dependency;
no dependency between two tiles in two different frames (in order enable extraction of tiles at one position in multiple consecutive frames).

Hence, in that case the motion vectors for inter-prediction need to be constrained within the tile boundaries over multiple consecutive video frames of the media stream.

As will be shown hereunder, manipulation of the media data of tiles on the basis of a well-delimited addressable data structure that can be individually processed on the encoder/decoder level, such as NAL units, is particularly advantageous for the formation of a video mosaic on the basis of a number of tile streams as described in this disclosure.

The encoder information described with reference to FIG. 2A may be transported in the bitstream of the mosaic stream or in an out-of-band communication channel to the encoder module. As shown in FIG. 2C, the bitstream may comprise a sequence of frames 230 (each visually comprising a mosaic of n tiles) wherein each frame comprises a supplemental enhancement information (SEI) message 232 and a video frame 234. The encoder information may be inserted as a SEI message in the bitstream of a MPEG stream that is encoded using an H.264/MPEG-4 based codec. A SEI message may be defined as a NAL unit comprising supplemental enhancement information (SEI) (see 7.4.1 NAL Units semantics in ISO/IEC 14496-10 AVC). The SEI message 236 may be defined as a type 5 message: user data unregistered. The SEI message type referred to as user data unregistered allows arbitrary data to be carried in the bitstream. The SEI message may comprise predetermined number of parameters for specifying the encoder information, i.e. comprising the arrangement of tiles that needs the encoder 208 needs to produced. These parameters may be comprised of a flag that signals when true an uniform spacing of tile rows and tile columns which is then accompanied by a pair of integers from which the number of rows and columns can be derived from. When the uniform spacing flag is false, two vectors of integers are present from which the width and the height of each tile can be respectively derived from. SEI messages may carry extra information in order to assist the process of decoding. The various SEI messages and their semantics (Annex D.2) are defined in ISO/IEC 14496-10:2012. The SEI messages can be similarly used with MPEG streams encoded using an H.265/HEVC based codec. The various SEI messages and their semantics (Annex D.3) are defined in ISO/IEC 23008-2:2013.

In another embodiment of the invention the encoder information may be transported in the coded bitstream. A Boolean flag in the frame header may indicate whether such information is present. In the case a flag is set the bits following the flag may represent the encoder information.

In a further embodiment, the encoder information may be transported in a video container. For example, the encoder information may be transported in a video container such as the ISOBMFF file format (ISO/IEC 14496-12). The ISOBMFF file format specifies a set of boxes, which constitutes a hierarchical structure to store and access the media data and metadata associated with it. For example, the root box for the metadata related to the content is the "moov" box whereas the media data is stored in the "mdat" box. More particularly, the "stbl" box or "Sample Table Box" indexes the media samples of a track allowing to associate additional data with each sample. In case of a video track, a sample is a video frame. As a result adding a new box called "tile encoder info" or "stei" within the box "stbl" may be used to store the encoder information with the frames of a video track.

In an embodiment, the tiling module of FIG. 2A may comprises a scaling module 205 that can be used for scaling, e.g. upscaling or downscaling, copies of the video frames of the media stream. Here, the scaled video frames may cover an integer number of subregions so that the boundaries of the subregions in the video frames of the mosaic stream match the tile grid of the tiled video frames in the tiled mosaic stream generated by the tile encoder module. The mosaic builder may use the scaled video frames in order to build an encoded mosaic stream in the pixel-domain wherein (some of) the mosaics $210_{2,3}$ may be of different size as shown in FIG. 2A. Such mosaic stream may be used for forming e.g. a personalized "picture-in-picture" video mosaic or for enabling enlarged highlighting. In the example of FIG. 2A, the number of tiles remains the same. In other embodiments, video frames may comprise tiles of different dimensions.

Hence, the tiling module described with reference to FIG. 2A-2C allows the formation of a tiled mosaic stream on the basis of a media stream using an encoder that supports tiles, e.g. a (standard) HEVC encoder that is configured to generate a tiled mosaic stream, i.e. a HEVC compliant bitstream, wherein the media data of a tile in a video frame are structured as VCL NAL units and wherein the media data that form a tiled video frame are structured as a non-VCL NAL unit followed by a sequence of VCL NAL units. The tiled video frames of a tiled mosaic stream comprise tiles wherein the media data of a tile in a video frame are independently decodable with respect to media data of other tiles in the same video frame. The media data of a given tile in a video frame may not be independently decodable with respect to media data of tiles in other video frames at the same position of the given tile. Thus the media data of each of these tiles, possibly dependent when located at the same predetermined position in different video frames, may be used to form an independent mosaic tile stream. These embodiments make use of the advantage of the encoder that is configured to generate a tiled media stream that can be processed on the level of NAL units without the need to rewrite the metadata associated with the NAL units, i.e. the content of the non-VCL NAL units and the headers of the VCL NAL units.

Figure 3:
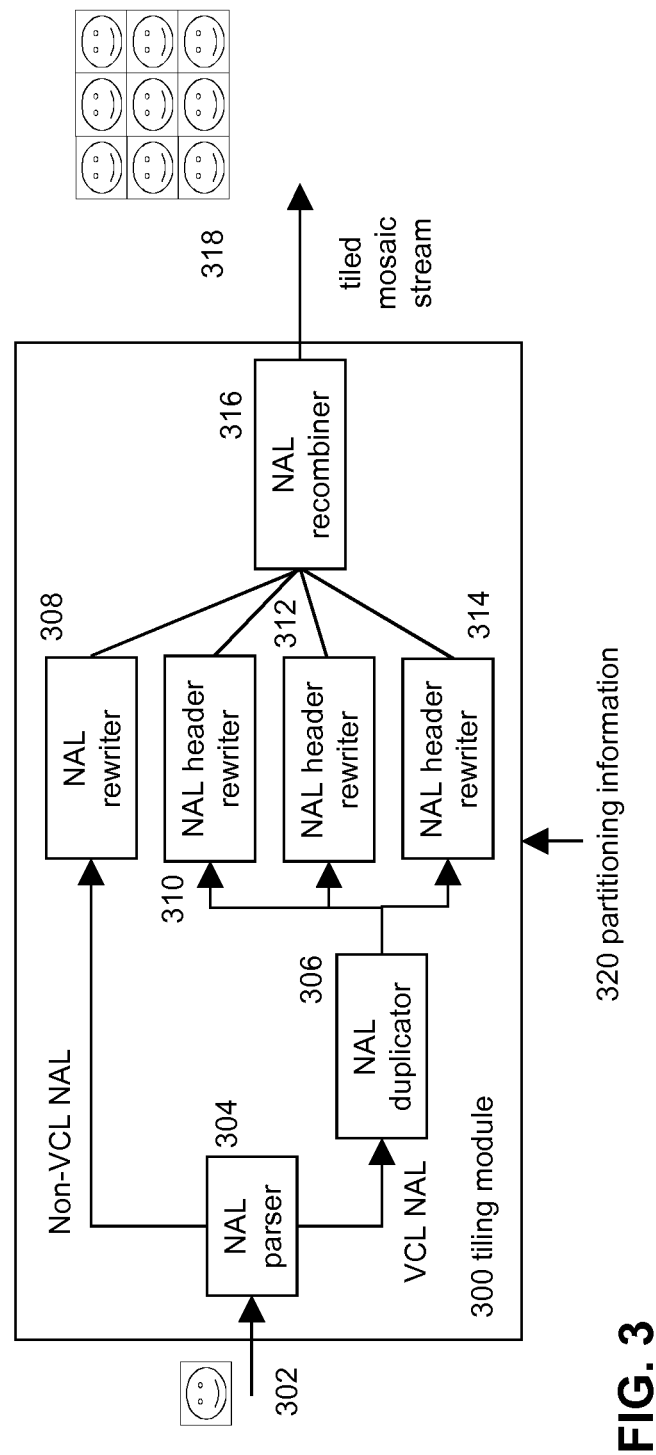
FIG. 3 depicts a tiling module according to another embodiment of the invention.

FIG. 3 depicts a tiling module according to another embodiment of the invention. In this particular embodiment, a NAL parser module 304 may be configured to sort the NAL units of an encoded incoming media stream (the media stream) 302 into two categories: VCL NAL units and non-VCL NAL units. VCL NAL units may be duplicated by a NAL duplicator module 306. The number of copies may be equal to the amount of NAL units that are needed to form a mosaic of a particular grid layout.

The headers of VCL NAL units may be rewritten by NAL rewriter modules 310-314 using the process as described in Sanchez et al. This process may include: rewrite the slice segment header of the incoming NAL units in such a way that the outcoming NAL units belong to the same bitstream but to different tiles corresponding to different regions of the picture. For instance, the first VCL NAL unit in the frame may comprise a flag (first_slice_segment_in_pic_flag) for marking the NAL unit as the first NAL unit in the bitstream pertaining to a particular video frame. Also Non VCL NAL units may be rewritten by a NAL rewriter module 308 following the process as described in Sanchez et al, i.e.: rewrite the Video Parameter Set (VPS) to adapt to the new characteristics of the video. After the rewriting stage, NAL units are recombined by a NAL recombiner module 316 into a bitstream representing a tiled mosaic stream 318. Hence, in this embodiment, the tiling module allows the formation of a tiled mosaic stream, i.e. a media stream comprising tiled video frames, wherein each tile in a tiled video frame represents a visual copy of a video frame of a particular media stream. This enables a faster generation of the tiled mosaic stream. The tile is encoded once and then duplicated n times instead of duplicating the tile n times and then performing the encoding n times. This embodiment provides the benefit that full decoding or re-encoding at the server is not required.

Figure 4:
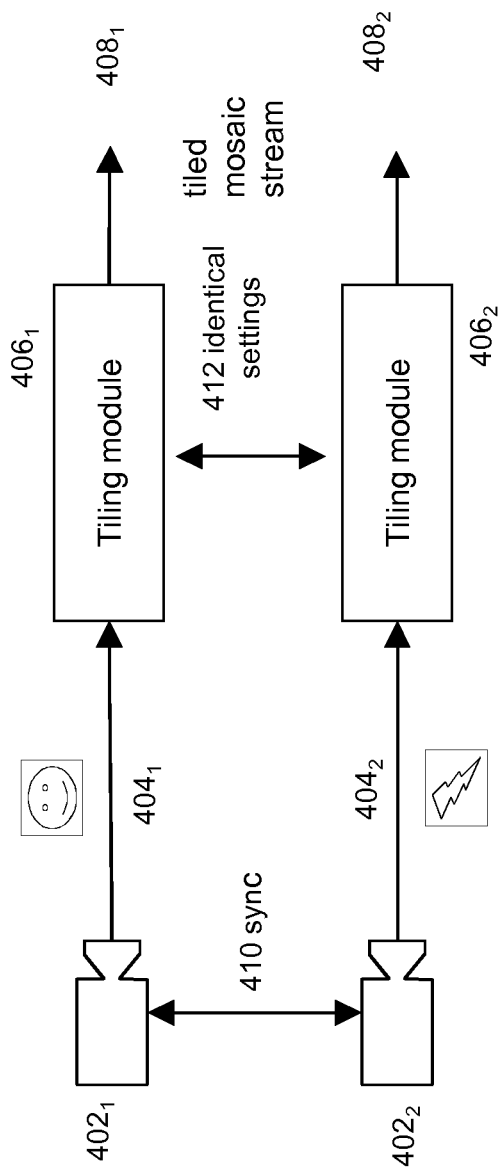
FIG. 4 depicts a system of coordinated tiling modules according to an embodiment of the invention.

FIG. 4 depicts a system of coordinated tiling modules according to an embodiment of the invention. In particular, FIG. 4 describes the coordination that is required when transforming multiple media streams (which is usual the case) into multiple tiled mosaic streams on the basis of multiple tiling modules $406_{1,2}$. In that case, the media sources $402_{1,2}$, e.g. the cameras or content servers, need to be time-synchronized in order to assure that their frame rates are in sync. This type of synchronization is also known as generator locking or gen-locking. When the ingest of media streams from multiple camera is distributed over multiple ingest nodes (e.g. in case of the media streams are processed within a CDN), each ingested stream might be further synchronized by inserting timestamps in it. Distributed timestamping may be achieved by synchronizing the ingest node clocks with a time synchronization protocol 410. This protocol may be a standardized protocol, such as PTP (Precision Time Protocol) or a proprietary time synchronization protocol. When the media sources are gen-locked to each other and the streams timestamped using the same reference clock, all media streams $404_{1,2}$ and associated tiled mosaic streams $408_{1,2}$ are synchronized to each other.

Several alternative solutions are available in case gen-locking of the cameras is not possible. In an embodiment, a transcoder may be placed at the input of the tiling modules $406_{1,2}$ so that the input of each tiling module is gen-locked. The transcoder may be configured to change the frame rate by small fractions, e.g. by incidentally dropping frames or inserting duplicate frames, or by interpolation between frames. This way the tiling modules may gen-locked to each other by gen-locking their transcoders. Such transcoder may also be located at the output of the tiling module instead of the input. Alternatively, if the tiling module has an encoder module that can be gen-locked then the encoder modules of different tiling modules may be gen-locked to each other.

Additionally, the coordinated tiling modules $406_{1,2}$ need to be configured with identical configuration parameters 412, e.g. the number of tiles, frame structure and frame rate. As a consequence, the resulting non-VCL NAL units at the outputs of the different tiling modules should be identical. The configuration of the tiling module may be performed once by manual configuration, or coordinated by a configuration-management solution.

Figure 5:
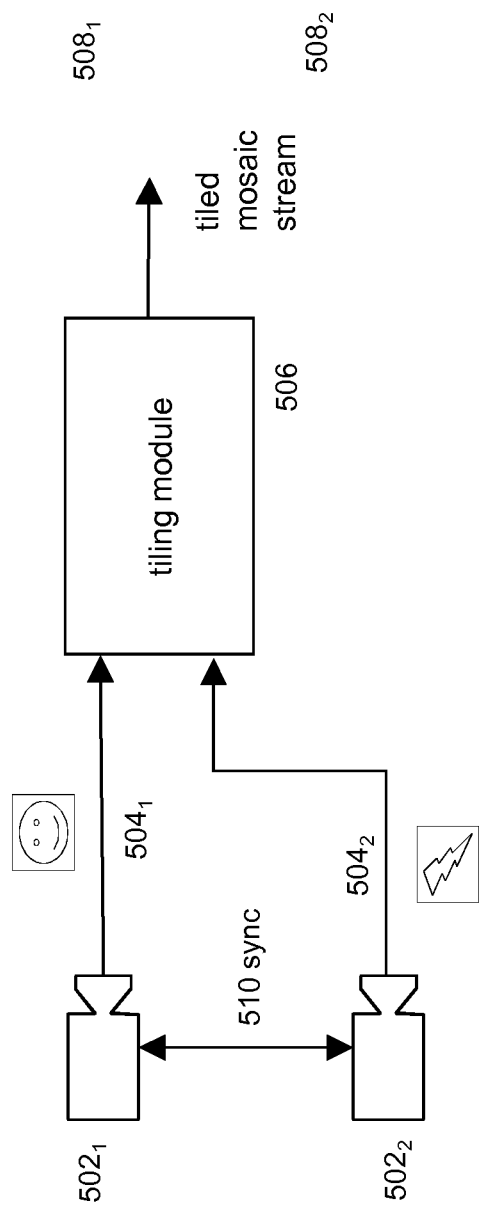
FIG. 5 depicts a use of a tiling module according to yet another embodiment of the invention.

FIG. 5 depicts a use of a tiling module according to yet another embodiment of the invention. In this particular case, at least two (i.e. multiple) media sources $502_{1,2}$ may be time-synchronized in order to assure that their frame rates are in sync when the frames are fed into a tiling module 506. The tiling module may receive the first and second media stream and form a tiled mosaic stream $508_{1,2}$ on the basis of a plurality of media streams. As shown by the tiled mosaic stream example of FIG. 5, the tiles of the tiled video frames of the tiled mosaic stream are either visual copies of video frames of the first or the second media stream respectively. Hence, in this embodiment, the tiles of the tiled video frames comprise visual copies of the media streams that are input to the tiling module.

Figure 6:
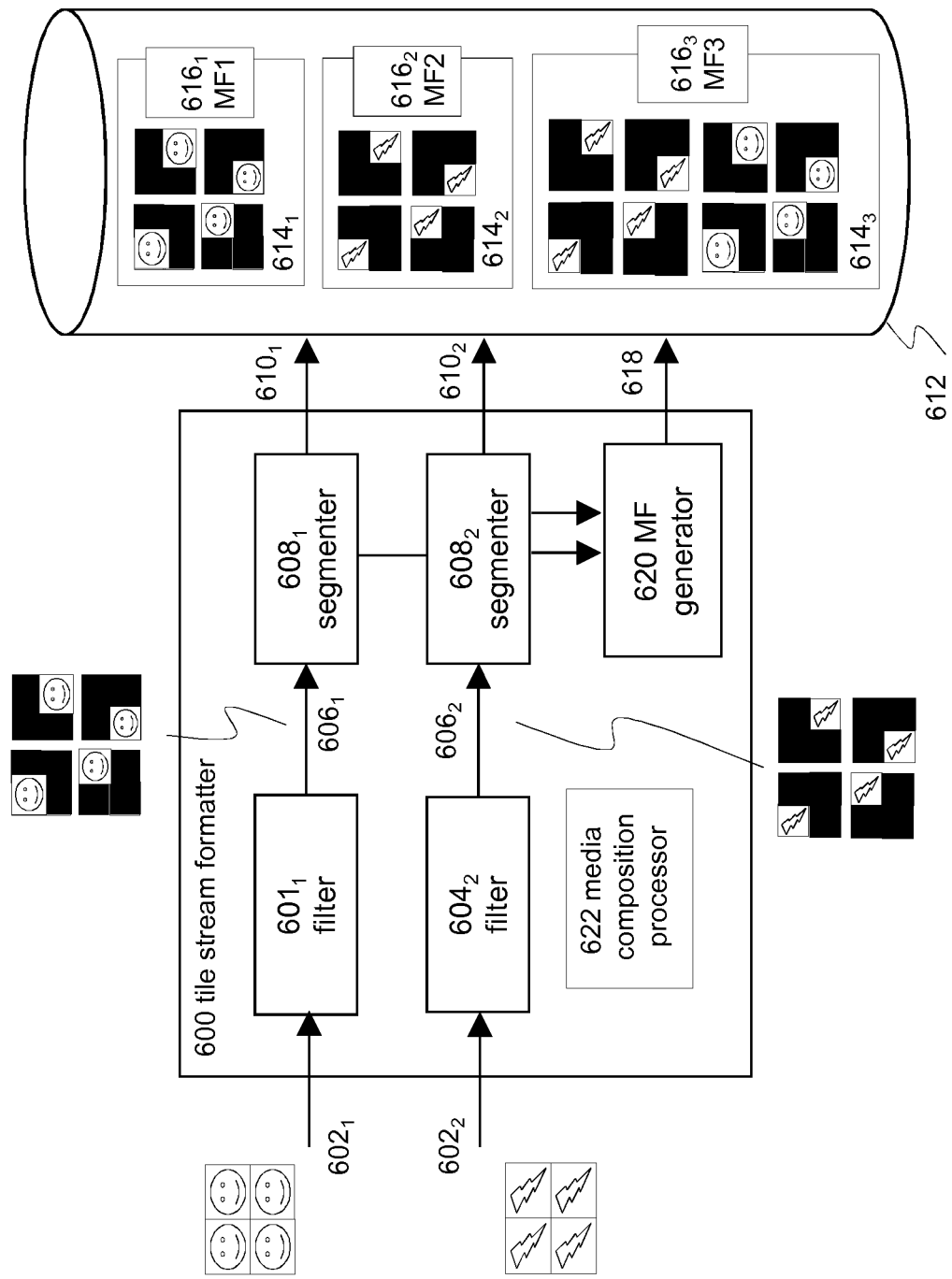
FIG. 6 depicts a tile stream formatter according to an embodiment to invention.

FIG. 6 depicts a tile stream formatter according to an embodiment to invention. As shown in FIG. 6, the tile stream formatter may comprise one or more filter modules $604_{1,2}$ wherein a filter module is configured to receive and parse a tiled mosaic stream $602_{1,2}$ and to extract media data $606_{1,2}$ associated with a particular tile in the tiled video frames out of the tiled mosaic stream. These split media data may be forwarded to a segmenter module $608_{1,2}$ that may structure the media data on the basis of a predetermined media format. As shown in FIG. 6, a set of mosaic tile streams (in this example 4 tile streams) may be generated on the basis of a tiled mosaic stream wherein a mosaic tile stream comprises media data and decoder information for a decoder module, wherein the decoder information may comprise tile position information from which the (required) position of the tile in a tiled video frame (having decoded media data) and the dimensions (size) of the tile can be determined. In case the tile stream is formatted on the basis of NAL units, the decoder information may be stored in non-VCL NAL units and in (the header of) the VCL NAL units.

In the embodiment of FIG. 6, an HTTP-based Adaptive Streaming, abbreviated as HAS, protocol may be used in order to transmit the media data to client devices. Examples of HTTP-based Adaptive Streaming protocols that may be used include Apple HTTP Live Streaming, Microsoft Smooth Streaming, Adobe HTTP Dynamic Streaming, 3GPP-DASH; Progressive Download and Dynamic Adaptive Streaming over HTTP and MPEG Dynamic Adaptive Streaming over HTTP [MPEG DASH ISO/IEC 23009]. These streaming protocols are configured to transfer (usually) temporally segmented media data such as video and/or audio data over HTTP. Such temporally segmented media data is usually referred to as a chunk. A chunk may be referred to as a fragment (which is stored as part of a larger file) or a segment (which is stored as separate files). Chunks may have any playout duration, however typically the duration is between 1 second and 10 seconds. A HAS client device may render a video title by sequentially requesting HAS segments from the network, e.g. a content delivery network (CDN), and process the requested and received chunks such that seamless rendering of the video title is assured.

Hence, the segmenter module may structure media data associated with one tile in the tiled video frames of the tiled mosaic stream into HAS segments $610_{1,2}$. The HAS segments may be stored on a storage medium of a network node 612, e.g. a server, on the basis of a predetermined media format. During the formation and storage of the HAS segments by the segmenter module, one or more manifest files (MF) $616_{1,2}$ may be generated by a manifest file generator 620. For each tile stream, the manifest file may comprise a list of segment identifiers, e.g. one or more URLs or a part thereof. This way, the manifest file may contain information about the set of tile streams that may be used for composing a video mosaic. For each or at least part of the tile streams, the manifest file may comprise tile position descriptors. In an embodiment, in case of an MPEG-DASH compliant manifest file, a Media Presentation Description (MPD), the tile position descriptors have the syntax according to the SRD scheme as defined in the MPEG DASH standard. Examples of MPDs extended with a SRD scheme will be described hereunder in more detail. A client device may use the manifest file to select one or more mosaic tile streams (and their associated HAS segments) from the set of mosaic tile streams that are available to the client device for composing a video mosaic. For example, in an embodiment, a user may interact with a GUI for composing a personalized video mosaic.

As shown in FIG. 6, mosaic tile streams may be stored on the basis of a particular media format on a storage medium. For example, in an embodiment, a set of mosaic tile streams $614_{1,2}$ may be stored as a media data file on the storage medium. Each tile stream may be stored as a track of the data structure wherein tracks can be independently accessed by a client device on the basis of a tile stream identifier. Information on the (spatial) relation between the mosaic tile streams stored in the data structure may be stored in metadata parts of the data structure. Additionally, this information may also be stored in a manifest file $616_{1,2}$ that can be used by a client device. In another embodiment, different sets of mosaic tile streams (wherein each set of tile streams may be formed on the basis of one or more media streams) may be stored on the basis of a media format $614_3$ such that a client device can request a desired selection of mosaic tile streams on the basis of an associated manifest file $616_3$.

The manifest file may further comprise location information (usually part of an URL, e.g. a domain name) for determining the location of network elements, e.g. a media servers or network cache, that are configured to transmit the HAS segments to client devices. (Part of the) segments may be retrieved from a (transparent) cache residing in the network that lies in the path to one of these locations, or from a location that is indicated by a request routing function in the network.

The manifest file generator module 616 may store the manifest files 618 on a storage medium, e.g. a manifest file server or another network element. Alternatively, the manifest files may be stored together with the HAS streams on a storage medium. In case of multiple tiled mosaic streams (which is a typical case) need to be processed as described above then additional coordination of the segmentation process may be required. The segmenter modules may operate in parallel using the same configuration settings, and the manifest file generator would need to generate a manifest file that references segments from the different segmenter modules in the correct way. The coordination of the processes between the different modules in a system as depicted in FIG. 6 may be controlled by a media composition processor 622.

Figure 7A:
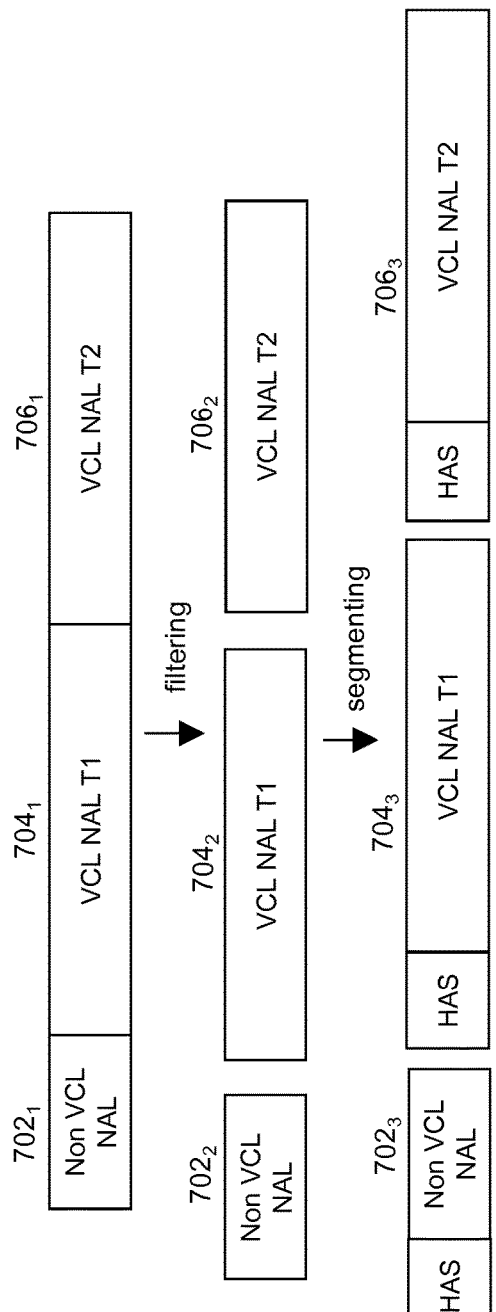

FIG. 7A-7D depict processes for forming tile streams and media formats for storing mosaic tile streams according to various embodiments of the invention. FIG. 7A depicts a process for forming tile streams on the basis of a tiled mosaic stream. In a first step NAL units $702_1,704_1,706_1$ may be extracted from (filtered out of) a tiled mosaic stream and separated into individual NAL units (e.g. non-VCL NAL units $702_2$ (VPS, PPS, SPS) comprising decoder information that is used by the decoder module to set its configuration; and, VCL NAL units $704_2,706_2$ each comprising media data representing a video frame of a tile stream). The header of a slice segment in a VCL NAL unit may comprise tile position information (or slice position information as one slice contains one tile) defining the position of the tile (slice) in a video frame.

The thus selected NAL unit or collection of NAL units may be formatted into segments as defined by an HTTP Adaptive Streaming (HAS) protocol. For example, as shown in FIG. 7A, a first HAS segment $702_3$ may comprise a non-VCL NAL unit, a second HAS segment $702_3$ may comprise VCL NAL units of a tile T1 associated with a first position and a third HAS segment $702_3$ may comprise VCL NAL units of tile T2 associated with a second tile position. By filtering NAL units associated with one particular tile at a predetermined tile position and segmenting these NAL units in one or more HAS segments, a HAS formatted tile stream may be formed associated with a tile of a predetermined tile position. Generally, a HAS segment may be formatted on the basis of a suitable media container, e.g. MPEG 2 TS, ISO BMFF or WebM, and sent to a client device as payload of an HTTP response message. The media container may comprise all information that is needed to reconstruct the payload. In an embodiment, the payload of a HAS segment may be a single NAL unit or a plurality of NAL units. Alternatively, the HTTP response message may comprise one or more NAL units without any media container.

Hence, in contrast with the solution described in Sanchez et. al., which interferes with the encoded stream in the sense that both non-VCL-NAL (the Video Parameter Set, VPS, which is a non-VCL NAL) and VCL-NAL headers (the slice segment headers), need to be rewritten, the solution as depicted in FIG. 7A leaves the content of the NAL units unchanged.

Figure 7B:
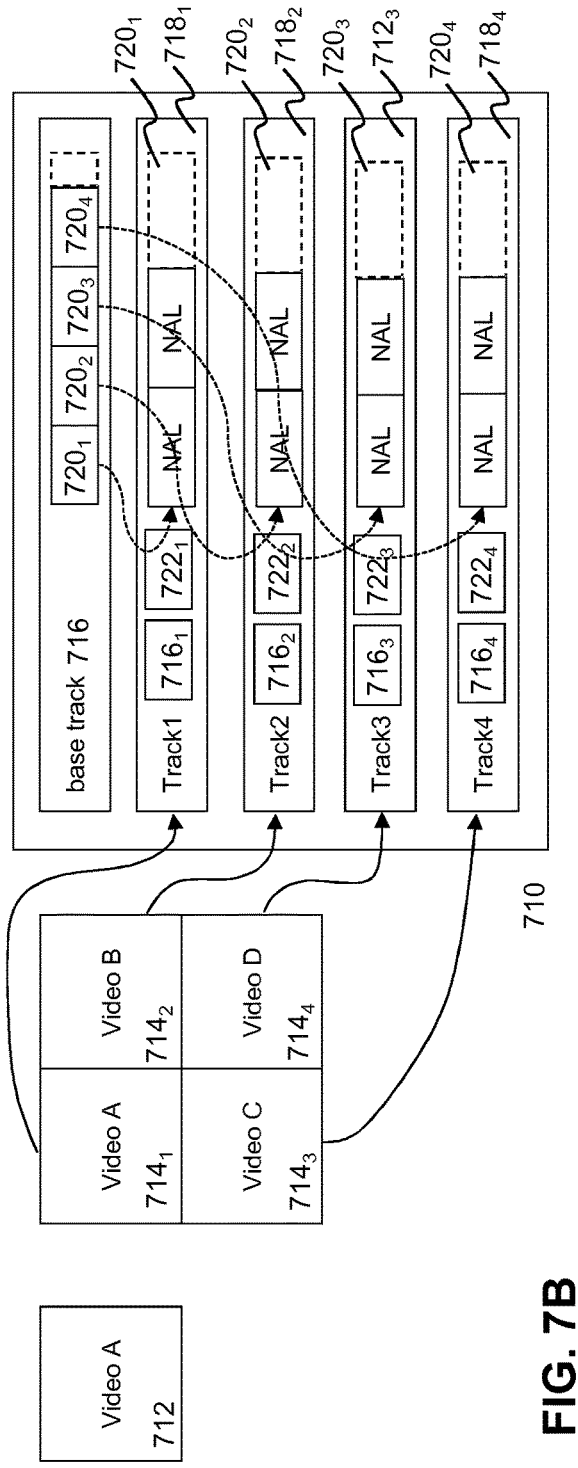

FIG. 7B depicts a media format (a data structure) for storing a set of mosaic tile streams according to an embodiment of the invention. In particular, FIG. 7B depicts an HEVC media format for storing mosaic tile streams that may be generated on the basis of a tiled video mosaic media stream comprising video frames comprising a plurality—in this case four—tiles $714_{1-4}$. The media data associated with individual tiles may be filtered and segmented in accordance with the process as described with reference to FIG. 7A. Thereafter, the segments of the tile streams may be stored in a data structure that allows access to media data of individual tile streams. In an embodiment, the media format may be an HEVC file format 710 as defined in ISO/IEC 14496-15 or an equivalent thereof. The media format depicted in FIG. 7B may be used for storing media data of tile streams as a set of "tracks" such that a client device in a media device may request transmission of only a subset of the tile streams, e.g. a single tile stream or a plurality of tile streams. The media format allows a client device to individually access a tile stream, e.g. on the basis of its tile stream identifier (e.g. a file name or the like) without necessary to request all tile streams of the video mosaic. The tile stream identifiers may be provided to a client device using a manifest file. As shown in FIG. 7B, the media format may comprise one or more tile tracks $718_{1-4}$, wherein each tile track serves as a container for media data $720_{1-4}$, e.g. VCL and non-VCL NAL units, of a tile stream.

In an embodiment, a track may further comprise tile position information $716_{1-4}$. The tile position information of a track may be stored in tile-related box of the corresponding file format. The decoder module may use the tile position information in order to initialise the layout of the mosaic. In an embodiment, tile position information in a track may comprise an origin and size information in order to allow the decoder module to visually position a tile in a reference space, typically the space defined by the pixel coordinates of the luminance component of the video, wherein a position in the space may be determined by a coordinate system associated with the full image. During the decoding process, the decoder module will preferably use the tile information from the encoded bitstream in order to decode the bitstream.

In an embodiment, a track may further comprise a track index $722_{1-4}$. The track index provides a track identification number that may be used for identifying media data associated with a particular track.

The media format depicted in FIG. 7B may further comprise a so-called base track 716. The base track may comprise sequence information allowing a media engine in a media device to determine the sequence (the order) of VCL NAL units received by a client device when requesting a particular tile stream. In particular, the base track may comprise extractors $720_{1-4}$, wherein an extractor comprises a pointer to the media data, e.g. NAL units, in one or more corresponding tile tracks.

An extractor may be an extractor as defined in ISO/IEC 14496-15:2014. Such extractor may be associated with one or more extractor parameters allowing a media engine to determine the relation between an extractor, a track and media data in a track. In ISO/IEC 14496-15:2014 reference is made to the track_ref_index, sample_offset, data_offset and data_length parameter wherein the track_ref_index parameter may be used as a track reference for finding the track from which media data need to be extracted, the sample_offset parameter may provide the relative index of the media data in the track that is used as the source of information, the data_offset parameter provide offset of the first byte within the reference media data to copy (if the extraction starts with the first byte of data in that sample, the offset takes the value 0. The offset signals the beginning of a NAL unit length field) and the data_length parameter provides the number of bytes to copy (if this field takes the value 0, then the entire single referenced NAL unit is copied (i.e. the length to copy is taken from the length field referenced by the data offset)).

Extractors in the base track may be parsed by a media engine and used in order to identify NAL units, in particular NAL units comprising media data (audio video and/or text data) in VCL NAL units of a tile track to which it refers. Hence, a sequence of extractors allows the media engine in the media device to identify and order NAL units as defined by the sequence of extractors and to generate a compliant bitstream that is offered to the input of a decoder module.

A video mosaic may be formed by requesting media data from one or more tile tracks (representing a tile stream associated with a particular tile position) and a base track as identified in a manifest file and by ordering the NAL units of the tile streams on the basis of the sequence information, in particular the extractors, in order to form a bitstream for the decoder module. Not all tile positions in the tiled video frames of a video mosaic need to contain visual content. If a particular video mosaic does not require visual content at a particular tile position in the tiled video frames, the media engine may simply ignore the extractor corresponding to that tile position.

For example in the example of FIG. 7B, when a client device selects a tile stream A and B for forming a video mosaic, it may request the base stream and tile streams 1 and 2. The media engine may use the extractors in the base stream that refer to the media data of tile track 1 and tile track 2 in order to form a bitstream for the decoder module. The absence of media data of tile streams C and D may be interpreted by the decoder module as "missing data". Since the media data in the tracks (each track comprising media data of one tile stream) are independently decodable, the absence of media data from one or more tracks does not prevent the decoder module from decoding media data of tracks that can be retrieved.

FIG. 7C schematically depicts an example of a manifest file according to an embodiment of the invention. In particular, FIG. 7C depicts an MPD defining a plurality of AdaptationSets $740_{2-5}$ elements defining a plurality of tile streams (in this example four HEVC tile streams). Here, an AdaptationSet may be associated with a particular media content e.g. video A,B,C or D. Further, each AdaptationSet may further comprise one or more Representations, i.e. one or more coding and/or quality variants of the media content that is linked to the AdaptationSet. Hence, a representation in an AdaptationSet may define a tile stream on the basis of a tile stream identifier, e.g. part of an URL, which may be used by the client device to request segments of a tile stream from a network node. In the example of FIG. 7C, each of the for Adaptation Sets comprise one representation (representing on tile stream associated with a particular tile position so that the tile streams may form the following video mosaic:

| | |
|---|---|
| Tile 1: video A | Tile 2: video B |
| Tile 3: video C | Tile 4: video D |

The tile streams may be stored on a network node using a HEVC media format as described with reference to FIG. 7B.

The tile position descriptors in the MPD may be formatted as one or more spatial relationship description (SRD) descriptors $742_{1-5}$. An SRD descriptor may be used as an EssentialProperty element (information that is required to be understood by the client device when processing a descriptor) or a SupplementalProperty element (information that may be discarded by a client device that does not know the descriptor when processing it) in order to inform the client device that a certain spatial relationship exists between the different video elements defined in the manifest file. In an embodiment, the spatial relationship descriptor with schemeIdUri "urn:mpeg:dash:srd:2014" may be used as a data structure for formatting the tile position descriptors.

The tile position descriptors may be defined on the basis of the value parameter in the SRD descriptor, which may comprise a sequence of parameters including a source_id parameter that links video elements that have a spatial relationship with each other. For example, in FIG. 7C the source_id in each SRD descriptor is set to the value "1" indicating that these Adaptation Sets form one set of tile streams that have a predetermined spatial relationship. The source_id parameter may be followed by tile position parameters x,y,w,h that may define the position of a video element (a tile) in the image region of a video frame. From these coordinates also the dimensions (size) of the tile may be determined. Here, the coordinate values x,y may define the origin of the subregion (the tile) in the image region of the video frames and the dimension values w and h may define the width and height of the tile. The tile position parameters may be expressed in a given arbitrary unit, e.g. pixel units. A client device may use the information in the MPD, in particular the information in the SRD descriptors, in order to generate a GUI that allows a user to compose a video mosaic on the basis of the tile streams defined in the MPD.

The tile position parameters x,y,w,h,W,H in the SRD descriptor $742_1$ of the first AdaptationSet $740_1$ are set to zero, thereby signaling the client device that this AdaptationSet does not define visual content, but to a base track comprising a sequence of extractors that refer to media data in tracks as defined in the other AdaptationSets $740_{2-5}$ (in a similar way as described with reference to FIG. 7B).

Decoding a tile stream may require metadata that the decoder needs to decode the visual samples of the tile stream. Such metadata may include information on the tile grid (the number of tiles and/or the dimensions of the tiles), the video resolution (or more generally all non-VCL NAL unit, namely PPS, SPS and VPS), the order in which VCL NAL units need to be concatenated in order to form a decoder compliant bitstream (using e.g. extractors etc. as described elsewhere in this disclosure) In case metadata are not present in the tile stream itself (e.g. via an initialization segment), the tile stream may depend on a base stream comprising the metadata. The dependency of the tile stream on the base stream may be signaled to the DASH client via a metadata dependency parameter. The metadata dependency parameter (in MPEG DASH the dependencyId parameter) may link the base stream to one or more tile streams.

The Representations defined in AdaptationSets $740_{2-5}$ comprise a dependencyId parameter $744_{2-5}$ (dependencyId="mosaic-base") that refers back to the Representation id="mosaic-base" in AdaptationSet $740_1$ which defines a so-called base track $746_1$ comprising metadata that are needed for decoding a representation (a tile stream). One of the use cases of the dependencyId in the MPEG DASH specification is to signal coding dependency of representations within an Adaptation Set to a client device. For instance, Scalable Video Coding with inter layer dependency was one example.

In the embodiment of FIG. 7C the use of the dependencyId attribute or parameter is to signal the client device that representations in the manifest file (i.e. different adaptation sets in the manifest file) are dependent representations, i.e. representations that needs an associated base stream comprising metadata for decoding and playout these representations.

The dependencyId attribute in the example of FIG. 7C may thus signal a client device that multiple representations in multiple adaptation sets (each associated with a particular content) may be dependent on metadata which may be stored as one or more base tracks on a storage medium and which may be transmitted as one or more base streams to a client device. The media data of the dependent representations in these different adaptation sets may depend on the same base track. Hence, when a dependent representation is requested, the client may be triggered to search for the base track with corresponding ID in the manifest file.

The dependencyId attribute may further signal a client device that when a number of different tile streams with the same dependencyId attribute are requested that in that case, the media data associated with these tile streams should be buffered, processed into a decoder compliant bitstream and decoded by one decoder module (one decoder instance) into a sequence of tiled video frames for playout.

When receiving media data of tile streams and metadata of an associated base stream (e.g. tile streams that have dependencyId attribute pointing to adaption set defining the base stream), the media engine may parse the extractors in the base track. Each extractor may be linked to a VCL NAL unit, so the sequence of extractors may be used to identify VCL NAL units of the requested tile streams (as defined in the tracks $746_{2-4}$), order them and concatenate the payload of the ordered NAL units into a bitstream (e.g. HEVC compliant bitstream) comprising metadata, e.g. tile position information, that a decoder module needs for decoding the bitstream into tiled video frames that may be rendered as a video mosaic on one or more display devices.

The dependencyID attribute thus links the base stream with tile streams on representation level. Hence, in an MPD the base stream comprising metadata may be described as an adaptation set comprising a representation associated with a representation id and the tile streams comprising media data may be described as adaptation sets wherein different adaptation sets may originate from different content sources (different encoding processes). Each adaptation set may comprise at least one representation and an associated depdendencyId attribute that refers to the representation id of the base stream.

Within the context of tiled media streams, there may be other types of decoding (in)dependencies. For example, decoding dependency of media data across tile boundaries over two different frames. In that case, decoding media data of one tile may require media data of other tiles at other positions (e.g. media data at neighbouring tiles). In this disclosure however, unless specified otherwise, tiled media streams and associated tile streams are independently encoded which means that the media data of a tile in a video frame can be decoded by the decoder without the need of media data of tiles on other tile position.

Instead of extending the functionality of the dependencyId attribute in the way as described above, a new baseTrackdependencyId attribute may be defined for explicitly signaling a client device that a requested representation is dependent on metadata in a base track that is defined somewhere else (e.g. in another adaptation set) in the manifest. The baseTrackdependencyId attribute will trigger searching for one or more base tracks with a corresponding identifier throughout the collection of representations in the manifest file. In an embodiment, baseTrackdependencyId attribute is for signaling if a base track is required for decoding a representation, which base track is not located in the same adaptation set as the representation requested.

The above-described SRD information in the MPD may offer a content author the ability to describe a certain spatial relationship between different tile streams. The SRD information may help the client device to select a desired spatial composition of tile streams. However, a client device that supports SRD is not bound to compose the rendered view as the content author describes the media content. The MPD of FIG. 7C may comprise a particular mosaic composition that is requested by the client device. This process will be discussed hereunder in more detail. For example, the MPD may define a video mosaic as described with reference to FIG. 7B. In that case the MPD of FIG. 7C comprises four Adaptation Sets, each referring to a tile stream representing (audio)visual content and a particular tile position.

Figure 7D:
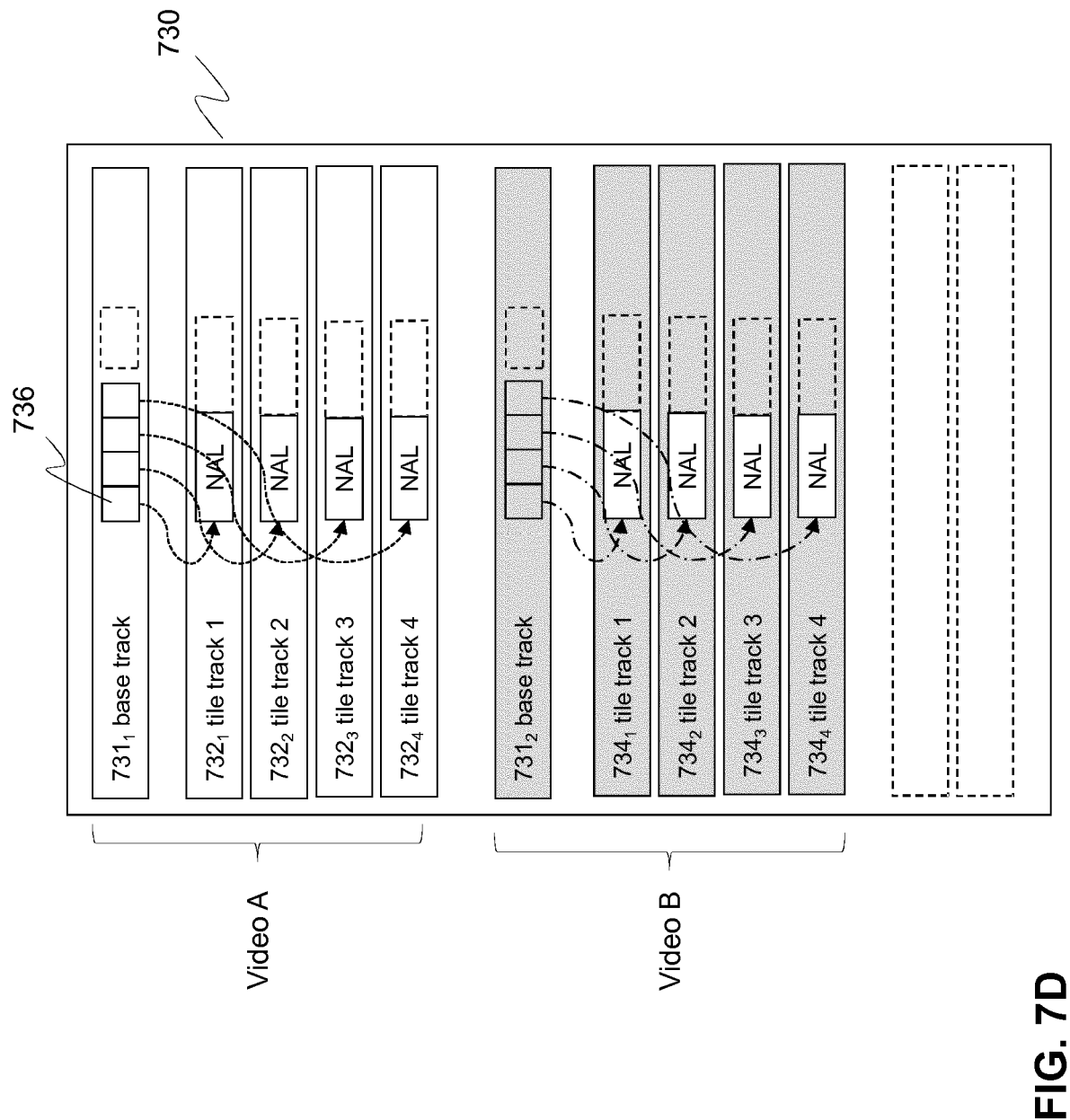

In order to allow client devices to more flexibility to select tile streams from different media sources, the media composition processor 622 may combine mosaic tile streams originating from different media sources (originating from different encoders) and store them in a predetermined data structure (media format). For example, in an embodiment, it may combine (part of) a first data structure $614_1$ comprising a first set of tile tracks and a first base track (and associated first manifest file $616_1$) and (part of) a second data structure $614_2$ comprising a second set of tile tracks and a second base track (and associated with a second manifest file $616_2$) (each having a media format that is similar to the one depicted in FIG. 7B) into a single data structure $614_3$ (and associated manifest file $616_3$) as depicted FIG. 6. Such data structure may have a media format that is schematically depicted in FIG. 7D.

In an embodiment, the media composition processor 622 of the tile stream formatter 600 of FIG. 6 may combine tile streams of different video mosaics into a new data structure 730. For example, the tile stream formatter may produce a data structure comprising a set of tile steams $732_{1-4}$ originating from a first HEVC media format and a set of tile streams $734_{1-4}$ originating from a second HEVC media format. Each set may be associated with a base track $731_{1,2}$.

As already described above, the tile track to which an extractor belongs may be determined on the basis of an extractor parameter that identifies a particular track to which it refers to. In particular, the track_ref_index parameter or an equivalent thereof, may be used as a track reference for finding the track and the associated media data, in particular NAL units, of a tile track. For example, on the basis of the track parameters described with reference to FIG. 7B, the extractor parameters of the extractor that refer to the four tile tracks depicted in FIG. 7B may look like EX1=(1,0,0,0), EXT2=(2,0,0,0), EXT3=(3,0,0,0) and EXT4=(4,0,0,0), wherein the values 1-4 are indexes of the HEVC tile track as defined by the track_ref_index parameter. Further, in the simplest case there is no sample offset when extracting the tiles, no data offset and the extractor instructs the media engine to copy the entire NAL unit.

Figure 8:
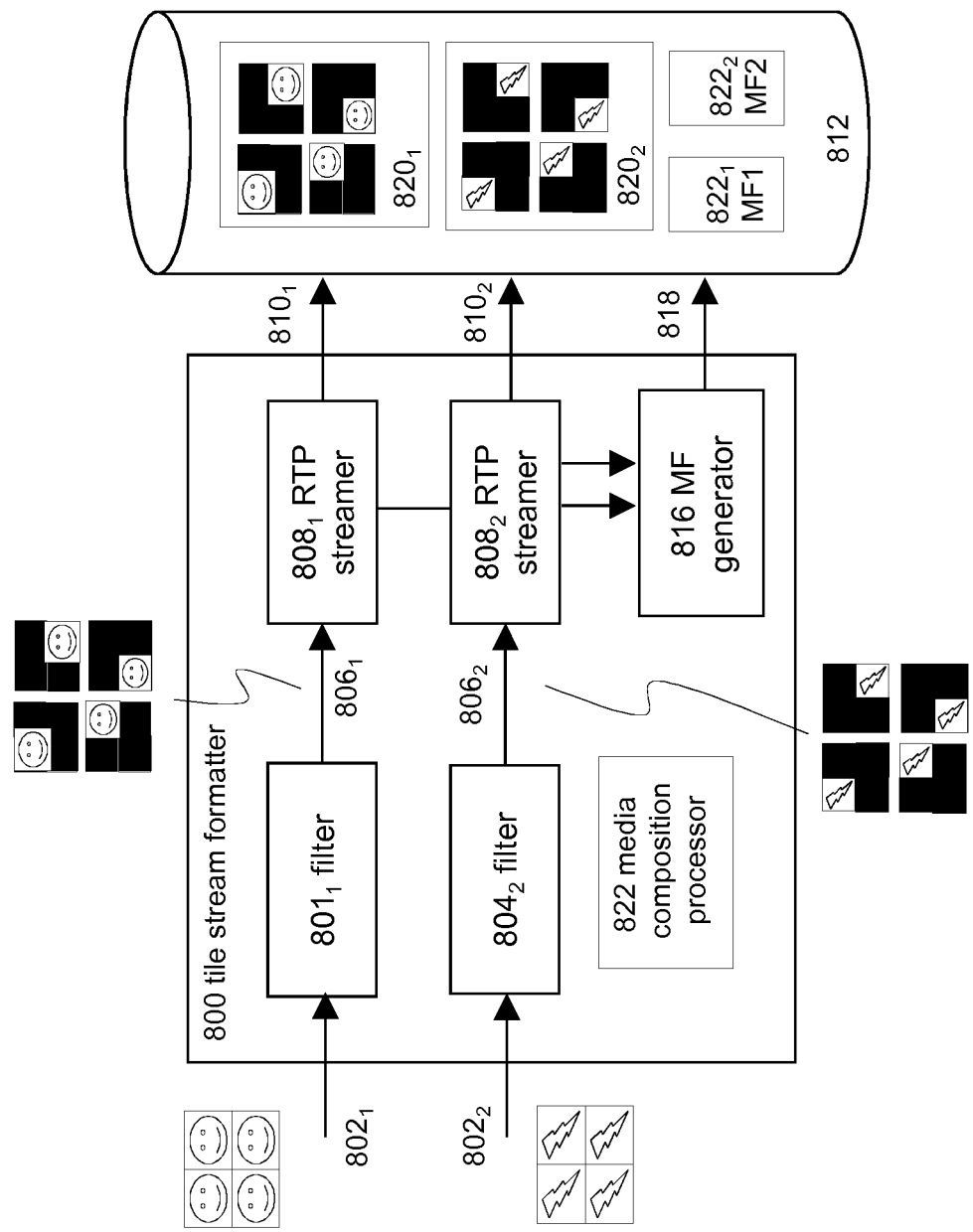
FIG. 8 depicts a tile stream formatter according to another embodiment to invention.

FIG. 8 depicts a tile stream formatter according to another embodiment to invention. In particular, FIG. 8 depicts a tile stream formatter for generating RTP mosaic tile streams on the basis of at least one tiled mosaic stream as described with reference to FIG. 2-5. The stream formatter may comprise one or more filter modules $804_{1,2}$ wherein a filter module may be configured to receive a tiled mosaic stream $802_{1,2}$ and filter media data $806_{1,2}$ associated with a particular tile in the tiled video frames of the tiled mosaic stream. These media data may be forwarded to a RTP streamer $808_{1,2}$ that may structure the media data on the basis of a predetermined media format. In the embodiment of FIG. 8, the filtered media data may be formatted into RTP tile streams $810_{1,2}$ by a RTP streamer module $808_{1,2}$. The RTP streams $820_{1,2}$ may be cached by a storage medium 812, e.g. a multicast router that is configured to multicast RTP streams to groups of client devices.

A manifest file generator 816 may generate one or more manifest files $822_{1,2}$ comprising tile stream identifiers for identifying the RTP tile streams. In an embodiment, a tile stream identifier may be an RTSP URL (e.g. rtsp://example-.com/mosaic-videoA1.mp4/). A client device may comprise an RTSP client, and initiate a unicast RTP stream by sending out an RTSP SETUP message using the RTSP URL. Alternatively, a tile stream identifier may be an IP multicast address to which the tile stream is multicast. A client device may join the IP multicast and receive the multicast RTP stream by using the IGMP or MLP protocols. A manifest file may further comprise metadata on the tile stream, e.g. tile position descriptors, tile size information, quality level of the media data, etc.

Additionally, the manifest file may comprise sequence information for enabling a media engine to determine a sequence of NAL units from the selected RTP tile streams in order to form a bitstream that is provided to the input of a decoder module. Alternatively, sequence information may be determined by the media engine. For example, the HEVC specification mandates that the HEVC tiles of a tiled video frame in a compliant HEVC bitstream are ordered in a raster scan order. In other words, HEVC tiles associated with one tiled video frame are ordered in a bitstream starting from the top-left tile to the bottom-right tile following a row-by-row, left to right order. The media engine may use this information in order to form tiled video frames.

Coordination between the RTP streamer modules in the system of FIG. 8 may be required to make sure that they operate properly in sync so that corresponding frames from different intermediate video streams are correctly encapsulated into parallel RTP tile streams. Coordination may be achieved by providing corresponding frames the same RTP timestamp using a known timestamp technique. RTP timestamps from different media streams may advance at different rates and usually have independent, random offsets. Hence, although RTP timestamps may be sufficient to reconstruct the timing of a single stream, direct comparison of RTP timestamps from different media streams is not effective for synchronization. Instead, for each stream RTP timestamps may be related to the sampling instant by pairing it with a timestamp from a reference clock (wall clock) that represents the time when the data corresponding to the RTP timestamp was sampled. The reference clock may be shared by all streams that need to be synchronized. In another embodiment, one or more manifest files may be generated that enable a client device to keep track of RTP timestamps and the relation between the RTP timestamps and the different RTP tile streams. The coordination between the different modules in the system of FIG. 8 may be controlled by a media composition processor 822.

Figure 9:
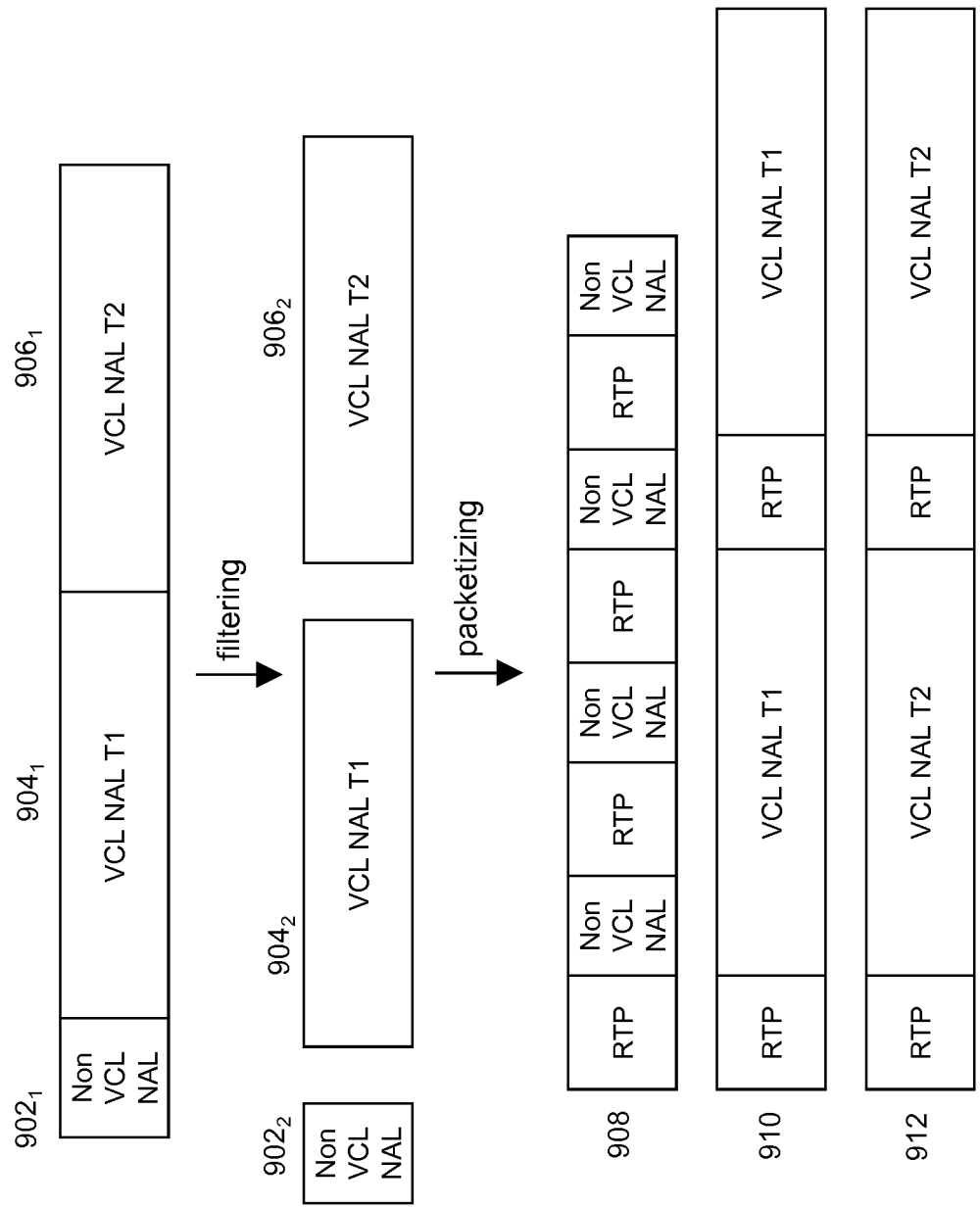
FIG. 9 depicts the formation of RTP tile streams according to an embodiment of the invention.

FIG. 9 depicts the formation of RTP tile streams according to an embodiment of the invention. As shown in FIG. 9, NAL units $902_1,904_1,906_1$ of a tiled video stream are filtered and separated into separate NAL units, i.e. non-VCL NAL units $902_2$ (VPS, PPS, SPS), comprising metadata that is used by the decoder module to set its configuration; and, VCL-NAL units $904_2,906_2$ wherein each VCL NAL unit carries a tile and wherein the headers of the slices in each VCL NAL unit comprise slice position information, i.e. information regarding the position of the slice in a frame, which coincides with the position of the tile in the case of one tile per slice.

Thereafter, the VCL NAL units may be provided to an RTP streamer module, which is configured to packetize NAL units, each comprising media data of one tile, into RTP packets of an RTP tile stream 910,912. For example, as shown in FIG. 9, VCL NAL units associated with a first tile T1 are multiplexed in a first RTP stream 910 and VCL NAL units associated with a second tile T2 are multiplexed in a second RPT stream 912. Similarly, non-VCL NAL units are multiplexed into one or more RTP streams 908 comprising RTP packets having non-VCL NAL units as its payload. This way, RTP tile streams may be formed wherein each RTP tile stream is associated with a particular tile position, e.g. RTP tile stream 910 may comprise media data associated with a tile T1 at a first tile position and RTP tile stream 912 may comprise media data associated with a tile T2 at a second tile position.

The headers of the RTP packets may comprise an RTP timestamp representing a time that monotonically and linearly increases in time so that it can be used for synchronization purposes. The headers of RTP packets may further comprise a sequence number that can be used to detect packet loss.

Figure 10A:
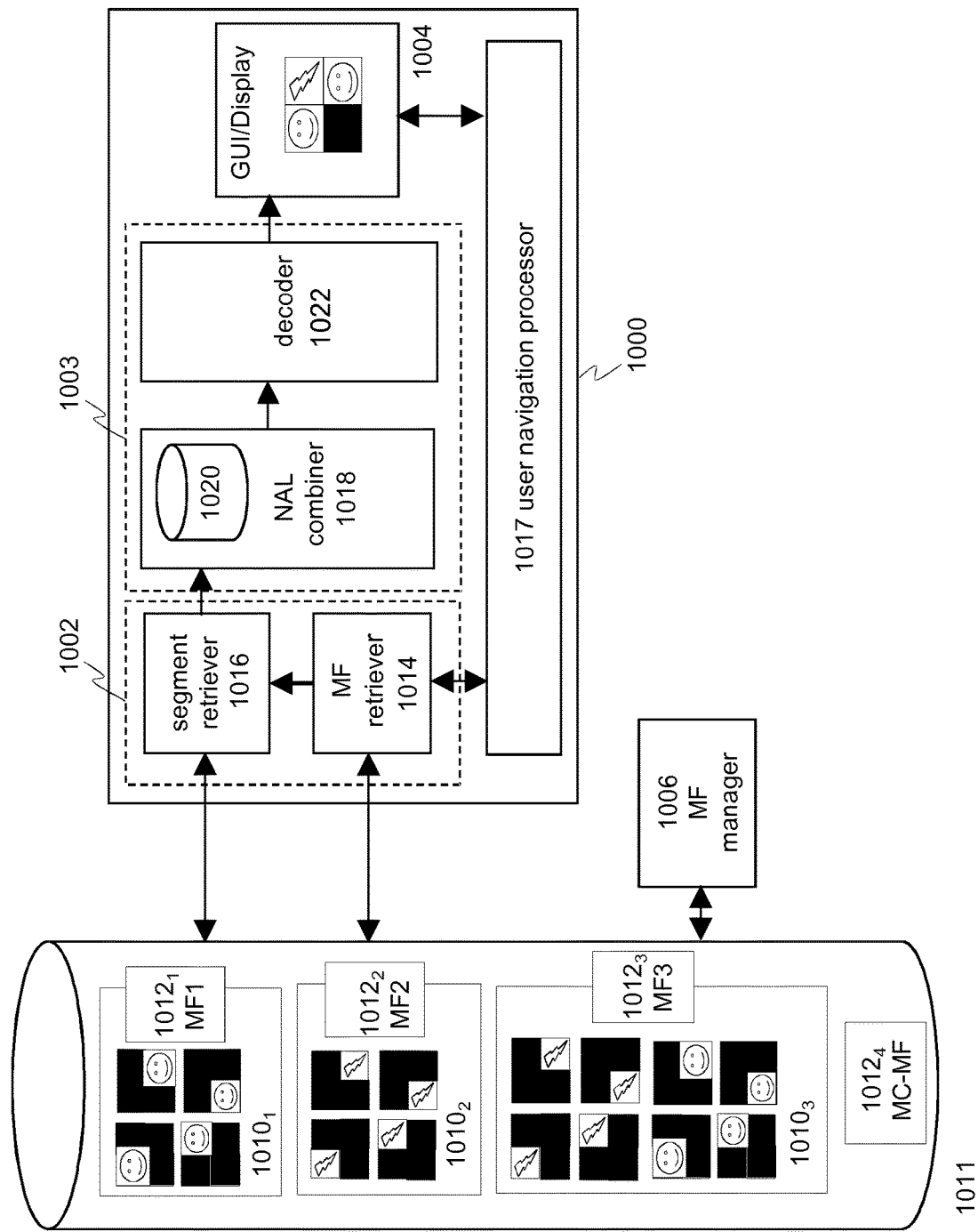
FIG. 10A-10C depict a media device configured for rendering a video mosaic on the basis of a manifest file according an embodiment of the invention.
Figure 10B:
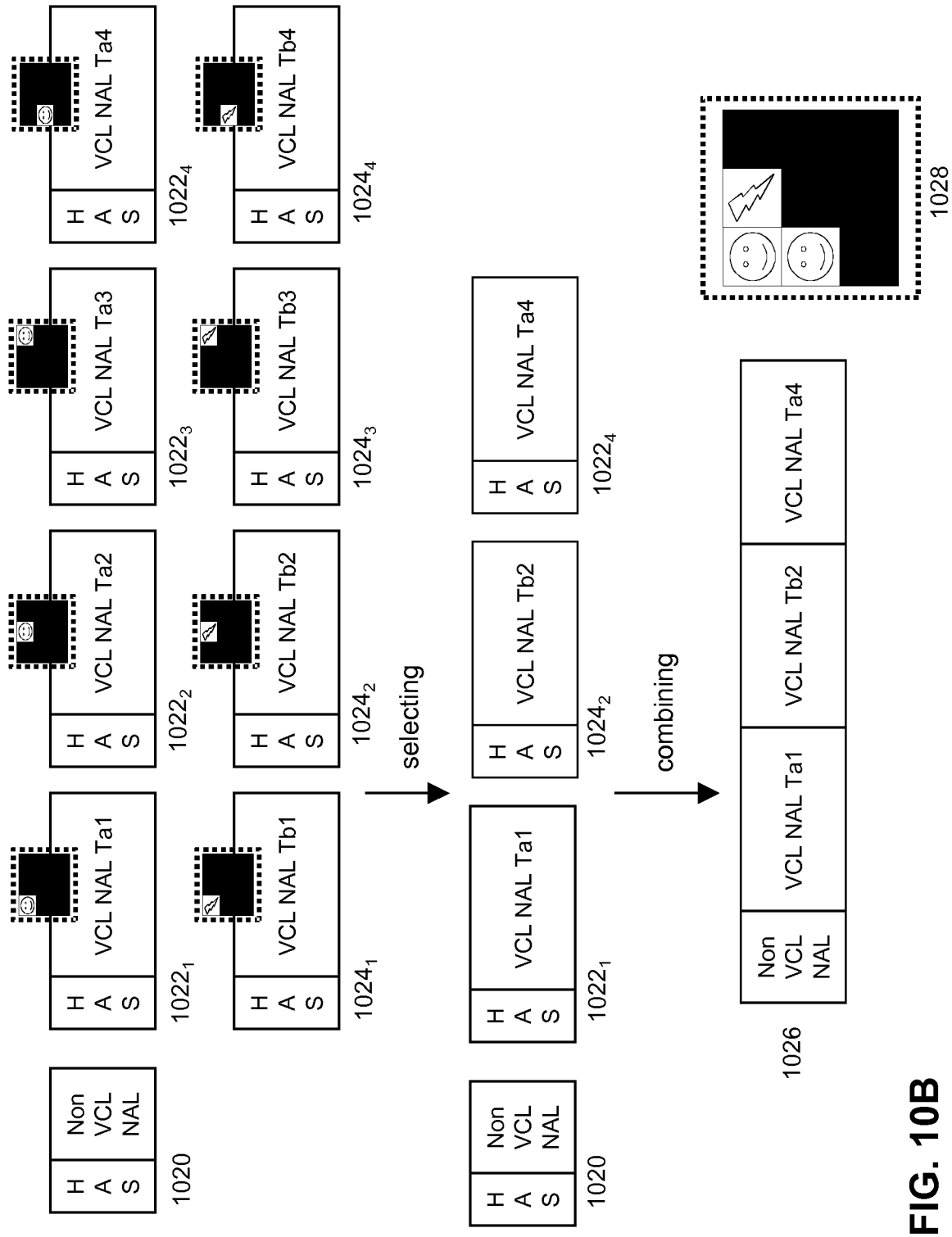
Figure 10C:
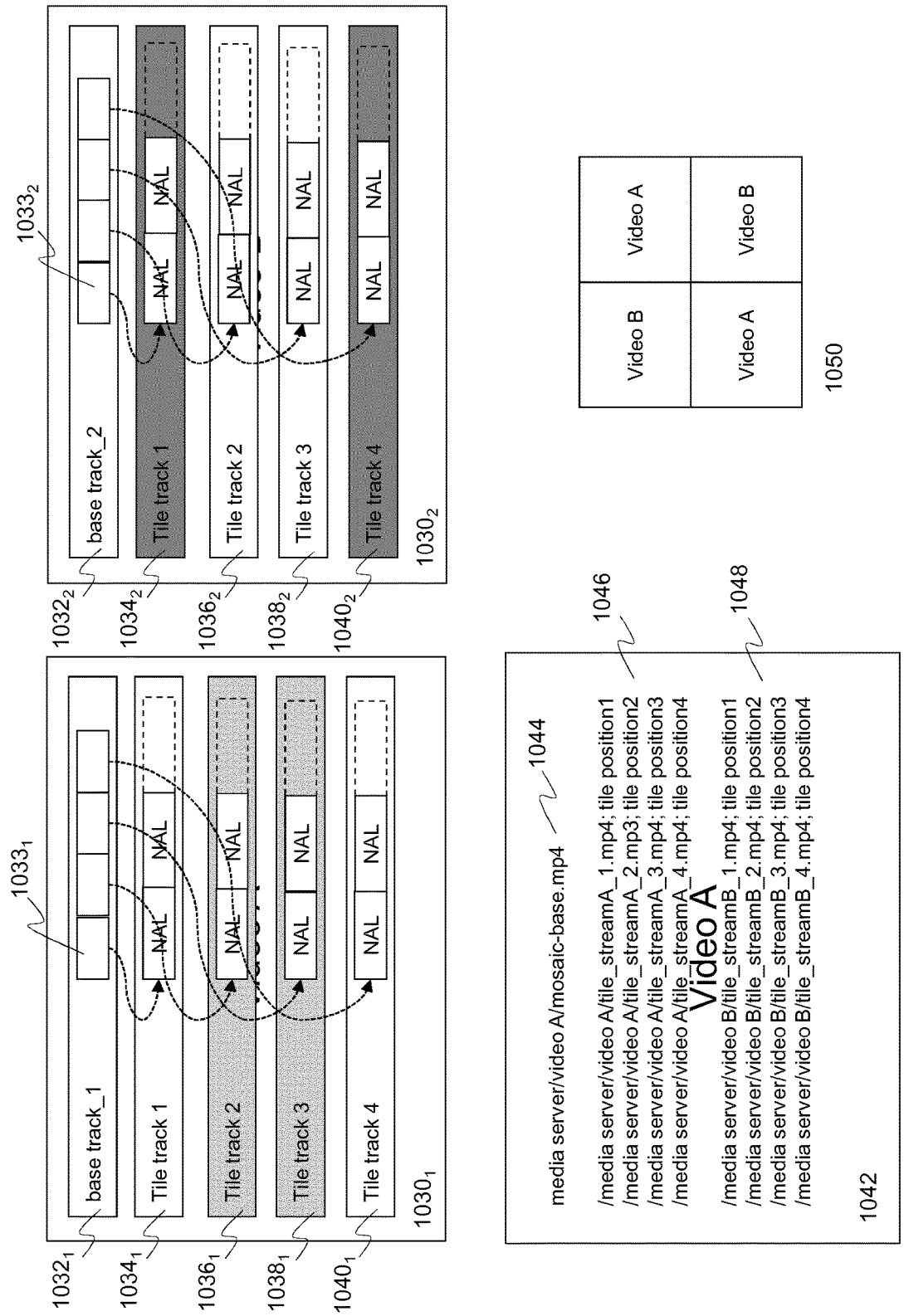

FIG. 10A-10C depict a media device configured for rendering a video mosaic on the basis of a manifest file according to an embodiment of the invention. In particular, FIG. 10A depicts a media device 1000 comprising a HAS client device 1002 for requesting and receiving HAS segmented tile streams and a media engine 1003 comprising a NAL combiner 1018 for combining NAL units of different tile streams into a bitstream and a decoder 1022 for decoding the bitstream into tiled video frames. The media engine may send video frames to a video buffer (not shown) for rendering the video on a display 1004 associated with the media device.

A user navigation processor 1017 may allow the user to interact with a graphical user interface (GUI) for selecting a one or more mosaic tile streams from a plurality of mosaic tile streams which may be stored as HAS segments $1010_{1-3}$ on a storage medium of network node 1011. The tile streams may be stored as independently accessible tile tracks. A base track comprising metadata enable the media engine to construct a bitstream for a decoder on the basis of media data that are stored as tile tracks (as described in detail with reference to FIG. 7A-7C). As will be described hereunder in more detail, the client device may be configured to request and receive (buffer) the metadata of the base track and the media data of the selected mosaic tile streams. The media data and metadata are used by the media engine in order to combine the media data of the selected mosaic tile streams, in particular the NAL units of the tile streams, on the basis of the information in the base track into a bitstream for input to a decoder module 1022.

A manifest file retriever 1014 of the client device may be activated, e.g. by a user interacting with the GUI, to send a request to a network node that is configured to provide the client device with at least one manifest file which can be used by the client to retrieve the tile streams of a desired video mosaic. Alternatively, in another embodiment, a manifest file may be sent (pushed) via a separate communication channel (not shown) to the client device. For example, in an embodiment, a (bidirectional) Websocket communication channel between the client device and the network node may be formed which can be used for transmitting a manifest file to the client device.

A manifest file (MF) manager 1006 may control the distribution of a manifest file to client devices. A manifest file (MF) manager that is configured to administer manifest files $1012_{1-4}$ of tile streams that are stored on the storage medium of the network node 1011 may control the distribution of manifest files to client devices. The manifest file manager may be implemented as a network application that runs on the network node 1011 or on a separate manifest file server.

In an embodiment, the manifest file manager may be configured to generate (on the fly) a dedicated manifest file for a client device (an "customized" manifest file) comprising the information that the client device needs for requesting the tile streams that are needed in order to form the desired video mosaic. In an embodiment, the manifest file may have the form of an SRD-containing MPD.

The manifest file manager may generate such dedicated manifest file on the basis of information in a request of a client device. When receiving a request for a video mosaic from a client device, the manifest file manager may parse the request, determine the composition of the requested video mosaic on the basis of information in the request, generate a dedicated manifest files on the basis of the manifest files $1012_{1-3}$ that are administered by the manifest file manager and send the dedicated manifest file in a response message back to the client device. An example of such dedicated manifest file, in particular a dedicated SRD-type MPD, is described in detail with reference to FIG. 7C.

In an embodiment, the client device may encode the requested video composition as an URL in an http GET request to the manifest file manager. The requested video composition information may be transmitted via query string arguments of the URL or in specific HTTP headers inserted in the HTTP GET request. In another embodiment, the client may encode the requested video composition as parameters in an HTTP POST request to the manifest file manager.

In the HTTP POST response, the manifest file manager may provide the URL which the client device can used in order to retrieve the manifest file containing the requested video composition, possibly using HTTP redirection mechanism. Alternatively, the manifest file may be provided in the response body of the POST request. In response to the request, the manifest file retriever may receive the requested manifest file thereby signaling the client device that the mosaic tile streams selected by a user and/or an (software) application can be retrieved.

Once the manifest file is received, the MF retriever may activate a segment retriever 1016 of the client device in order to request HAS segments comprising media data of the base track and selected mosaic tile streams from a network node. In this process, the segment retriever may parse the manifest file and use the segment identifiers and location information, e.g. (part of) an URL, of the network node in order to generate and send segment requests, e.g. HTTP GET requests, to the network node and receive requested segments in response messages, e.g. HTTP OK response messages, from the network node. This way multiple consecutive HAS segments associated with the requested tile streams may be transmitted to the client device. The retrieved segments may be temporarily stored in a buffer 1020 and a NAL combiner module 1018 of the media engine combine NAL units in the segments into a HEVC compliant bitstream by selecting NAL units of the tile streams on the basis of the information in the base track, in particular extractors in the base track, and concatenating the NAL units into an ordered bitstream that can be decoded by a decoder module 1022.

FIG. 10B schematically depicts a process that may be executed by a media device as shown in FIG. 10A. The client device may use a manifest file, e.g. a multiple choice manifest file, in order to select one or more tile streams, in particular HAS segments of one or more tile streams, that may be used by the HAS client device and media engine in order to render (part of) a video mosaic 1026 on the display of the media device. As shown in FIG. 10B, on the basis of a manifest file (for example a manifest file as described with reference to FIG. 7C) a client device may select one or more tile streams that are stored as HAS segments $1020,1022_{1-4}$, $1024_{1-4}$ on a network node. The selected HAS segments may comprise a HAS segment comprising one or more non-VCL units 1020 and HAS segments comprising one or more VCL NAL units (for example in FIG. 10B the VCL NAL units are associated with selected tiles Ta1 $1022_1$, Tb2 $1024_2$ and Ta4 $1022_4$).

HAS segments associated with different tile streams may be stored on the basis of the media format as described with reference to FIG. 7B. On the basis of this media format the tile streams may be stored according to a media format, such as the ISO/IEC 14496-12 or ISO/IEC 14496-15 standards, comprising individually addressable tracks wherein the relation between the media data, i.e. the VCL NAL units, stored in the different tile tracks is provided by the information in the base track. Hence, after selection of the tile streams, the client device may request the base track and the tile tracks associated with the selected tiles. Once the client device starts receiving HAS segments of the selected tiles, it may use the information in the base track, in particular the extractors in the base track, in order to combine and concatenate the VCL NAL units into a NAL data structure 1026 defining a tiled video frame 1028. This way a compliant bitstream, preferably compliant with the HEVC standard, comprising encoded tiled video frames can be provided to the decoder module.

Instead of an customized manifest file, the video mosaic may also be retrieved on the basis of a multiple choice manifest file. An example of this process is depicted in FIG. 10C. In particular, this figure depicts the formation of a video mosaic on the basis of two or more different data structures using a multiple choice manifest file. In this embodiment, tile streams of at least a first video A and tile streams of a second video B may be stored as a first and second data structures $1030_{1,2}$ respectively. Each data structure may comprise a plurality of tile tracks $1034_{1,2}$-$1042_{1,2}$ wherein each track may comprise media data of a particular tile stream that is associated with particular tile position. Each data structure may further comprise a base track $1032_{1,2}$ comprising sequence information, i.e. information for signaling a media engine how NAL units of different tile streams can be combined into a decoder compliant bitstream. Preferably, the first and second data structures have an HEVC media format similar to the ones described with reference to FIG. 7B. In that case, an MPD as described with reference to FIG. 7C may be used to inform a client how to retrieve media data that is stored in a particular track.

Each tile track may comprise a track index and the extractors in the basis track comprise a track reference for identifying a particular track identified by a track index. For example, on the basis of the track parameters described with reference to FIG. 7B above, the extractor parameters of a first extractor referring to the first tile track (associated with index value "1") may be defined as EX1=(1,0,0,0), a second extractor referring to the second tile track (associated with index value "2") may be defined as EXT2=(2,0,0,0), a third extractor referring to the third tile track (associated with index value "3") may be defined as EXT3=(3,0,0,0) and a fourth extractor referring to the fourth tile track (associated with index value "4") may be defined as EXT4=(4,0,0,0), wherein the values 1-4 in are the indexes of the tile tracks (as defined by the track_ref_index parameter). Further, in this particular embodiment it is assumed that there is no sample offset when extracting the tiles, no data offset and the extractor instructs the client device to copy the entire NAL unit.

Each HEVC file uses the same tile-indexing scheme, e.g. track index values from 1 to n wherein each track index refers to a tile track comprising media data of a tile stream at a certain tile position. The order 1 to n of the tile tracks may define the order in which tiles are ordered in a tiled video frame (e.g. in a raster scan order). In other words, in case of e.g. a 2 by 2 mosaic as depicted in FIG. 7B, all top left tiles are stored in a track with index 1, all top right tiles are stored in a track with index 2, all bottom left tiles are stored in a track with index 3 and all bottom right tiles must be stored in a track with index 4. Hence, when the tile streams are generated using a common configuration of tiling modules as e.g. described with reference to FIG. 4 and stored on the basis of a common media format such as the HEVC media format, the base tracks of the first and second data structures are identical and may be used for addressing tile tracks of video A and/or tile tracks of video B. These conditions may e.g. be achieved by generating the data structures on the basis of encoders/tile stream formatters that have identical settings.

In that case a client device may retrieve a combination of tile tracks from the first data structure and second data structure without changing the format of the first and second data structure, i.e. without changing the way the media data are physically stored on the storage medium. A client device may select a combination of tile tracks originating from different data structures on the basis of a multiple-choice manifest file 1042 (MC-MF) as schematically depicted in FIG. 10C. Such manifest file is characterized in that it defines a plurality of tile streams for one tile position. This may trigger the client device that the manifest file is in fact a multiple-choice manifest file allowing a user to select different tile streams for one tile position. Alternatively, a multiple choice manifest file may have an identifier or a flag for signaling the client device that the manifest file is a multiple choice manifest file that can be used for composing a video mosaic. In case the client device identifies the manifest file as a multiple choice manifest file, it may trigger a GUI application in the media device that may allow a user to select tile stream identifiers (representing tile streams) for different tile positions so that a desired video mosaic can be composed. The segment retriever 1016 of the client device may subsequently use the selected tile stream identifiers for sending segment requests, e.g. HTTP requests, to the network node.

As shown in the example of FIG. 10C, the manifest file 1042 may comprise at least one base file identifier 1044, e.g. the base file mosaic-base.mp4 of video A, the tile stream identifiers of video A 1046 and the tile stream identifiers of video B 1048. Each tile stream identifier is associated with a tile position. In this example, tile position 1,2,3 and 4 may refer to top left, top right, bottom left and bottom right tile position respectively. Hence, in contrast with the dedicated manifest file structure depicted in FIG. 7B (a customized manifest file) that was generated in response to the request of a client device for a particular video mosaic, the multiple-choice manifest file 1042 allows a client device to choose tile streams at different tile positions from a plurality of tile streams. The plurality of tile streams may be associated with different visual content.

Hence, in contrast with a dedicated (customized) manifest file defining a particular video mosaic, the multiple-choice manifest file 1042 defines different tile stream identifiers (associated with different tile streams) for one tile position. The tile streams in the multiple choice manifest file are not necessarily linked to one data structure comprising tile streams. On the contrary, the multiple-choice manifest file may point to different data structures comprising different tile streams, which the client device may use for composing a video mosaic.

The multiple-choice manifest file 1042 may be generated by the manifest file manager on the basis of different manifest files 1010$_{1,2}$, e.g. by combining (part of) a manifest file of a first data structure (comprising tile tracks with media data of video A) and a manifest file of a second data structure (comprising tile tracks with media data of video B). Different advantageous embodiments of multiple-choice manifest files for enabling a client device to compose a video mosaic on the basis of tile streams will be described hereunder in more detail.

On the basis of the manifest file 1042 a client device may select a particular combination 1050 of tiles of video A and B, wherein the client device only allows selection of one particular tile stream for one particular tile position. This combination may be realized by selecting the tile streams associated with tile track 2 and 3 1036$_1$,1038$_1$ of the first data structure (video A) and tile track 1 and 4 1034$_2$,1040$_2$ of the second data structure (video B).

It is submitted that the different functional elements in FIG. 10A-10C may be implemented in different ways without departing from the invention. For example, in an embodiment, instead of an network element, the MF manager 1006 may be implemented as a functional element in the media device, e.g. as part of the HAS client 1002 or the like. In that case, the MF retriever may retrieve a number of different manifest files defining tile streams that may be used in the formation of a video mosaic and on the basis of these manifest files the MF manager may form a further manifest file, e.g. a customized manifest file or a multiple choice manifest file, that enables a client device to request tile streams for forming a desired video mosaic.

Figure 11A:
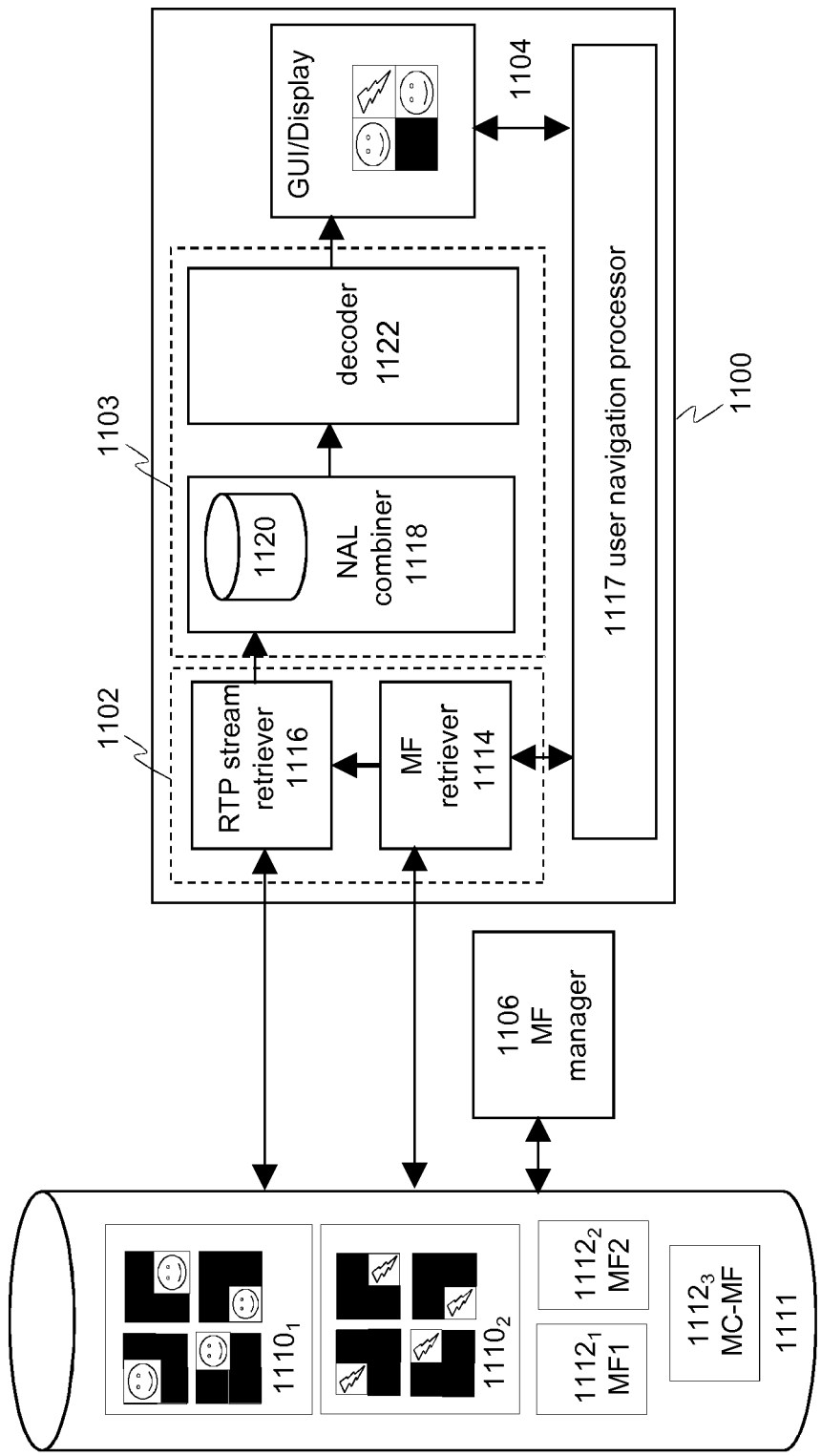
FIGS. 11A and 11B depict a media device configured for rendering a video mosaic on the basis of a manifest file according to another embodiment of the invention.
Figure 11B:
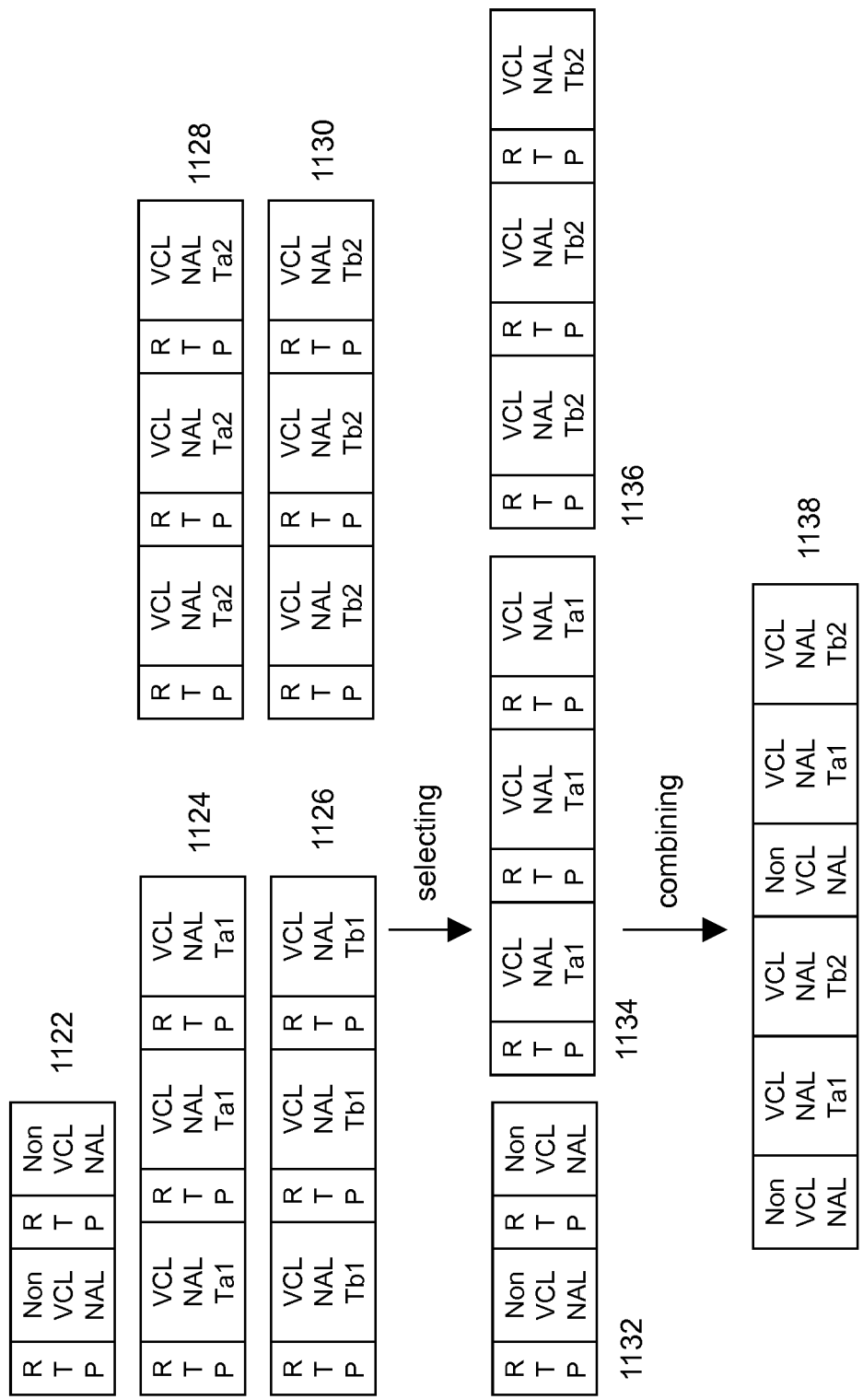

FIGS. 11A and 11B depict a media device configured for rendering video mosaic on the basis of a manifest file according to another embodiment of the invention. In particular, FIG. 11A depicts a media device 1100 comprising a RTSP/RTP client device 1102 for requesting RTP tile streams and receiving (buffering) media data of the requested tile streams. A media engine 1103 comprising a NAL combiner 1118 and a decoder 1122 may receive the buffered media data from the RTST/RTP client. The NAL combiner may combine NAL units of different RTP tile streams into a bitstream for the decoder that decodes the bitsream into tiled video frames. The media engine may send video frames to a video buffer (not shown) for rendering the video on a display 1104 associated with the media device.

A manifest file retriever 1114 of the client device may be triggered, e.g. by a user interacting with the GUI, to request a manifest file 1112$_{1-3}$ from a network node 1111. Alternatively, in another embodiment, a manifest file may be sent (pushed) via a separate communication channel (not shown) to the client device. For example, in an embodiment, a Websocket communication channel between the client device and the network node may be established. The manifest file may be a customized manifest file defining a dedicated video mosaic or a multiple-choice manifest file defining a plurality of different video mosaics from which the client device may "compose" a video mosaic. A manifest file manager 1106 may be configured to generate such manifest files (e.g. multiple-choice manifest file 1112$_3$) on the basis of manifest files 1112$_{1,2}$ associated with selected tile streams 1110$_{1,2}$ (in a similar way as described with reference to FIG. 10A-10C).

A user navigation processor 1117 may help selection of the tile streams that are part of a desired video mosaic. In particular, the user navigation processor may allow the user to interact with a graphical user interface for selecting a one or more tile streams from a plurality of RTP tile streams stored or cached on network nodes.

The RTP tile stream may be selected on the basis of a multiple choice manifest file. In that case, the client device may use tile position descriptors in the manifest file for generating a GUI on a display of a media device wherein the GUI allows a user to interact with the client device for selecting one or more tile streams. Once the user has selected a number of tile streams, the user navigation processor may trigger an RTP stream retriever 1116 (e.g. an RTSP client to retrieve unicast RTP streams, or an IGMP or MLP client to join IP multicast(s) carrying RTP streams) for requesting selected RTP tile streams from a network node. During this process, the RTP stream retriever may use tile stream identifiers in the manifest file and location information, e.g. an RTSP URL or an IP multicast address in order to send a stream request, e.g. an RTSP SETUP message or an IGMP join message to receive a requested stream from the network node. This way multiple RTP streams associated with the requested tile streams may be transmitted to the client device. The received media data of the different RTP streams may be temporarily stored in a buffer 1120. The media data, RTP packets, of each tile stream may be ordered in the correct playout order on the basis of the RTP time stamps and a NAL combiner module 1118 may be configured to combine NAL units of the different the RTP streams into a decoder compliant bitstream for the decoder module 1122.

FIG. 11B schematically depicts the process that is executed by a media device as shown in FIG. 11A. The client device may use a manifest file in order to select one or more tile streams. The client device may use the RTP timestamps of the RTP packets to relate the different RTP payloads in time and order NAL units belonging the same frame into a bitstream.

FIG. 11B depicts an example comprising five RTP streams, i.e. one RTP stream 1122 comprising non-VCL NAL units and four RTP tile streams 1124-1130 associated with different tile positions. The client device may select three RTP streams, e.g. an RTP stream comprising the non-VCL NAL units 1132, a first RTP tile stream 1134 comprising VCL NAL units comprising media data of a first tile associated with a first tile position and a second RTP tile stream 1316 comprising VCL NAL units comprising media date of a second tile associated with a second tile positions.

Using the information in the RTP headers and metadata, e.g. information in the manifest file, the different NAL units, i.e. the payload of the RTP packets, may be combined, i.e. concatenated in the correct time-order, so that a NAL data structure 1138 of (part of) one or more video frames is formed that comprises one or more non-VCL NAL units and one or more VCL NAL units wherein each VCL NAL unit is associated with a tile at a particular tile position. A bitstream for input to a decoder module may be formed by repeating this process for consecutive RTP packets. The decoder module may decode the bitstream in a similar way as described with reference to FIGS. 10A and 10B.

Hence, from FIGS. 10 and 11 above it follows that a mosaic video (comprising tiled video frames having decoded media data) can be composed by selecting different tile streams associated with different tile positions on the basis of a manifest file, receiving media data of the selected tile streams and ordering the media data of the received tile streams into a bitstream that can be decoded by decoder module that is capable of processing tiles. Typically, such decoder module is configured to receive decoder module configuration information, in particular tile position information, for enabling the decoder module to determine the position of a tile in a video frame. In an embodiment, at least part of the decoder information may be provided to the decoder module on the basis of information in non-VCL NAL units and/or information in the headers of the VCL NAL units.

Figure 12A:
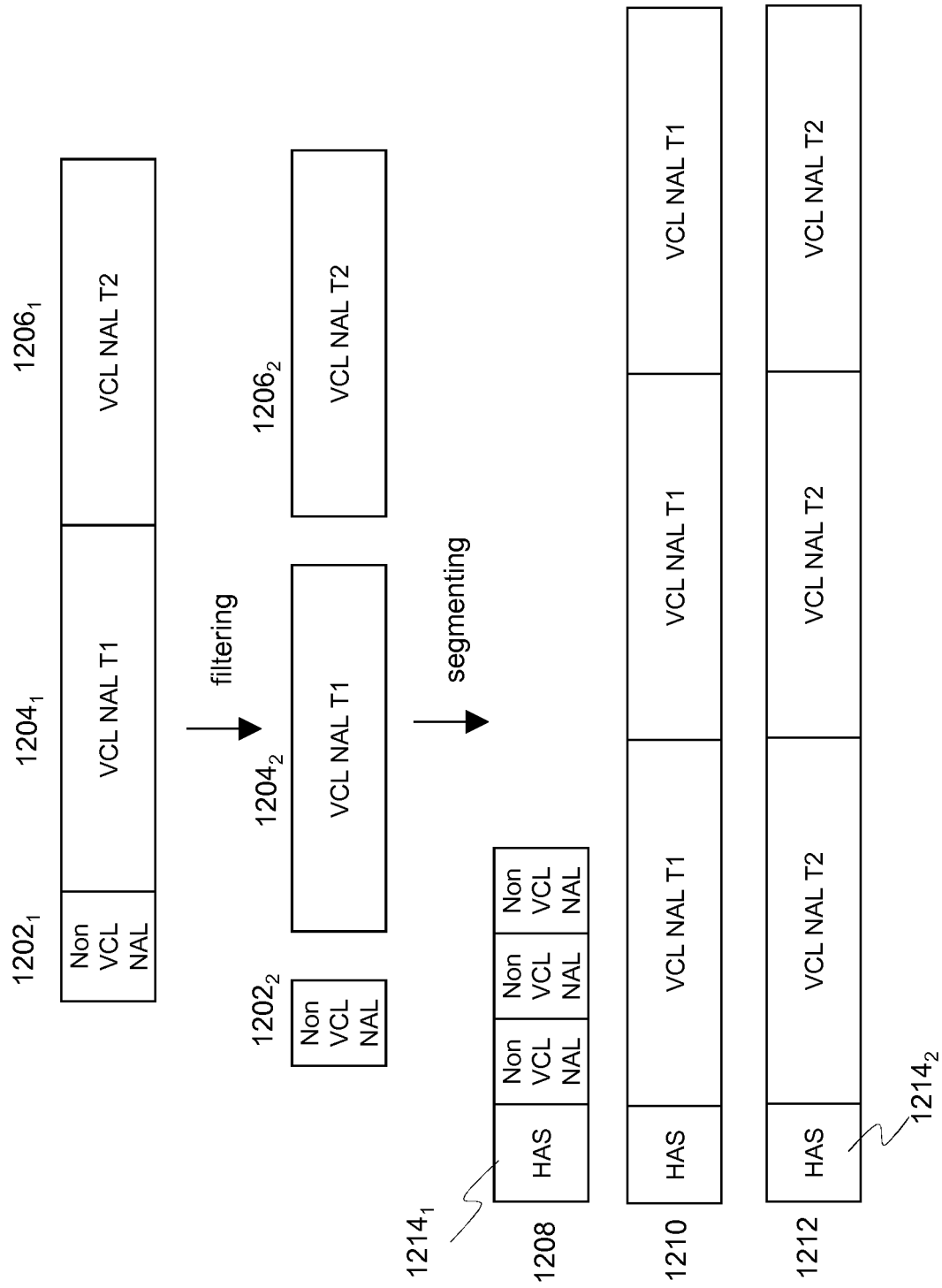
FIGS. 12A and 12B depict the formation of HAS segments of a tile stream according to an embodiment of the invention.
Figure 12B:
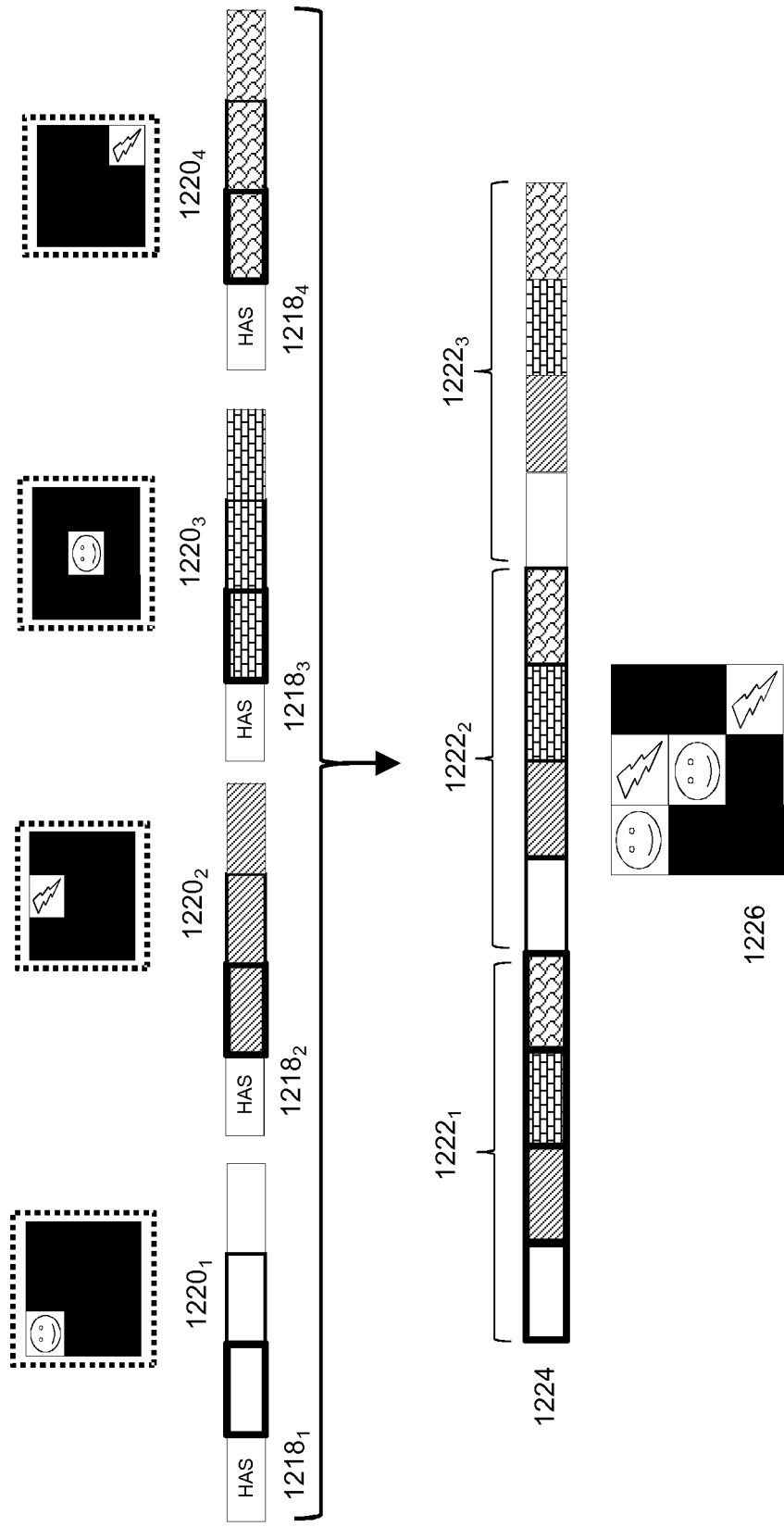
Figure 13:
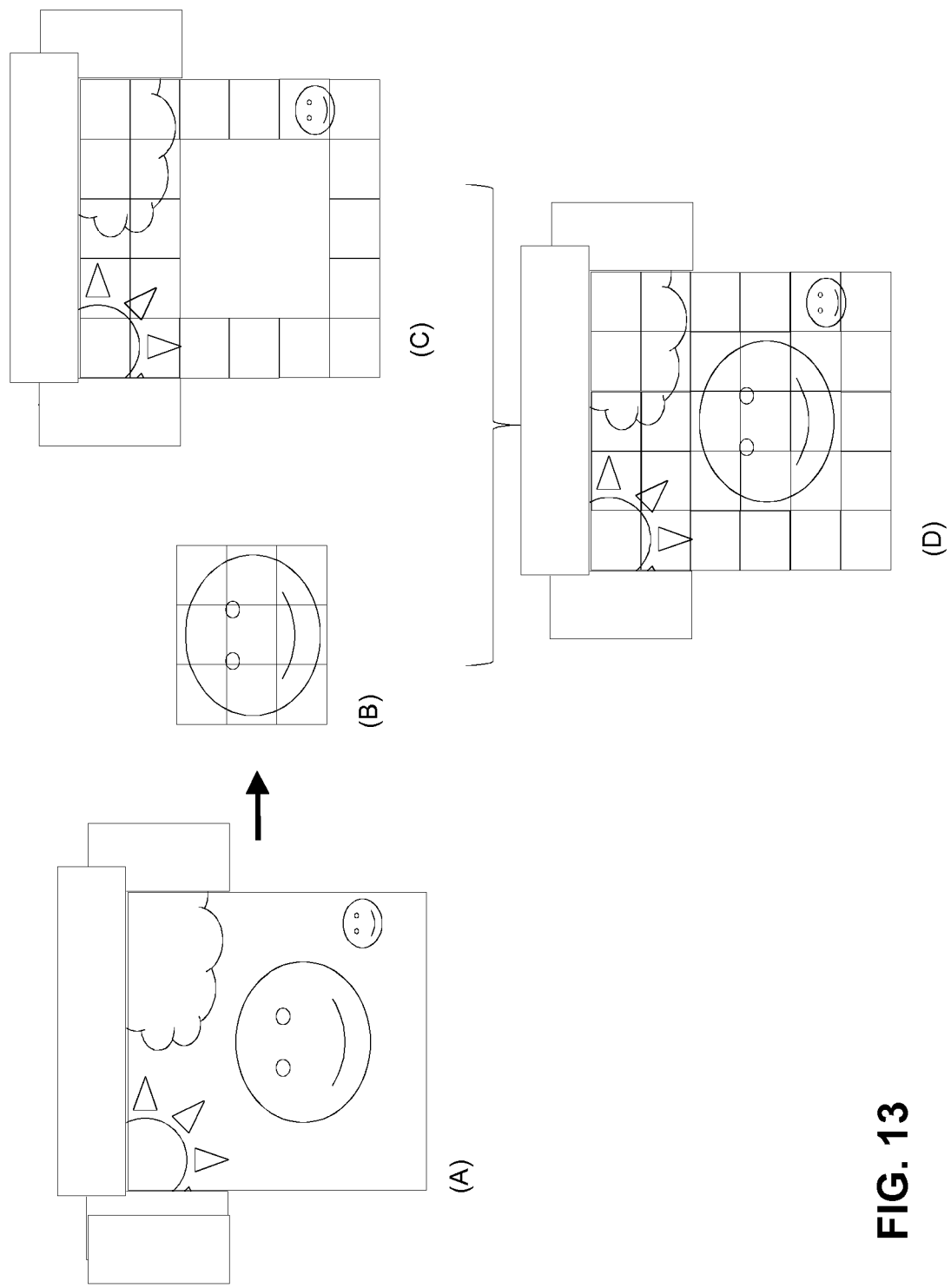
FIG. 13A-13D depict an example of a mosaic video of visually related content.

FIGS. 12A and 12B depict the formation of HAS segments of a tile stream according to another embodiment of the invention. In particular, FIGS. 12A and 12B depict a process of forming HAS segments comprising multiple NAL units. As described in FIG. 7B, a tile stream may be stored in different tracks of a media container. Each track may be then segmented into temporal segments of several seconds thus containing multiple NAL units. The storage and the indexing of this multiple NAL units can be performed according to a given file format, such as ISO/IEC 14496-12 or ISO/IEC 14496-15, so that the client device may be able to parse the payload of the HAS segment into the multiple NAL units.

A single NAL unit (comprising one tile in a video frame) has a typical length of 40 milliseconds (for a frame rate of 25 frames per second). Hence, HAS segment that only comprise one NAL unit would lead to very short HAS segments with associated high overhead cost. Whereas RTP headers are binary and very small, HAS headers are large, as a HAS segment is a complete file encapsulated in an HTTP response with a large ASCII-encoded HTTP header. Therefore, in the embodiment of FIG. 12A HAS segments are formed that comprise multiple NAL units (typically corresponding to the equivalent of 1-10 seconds of video) associated with one tile. NAL units $1202_1, 1204_1, 1206_1$ of tiled mosaic streams may be split into separate NAL units, i.e. non-VCL NAL units $1202_2$ (VPS, PPS, SPS) comprising metadata that is used by the decoder module to set its configuration; and, VCL NAL units $1204_2, 1206_2$ each comprising a frame of a tile stream. The header information of a slice in a VCL NAL unit may comprise slice position information associated with the position of the slice in a video frame which is also the position of the tile in a video frame in the case of the constraint one tile per slice is applied during the encoding.

The thus formed NAL units may be formatted into an HAS segment as defined by an HAS protocol. For example, as shown in FIG. 12A, the non-VCL NAL units may be stored as a first HAS segment 1208 wherein the non-VCL NAL units are stored in different atomic container, e.g. called boxes in ISO/IEC 14496-12 and ISO/IEC 14496-15. Similarly, concatenated VCL NAL units of tile T1 stored in different atomic containers may be stored as a second HAS segment 1210 and concatenated VCL NAL units of tile T2 stored in different atomic containers may be stored as a third HAS segment 1212.

Hence, multiple NAL units are concatenated and inserted as payload in a single HAS segment. This way, HAS segments of a first and second tile stream may be formed wherein the HAS segment comprises multiple concatenated VCL-NAL units. Similarly, HAS segments may be formed comprising multiple concatenated non-VCL HAS units.

FIG. 12B depicts the formation of a bitstream representing a video mosaic according to an embodiment of the invention. Here tile streams may comprise HAS segments comprising multiple NAL units as described with reference to FIG. 12A. In particular, FIG. 12B depicts a plurality (in this case four) HAS segments $1218_{1-4}$, each comprising a plurality of VCL NAL units $1220_{1-4}$ of video frames comprising a particular tile at a particular tile position. For each HAS segment the client device may separate the concatenated NAL units on the basis of a given file format syntax that indicates the boundaries of the NAL units. Then, for each video frame $1222_{1-3}$ the media engine may collect the VCL-NAL units and arrange the NAL units in a predetermined sequence so that a bitstream 1224 representing the mosaic video can be provided to the decoder module which may decode the bitstream into video frames representing a video mosaic 1226.

It is submitted that the concept of a tiled video composition or a video mosaic as described in this disclosure should be interpreted broadly in the sense that it may relate to combining tile streams of (visually) unrelated content and/or combining tile streams of (visually) related content. For example, FIG. 13A-13D depict an example of the latter situation wherein the methods and systems described in this disclosure may be used to convert a wide field of view video (FIG. 13A) in a first set of tile streams (FIG. 13B) associated with a center part of the wide field of view video (essentially a medium or narrow field of view image) and a second set of tile streams (FIG. 13C) associated with a peripheral part of the wide field of view video. An MPD as described in this disclosure may be used allowing a client device to select either the first set of tile streams for rendering narrow field of view image or a combination of the first and second set of tile streams for rendering the wide field of view image without compromising the resolution of the rendered image. Combining the first and second set of tile streams results a mosaic of tiles of visually related content.

Hereunder various embodiments of multiple-choice manifest files are described in more detail. In a first embodiment a multiple choice manifest file may comprise certain suggested video mosaic configurations. For this purpose, multiple tile streams may be associated multiple tile positions. Such manifest file may allow the client device to switch from one mosaic to another without requesting a new manifest file. This way, there is no discontinuity of DASH sessions since the client device does not need to request a new manifest file for changing from a first video mosaic (a first composition of tile streams) to a second video mosaic (a second composition of tile streams).

A first embodiment of a multiple-choice manifest file may define two or more predetermined video mosaics. For example, a multiple-choice MPD may define two video mosaics from which the client may choose from. Each video mosaic may comprise a base track and a plurality of tile tracks defining in this example a 2×2 tile arrangement that is similar to the mosaic described with reference to FIG. 7B. Each track is defined as an AdaptationSet comprising an SRD descriptor wherein the tracks that belong to one video mosaic have the same the source_id parameter value in order to signal the client device that the tile streams stored in these tracks have a spatial relationship with each other. This way the MC-MPD below defines the following two video mosaics:

| Mosaic 1 | |
|---|---|
| Tile 1: video B | Tile 2: video C |
| Tile 3: video D | Tile 4: video A |

| Mosaic 2 | |
|---|---|
| Tile 1: video A | Tile 2: video C |
| Tile 3: video B | Tile 4: video D |

```xml
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [...]>
    <Period>
<!—Mosaic1 -->
 <AdaptationSet [...]>
        <EssentialProperty schemeIdUri="urn:mpeg:dash:srd:2014" value="1, 0, 0, 0, 0, 0, 0, 1"/>
        <Representation width=0 height=0 id="mosaic1-base" bandwidth="5000000">
            <BaseURL>mosaic1-base.mp4</BaseURL>
        </Representation>
    </AdaptationSet>
<AdaptationSet [...]>
        <SupplementalProperty schemeIdUri="urn:mpeg:dash:srd:2014" value="1, 0, 0, 960, 540, 1920 , 1080, 1"/>
        <Representation id=" mosaic1-tile1" bandwidth="512000" dependencyId="mosaic1-base">
            <BaseURL> mosaic1-videoB.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="1, 960, 0, 960, 540, 1920, 1080, 1"/>
        <Representation id=" mosaic1-tile2" bandwidth="512000" dependencyId="mosaic1-base">
            <BaseURL> mosaic1-videoC.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="1, 0, 540, 960, 540, 1920 , 1080, 1"/>
        <Representation id="mosaic1-tile3" bandwidth="512000" dependencyId="mosaic1-base">
            <BaseURL>mosaic1-videoD.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="1, 960, 540, 960, 540, 1920, 1080, 1"/>
        <Representation id="mosaic1-tile4" bandwidth="512000" dependencyId="mosaic1-base">
            <BaseURL>mosaic1-videoA.mp4</BaseURL>
            <SegmentBase indexRange="7632" />
        </Representation>
    </AdaptationSet>
<!—Mosaic2 -->
 <AdaptationSet [...]>
        <EssentialProperty schemeIdUri="urn:mpeg:dash:srd:2014" value="2, 0, 0, 0, 0, 0, 0, 1"/>
        <Representation width=0 height=0 id="mosaic2-base" bandwidth="5000000">
            <BaseURL>mosaic2-base.mp4</BaseURL>
        </Representation>
    </AdaptationSet>
<AdaptationSet [...]>
        <SupplementalProperty schemeIdUri="urn:mpeg:dash:srd:2014" value="2, 0, 0, 960, 540, 1920 , 1080, 1"/>
        <Representation id=" mosaic2-tile1" bandwidth="512000" dependencyId="mosaic2-base">
            <BaseURL> mosaic2-videoA.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="2, 960, 0, 960, 540, 1920 , 1080, 1"/>
        <Representation id=" mosaic2-tile2" bandwidth="512000" dependencyId="mosaic2-base">
            <BaseURL> mosaic2-videoC.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="2, 0, 540, 960, 540, 1920 , 1080, 1"/>
        <Representation id="mosaic2-tile3" bandwidth="512000" dependencyId="mosaic2-base">
            <BaseURL>mosaic2-videoB.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="2, 960, 540, 960, 540, 1920, 1080, 1"/>
        <Representation id="mosaic2-tile4" bandwidth="512000" dependencyId="mosaic2-base">
```

```
            <BaseURL>mosaic2-videoD.mp4</BaseURL>
            <SegmentBase indexRange="7632" />
        </Representation>
    </AdaptationSet>
</Period>
</MPD>
```

The above multiple choice manifest file comprising predetermined video mosaics is DASH compliant and the client device may use the MPD to switch from one mosaic to another mosaic within the same MPEG-DASH session. The manifest file however only allows selection of predetermined video mosaics. It does not allow a client device to compose arbitrarily video mosaics by selecting for each tile position a tile stream from a plurality of different tile streams (as e.g. described with reference to FIG. 10C).

In order to offer more flexibility to the client device, a manifest file may be authored allowing a client device to compose a video mosaic while keeping the decoding burden on the client minimal, i.e. one decoder for decoding the whole video mosaic. For example, the following video mosaic may be composed on the basis of tile streams of video A,B,C or D for each tile position:

| Tile 1: | Tile 2: |
|---|---|
| video A or | video A or |
| video B or | video B or |
| video C or | video C or |
| video D | video D |
| Tile 3: | Tile 4: |
| video A or | video A or |
| video B or | video B or |
| video C or | video C or |
| video D | video D |

In a multiple choice manifest file according to a second embodiment of the invention, a client device may compose video mosaics by selecting a tile stream for each tile position or at least part of the tile positions:

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [...]>
    <Period>
<!--Mosaic -->
    <AdaptationSet [...]>
            <EssentialProperty schemeIdUri="urn:mpeg:dash:srd:2014" value="1, 0, 0, 0, 0, 0, 0, 1"/>
            <Representation width=0 height=0 id="mosaic-base" bandwidth="5000000">
                <BaseURL>mosaic-base.mp4</BaseURL>
            </Representation>
        </AdaptationSet>
<AdaptationSet [...]>
            <SupplementalProperty schemeIdUri="urn:mpeg:dash:srd:2014" value="1, 0, 0, 960, 540, 1920
, 1080, 1"/>
            <Representation id="mosaic-tile1-videoA" bandwidth="512000" dependencyId="mosaic-base">
                <BaseURL> tile1-videoA.mp4</BaseURL>
                <SegmentBase indexRange="7632" />
            </Representation>
            <Representation id="mosaic-tile1-videoB" bandwidth="512000" dependencyId="mosaic-base">
                <BaseURL> tile1-videoB.mp4</BaseURL>
                <SegmentBase indexRange="7632" />
            </Representation>
            <Representation id="mosaic-tile1-videoC" bandwidth="512000" dependencyId="mosaic-base">
                <BaseURL> tile1-videoC.mp4</BaseURL>
                <SegmentBase indexRange="7632" />
            </Representation>
            <Representation id="mosaic-tile1- videoD" bandwidth="512000" dependencyId="mosaic-base">
                <BaseURL> tile1-videoD.mp4</BaseURL>
                <SegmentBase indexRange="7632" />
            </Representation>
        </AdaptationSet>
<AdaptationSet [...]>
            <SupplementalProperty schemeIdUri="urn:mpeg:dash:srd:2014" value="1, 960, 0, 960, 540,
1920 , 1080, 1"/>
            <Representation id="mosaic-tile2-videoA" bandwidth="512000" dependencyId="mosaic-base">
                <BaseURL> tile2-videoA.mp4</BaseURL>
                <SegmentBase indexRange="7632" />
            </Representation>
            <Representation id="mosaic-tile2-videoB" bandwidth="512000" dependencyId="mosaic-base">
                <BaseURL> tile2-videoB.mp4</BaseURL>
                <SegmentBase indexRange="7632" />
            </Representation>
            <Representation id="mosaic-tile2-videoC" bandwidth="512000" dependencyId="mosaic-base">
                <BaseURL> tile2-videoC.mp4</BaseURL>
                <SegmentBase indexRange="7632" />
```

```
        </Representation>
        <Representation id=" mosaic-tile2-videoD" bandwidth="512000" dependencyId="mosaic-base">
            <BaseURL> tile2-videoD.mp4</BaseURL>
            <SegmentBase indexRange="7632" />
        </Representation>
    </AdaptationSet>
<AdaptationSet [...]>
    <SupplementalProperty schemeIdUri="urn:mpeg:dash:srd:2014" value="1, 0, 540, 960, 540,
1920 , 1080, 1"/>
        <Representation id=" mosaic-tile3-videoA" bandwidth="512000" dependencyId="mosaic-base">
            <BaseURL> tile3-videoA.mp4</BaseURL>
            <SegmentBase indexRange="7632" />
        </Representation>
        <Representation id="mosaic-tile3-videoB" bandwidth="512000" dependencyId="mosaic-base">
            <BaseURL> tile3-videoB.mp4</BaseURL>
            <SegmentBase indexRange="7632" />
        </Representation>
        <Representation id="mosaic-tile3-videoC" bandwidth="512000" dependencyId="mosaic-base">
            <BaseURL> tile3-videoC.mp4</BaseURL>
            <SegmentBase indexRange="7632" />
        </Representation>
        <Representation id="mosaic-tile3-videoD" bandwidth="512000" dependencyId="mosaic-base">
            <BaseURL> tile3-videoD.mp4</BaseURL>
            <SegmentBase indexRange="7632" />
        </Representation>
    </AdaptationSet>
<AdaptationSet [...]>
    <SupplementalProperty schemeIdUri="urn:mpeg:dash:srd:2014" value="1, 960, 540, 960, 540,
1920, 1080, 1"/>
        <Representation id=" mosaic-tile4-videoA" bandwidth="512000" dependencyId="mosaic-base">
            <BaseURL> tile4-videoA.mp4</BaseURL>
            <SegmentBase indexRange="7632" />
        </Representation>
        <Representation id="mosaic-tile4-videoB" bandwidth="512000" dependencyId="mosaic-base">
            <BaseURL> tile4-videoB.mp4</BaseURL>
            <SegmentBase indexRange="7632" />
        </Representation>
        <Representation id="mosaic-tile4-videoC" bandwidth="512000" dependencyId="mosaic-base">
            <BaseURL> tile4-videoC.mp4</BaseURL>
            <SegmentBase indexRange="7632" />
        </Representation>
        <Representation id="mosaic-tile4-videoD" bandwidth="512000" dependencyId="mosaic-base">
            <BaseURL> tile4-videoD.mp4</BaseURL>
            <SegmentBase indexRange="7632" />
        </Representation>
    </AdaptationSet>
</Period>
</MPD>
```

The manifest file described above is DASH compliant. For each tile position the manifest file defines an AdaptationSet associated with an SRD descriptor wherein the AdaptationSet defines Representations representing the tile streams that are available for the tile position described by the SRD descriptor. The "extended" dependencyId (as explained with reference to FIG. 7C) signals the client device that the representations are dependent on metadata in a base track.

This manifest file enables a client device to select from a plurality of tiles streams (that are formed on the basis of video's A,B,C or D). The tile streams of each video may be stored on the basis of a HEVC media format as described with reference to FIG. 7B. As explained with reference to FIG. 10C, as long as the tile streams are generated on the basis of one or more encoders that have similar or substantial identical settings, only one base track of one of the video's is needed. The tile streams can be individually selected and accessed by the client device on the basis of the multiple-choice manifest file. In order to offer maximum flexibility to the client device, all combinations possible should be described in the MPD.

The visual content of the tile streams may be related or unrelated. Hence, the authoring of this manifest file stretches the semantics of the AdaptationSet element as normally the DASH standard specifies that an AdaptationSet may only contain visually equivalent content (wherein Representations offer variations of this content in terms of codec, resolution, etc.).

Using the above scheme with a large number of tile positions in a video frame and a large number of tile streams that may be selected at each of the tile positions, the manifest file may become very long as each set of tile streams at a tile position would require an AdaptationSet comprising an SRD descriptor and one or more tile stream identifiers.

```
<AdaptationSet [...]>
<SupplementalProperty schemeIdUri="urn:mpeg:dash:srd:2014" value="1, 0, 0, 960, 540, 1920 ,
1080, 1">
    [...abc...]
</AdaptationSet>
```

-continued

```
<AdaptationSet [...]>
<SupplementalProperty schemeIdUri="urn:mpeg:dash:srd:2014" value="1, 960, 0, 960, 540, 1920 , 1080, 1"/>
    [...abc...]
</AdaptationSet>
<AdaptationSet [...]>
<SupplementalProperty schemeIdUri="urn:mpeg:dash:srd:2014" value="1, 0, 540, 960, 540, 1920 , 1080, 1">
[...abc...]
</AdaptationSet>
<AdaptationSet [...]>
<SupplementalProperty schemeIdUri="urn:mpeg:dash:srd:2014" value="1, 960, 540, 960, 540, 1920 , 1080, 1"/>
[...abc...]
</AdaptationSet>
```

Hereunder, as a third embodiment the invention, a multiple-choice manifest file is described that deals with the above-identified problems of providing a multiple choice manifest file that is in line with the semantics of an AdaptationSet and may allow to define a large number of tile streams without the manifest file becoming extensively long. In an embodiment, these problems may be solved by including multiple SRD descriptors in a single AdaptationSet in the following way:

```
<SupplementalProperty schemeIdUri="urn:mpeg:dash:srd:2014"
value="1, 0, 0, 960, 540, 1920 , 1080, 1"/>
<SupplementalProperty schemeIdUri="urn:mpeg:dash:srd:2014"
value="1, 0, 540, 960, 540, 1920 , 1080, 1"/>
<SupplementalProperty schemeIdUri="urn:mpeg:dash:srd:2014"
value="1, 960, 0, 960, 540, 1920 , 1080, 1"/>
<SupplementalProperty schemeIdUri="urn:mpeg:dash:srd:2014"
value="1, 960, 540, 960, 540, 1920, 1080, 1"/>
```

The use of multiple SRD descriptors in one AdaptationSet is allowed as no conformance rule in the DASH specification excludes the use of multiple SRD descriptors in one AdaptationSet. The presence of multiple SRD descriptors in an AdaptationSet may signal a client device, in particular a DASH client device, that particular video content can be retrieved as different tile streams associated with different tile positions.

Multiple SRD descriptors in one AdaptationSet may require a modified SegmentTemplate for enabling the client device to determine the correct tile stream identifier, e.g. (part of) an URL, that is needed by the client device for requesting the correct tile stream from a network node. In an embodiment, the template scheme may comprise the following identifiers:

| $<Identifier>$ | Substitution parameter | Format |
|---|---|---|
| $$ | Is an escape sequence, i.e. "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present. If no format tag is present, a default format tag with width = 1 shall be used. |
| $Bandwidth$ | This identifier is substituted with the value of Representation@bandwidth attribute value. | The format tag may be present. If no format tag is present, a default format tag with width = 1 shall be used. |
| $Time$ | This identifier is substituted with the value of the SegmentTimeline@t attribute for the Segment being accessed. Either $Number$ or $Time$ may be used but not both at the same time. | The format tag may be present. If no format tag is present, a default format tag with width = 1 shall be used. |
| $object_x$ | This identifier is substituted with the object_x value from the @value SRD descriptor used by the client to select this media component. | not applicable |
| $object_y$ | This identifier is substituted with the object_y value from the @value SRD descriptor used by the client to select this media component. | not applicable |

A base URL BaseURL and the object_x and object_y identifiers of the SegmentTemplate may be used for generating a tile stream identifier, e.g. (part) of an URL, of a tile stream that is associated with a particular tile position. On the basis of this template scheme, the following multiple-choice manifest file may be authored:

```xml
<?xml version="1.0" encoding="UTF-8"?>
<MPD
   xmlns:xsi="http://www.w3.org/2001/XMLSchema-instance"
   xmlns="urn:mpeg:dash:schema:mpd:2011"
   xsi:schemaLocation="urn:mpeg:dash:schema:mpd:2011 DASH-MPD.xsd"
   [...]>
   <Period>
<!--Mosaic -->
<AdaptationSet [...]>
        <EssentialProperty schemeIdUri="urn:mpeg:dash:srd:2014" value="1, 0, 0, 0, 0, 0, 0, 1"/>
        <Representation id="mosaic-base" width=0 height=0 bandwidth="5000000">
            <BaseURL>mosaic-base.mp4</BaseURL>
        </Representation>
    </AdaptationSet>
<AdaptationSet [...]>
        <EssentialProperty id="1" schemeIdUri="urn:mpeg:dash:srd:2014" value="1, 0, 0, 960, 540, 1920 , 1080, 1"/>
        <EssentialProperty id="2" schemeIdUri="urn:mpeg:dash:srd:2014" value="1, 0, 540, 960, 540, 1920 , 1080, 1"/>
        <EssentialProperty id="3" schemeIdUri="urn:mpeg:dash:srd:2014" value="1, 960, 0, 960, 540, 1920 , 1080, 1"/>
        <EssentialProperty id="4" schemeIdUri="urn:mpeg:dash:srd:2014" value="1, 960, 540, 960, 540, 1920 , 1080, 1"/>
        <BaseURL>video1/</BaseURL>
        <SegmentTemplate timescale="90000" initialization="$object_x$_$object_y$_init.mp4v"
media="$object_x$_$object_y$_$Time$.mp4v">
          <SegmentTimeline>
            <S t="0" d="180180" r="432"/>
          </SegmentTimeline>
        </SegmentTemplate>
         <Representation id="video1" width="960" height="540" bandwidth="250000
dependencyId="mosaic-base""/>
    </AdaptationSet>
<AdaptationSet [...]>
        <EssentialProperty id="1" schemeIdUri="urn:mpeg:dash:srd:2014" value="1, 0, 0, 960, 540, 1920 , 1080, 1"/>
        <EssentialProperty id="2" schemeIdUri="urn:mpeg:dash:srd:2014" value="1, 0, 540, 960, 540, 1920 , 1080, 1"/>
        <EssentialProperty id="3" schemeIdUri="urn:mpeg:dash:srd:2014" value="1, 960, 0, 960, 540, 1920 , 1080, 1"/>
        <EssentialProperty id="4" schemeIdUri="urn:mpeg:dash:srd:2014" value="1, 960, 540, 960, 540, 1920 , 1080, 1"/>
        <BaseURL>video2/</BaseURL>
        <SegmentTemplate timescale="90000" initialization="$object_x$_$object_y$_init.mp4v"
media="$object_x$_$object_y$_$Time$.mp4v">
          <SegmentTimeline>
            <S t="0" d="180180" r="432"/>
          </SegmentTimeline>
        </SegmentTemplate>
        <Representation id="video2" width="960" height="540" bandwidth="250000
dependencyId="mosaic-base""/>
    </AdaptationSet>
<AdaptationSet [...]>
        <EssentialProperty id="1" schemeIdUri="urn:mpeg:dash:srd:2014" value="1, 0, 0, 960, 540, 1920 , 1080, 1"/>
        <EssentialProperty id="2" schemeIdUri="urn:mpeg:dash:srd:2014" value="1, 0, 540, 960, 540, 1920 , 1080, 1"/>
        <EssentialProperty id="3" schemeIdUri="urn:mpeg:dash:srd:2014" value="1, 960, 0, 960, 540, 1920 , 1080, 1"/>
        <EssentialProperty id="4" schemeIdUri="urn:mpeg:dash:srd:2014" value="1, 960, 540, 960, 540, 1920 , 1080, 1"/>
        <BaseURL>video3/</BaseURL>
        <SegmentTemplate timescale="90000" initialization="$object_x$_$object_y$_init.rnp4v"
media="$object_x$_$object_y$_$Time$.mp4v">
          <SegmentTimeline>
            <S t="0" d="180180" r="432"/>
          </SegmentTimeline>
        </SegmentTemplate>
        <Representation id="video3" width="960" height="540" bandwidth="250000
dependencyId="mosaic-base""/>
    </AdaptationSet>
<AdaptationSet [...]>
        <EssentialProperty id="1" schemeIdUri="urn:mpeg:dash:srd:2014" value="1, 0, 0, 960, 540, 1920 , 1080, 1"/>
        <EssentialProperty id="2" schemeIdUri="urn:mpeg:dash:srd:2014" value="1, 0, 540, 960, 540, 1920 , 1080, 1"/>
```

```
        <EssentialProperty id="3" schemeIdUri="urn:mpeg:dash:srd:2014" value="1, 960, 0, 960,
540, 1920 , 1080, 1"/>
        <EssentialProperty id="4" schemeIdUri="urn:mpeg:dash:srd:2014" value="1, 960, 540,
960, 540, 1920 , 1080, 1"/>
        <BaseURL>video4/</BaseURL>
        <SegmentTemplate timescale="90000" initialization="$object_x$_$object_y$_init.mp4v"
media="$object_x$_$object_y$_$Time$.mp4v">
            <SegmentTimeline>
                <S t="0" d="180180" r="432"/>
            </SegmentTimeline>
        </SegmentTemplate>
        <Representation id="video4" width="960" height="540" bandwidth="250000
dependencyId="mosaic-base""/>
    </AdaptationSet>
</Period>
</MPD>
```

Hence, in this embodiment, each AdaptationSet comprises multiple SRD descriptors for defining multiple tile positions associated with a particular content, e.g. video1, video2, etc. On the basis of the information in the manifest file, the client device may thus select a particular content (a particular video identified by a base URL) at particular tile position (identified by a particular SRD descriptor) and construct a tile stream identifier of the selected tile stream.

In particular, the information in the manifest file informs a client device on the content that is selectable for each tile position. This information may be used to render a graphical user interface on the display of the media device allowing a user to select a certain composition of videos for forming a video mosaic. For example, the manifest file may enable a user to select a first video from a plurality of videos associated with a tile position that match the top right corner of the video frames of the video mosaic. This selection may be associated with the following SRD descriptor:
<EssentialProperty id="1" schemeIdUri="urn:mpeg:dash:srd:2014" value="1, 0, 0, 960, 540, 1920, 1080, 1"/>

If this tile position is selected, the client device may use the BaseURL and the SegmentTemplate for generating the URL associated with the selected tile stream. In that case, the client device may substitute the identifiers object_x and object_y of the SegmentTemplate with the values that correspond with the SRD descriptor of the selected tile stream (namely 0). This way the URL of an initialization segment: /video1/0_0_init.mp4v and a first segment: /video1/0_ 0_1234655.mp4v may be formed.

Each representation defined in the manifest file may be associated with an dependencyId signaling the client device that the representation is depended on metadata defined by the representation "mosaic-base".

According to the DASH specification, when two descriptors have the same id attribute, the client device does not have to process them. Therefore different id values are provided to the SRD descriptors in order to signal the client that it needs to process all of them. Hence, in this embodiment, the tile position x,y is part of the file name of the segments. This enables the client to request a desired tile stream (e.g. a predetermined HEVC tile track) from a network node. In the manifest file of the previous embodiments such measure is not needed as in those embodiments each position (each SRD descriptor) is linked to a specific AdaptationSet containing segments with different names.

Hence, this embodiment provides the flexibility of composing different video mosaics from a plurality of tile streams described in a compact manifest file, wherein the composed video mosaic can be transformed in a bitstream that can be decoded by a single decoder device. The authoring of this MPD scheme however does not respect the semantics of the AdaptationSet element.

When using multiple SRD descriptors in one AdaptationSet, the syntax of the SRD descriptor may be modified in order to allow an even more compact manifest file. For example, in the following manifest file part four SRD descriptors may be used:

```
<AdaptationSet [...]>
    <EssentialProperty id="1" schemeIdUri="urn:mpeg:dash:srd:2014" value="1, 0, 0, 960,
540, 1920 , 1080, 1"/>
    <EssentialProperty id="2" schemeIdUri="urn:mpeg:dash:srd:2014" value="1, 0, 540, 960,
540, 1920 , 1080, 1"/>
    <EssentialProperty id="3" schemeIdUri="urn:mpeg:dash:srd:2014" value="1, 960, 0, 960,
540, 1920 , 1080, 1"/>
    <EssentialProperty id="4" schemeIdUri="urn:mpeg:dash:srd:2014" value="1, 960, 540,
960, 540, 1920 , 1080, 1"/>
        <BaseURL>video4/</BaseURL>
        <SegmentTemplate timescale="90000" initialization="$object_x$_$object_y$_init.mp4v"
media="$object_x$_$object_y$_$Time$.mp4v
">
            <SegmentTimeline>
                <S t="0" d="180180" r="432"/>
            </SegmentTimeline>
        </SegmentTemplate>
        <Representation id="video4" width="960" height="540" bandwidth="250000
dependencyId="mosaic-base""/>
    </AdaptationSet>
```

The four SRD descriptors may be described on the basis of a SRD descriptor that has a modified syntax:

```
<EssentialProperty schemeIdUri="urn:mpeg:dash:srd:2014" value="1, 0 960, 0 540, 960, 540, 1920, 1080, 1"/>
```

On the basis of this SRD syntax, the second and third SRD parameter (normally indicating the x and y position of the tile) should be understood as vectors of positions. Combining the four values once, each with the three others, leads to the information described in the four original SRD descriptors. Hence, on the basis of this new SRD syntax, a more compact MPD can be achieved. Obviously, the advantages of this embodiment becomes more apparent when the number of video streams that can be selected for the video mosaic becomes larger:

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  [...]>
  <Period>
<!--Mosaic -->
<AdaptationSet [...]>
        <EssentialProperty schemeIdUri="urn:mpeg:dash:srd:2014" value="1, 0, 0, 0, 0, 0, 0, 1"/>
        <Representation id="mosaic-base" width=0 height=0 bandwidth="5000000">
            <BaseURL>mosaic-base.mp4</BaseURL>
        </Representation>
    </AdaptationSet>
<AdaptationSet [...]>
        < EssentialProperty schemeIdUri="urn:mpeg:dash:srd:2014" value="1, 0 960, 0 540, 960, 540, 1920 , 1080, 1"/>
        <BaseURL>video1/</BaseURL>
        <SegmentTemplate timescale="90000" initialization="$object_x$_$object_y$_init.mp4v" media="$object_x$_$object_y$_$Time$.mp4v">
        <SegmentTimeline>
          <S t="0" d="180180" r="432"/>
        </SegmentTimeline>
      </SegmentTemplate>
      <Representation id="video1" width="960" height="540" bandwidth="250000 dependencyId="mosaic-base""/>
    </AdaptationSet>
<AdaptationSet [...]>
      < EssentialProperty schemeIdUri="urn:mpeg:dash:srd:2014" value="1, 0 960, 0 540, 960, 540, 1920 , 1080, 1"/>
        <BaseURL>video2/</BaseURL>
        <SegmentTemplate timescale="90000" initialization="$object_x$_$object_y$_init.mp4v" media="$object_x$_$object_y$_$Time$.mp4v">
        <SegmentTimeline>
          <S t="0" d="180180" r="432"/>
        </SegmentTimeline>
      </SegmentTemplate>
        <Representation id="video2" width="960" height="540" bandwidth="250000 dependencyId="mosaic-base""/>
      </AdaptationSet>
<AdaptationSet [...]>
      < EssentialProperty schemeIdUri="urn:mpeg:dash:srd:2014" value="1, 0 960, 0 540, 960, 540, 1920 , 1080, 1"/>
        <BaseURL>video3/</BaseURL>
        <SegmentTemplate timescale="90000" initialization="$object_x$_$object_y$_init.mp4v" media="$object_x$_$object_y$_$Time$.mp4v">
        <SegmentTimeline>
          <S t="0" d="180180" r="432"/>
        </SegmentTimeline>
      </SegmentTemplate>
      <Representation id="video3" width="960" height="540" bandwidth="250000 dependencyId="mosaic-base""/>
    </AdaptationSet>
<AdaptationSet [...]>
      < EssentialProperty schemeIdUri="urn:mpeg:dash:srd:2014" value="1, 0 960, 0 540, 960, 540, 1920 , 1080, 1"/>
        <BaseURL>video4/</BaseURL>
        <SegmentTemplate timescale="90000" initialization="$object_x$_$object_y$_init.mp4v" media="$object_x$_$object_y$_$Time$.mp4v">
        <SegmentTimeline>
          <S t="0" d="180180" r="432"/>
        </SegmentTimeline>
```

```
        </SegmentTemplate>
        <Representation id="video4" width="960" height="540" bandwidth="250000
dependencyId="mosaic-base""/>
    </AdaptationSet>
</Period>
</MPD>
```

A manifest file according to the fourth embodiment, addresses the problem of providing a multiple choice manifest file that is in line with the semantics of an AdaptationSet and may allow to define a large number of tile streams without the manifest file becoming extensively long in an alternative way. In this embodiment, the problem may be solved by associating different SRD descriptors in different Representations of the same AdaptationSet in the following way:

```
<Representation id=" mosaic-tile1-videoA" bandwidth="512000" dependencyId="mosaic-base">
        <EssentialProperty schemeIdUri="urn:mpeg:dash:srd:2014" value="1, 0, 0, 960, 540, 1920 , 1080, 1"/>
        <BaseURL> tile1-videoA.mp4</BaseURL>
        <SegmentBase indexRange="7632" />
    </Representation>
    <Representation id=" mosaic-tile2-videoA bandwidth="512000" dependencyId="mosaic-base">
        <EssentialProperty schemeIdUri="urn:mpeg:dash:srd:2014" value="1, 960, 0, 960, 540, 1920 , 1080, 1"/>
        <BaseURL> tile2-videoA.mp4</BaseURL>
        <SegmentBase indexRange="7632" />
    </Representation>
    <Representation id="mosaic-tile3- videoA" bandwidth="512000" dependencyId="mosaic-base">
        <EssentialProperty schemeIdUri="urn:mpeg:dash:srd:2014" value="1, 0, 540, 960, 540, 1920 , 1080, 1"/>
        <BaseURL> tile3-videoA.mp4</BaseURL>
        <SegmentBase indexRange="7632" />
    </Representation>
    <Representation id="mosaic-tile4- videoA" bandwidth="512000" dependencyId="mosaic-base">
        <EssentialProperty schemeIdUri="urn:mpeg:dash:srd:2014" value="1, 960, 540, 960, 540, 1920 , 1080, 1"/>
        <BaseURL> tile4-videoA.mp4</BaseURL>
        <SegmentBase indexRange="7632" />
    </Representation>
```

Hence, in this embodiment, an AdaptationSet may comprise multiple (dependent) Representations wherein each Representation is associated with an SRD descriptor. This way the same video content (defined in the AdaptationSet) may be associated with multiple tile positions (defined by the multiple SRD descriptors). Each Representation may comprise a tile stream identifier (e.g. (part of) an URL). An example of such multiple-choice manifest file may look as follows:

```
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"
 [...]>
 <Period>
 <!--Mosaic -->
 <AdaptationSet [...]>
        <EssentialProperty schemeIdUri="urn:mpeg:dash:srd:2014" value="1, 0, 0, 0, 0, 0, 0, 1"/>
        <Representation id="mosaic-base" width=0 height=0 bandwidth="5000000">
            <BaseURL>mosaic-base.mp4</BaseURL>
        </Representation>
    </AdaptationSet>
<AdaptationSet [...]>
        <Representation id=" mosaic-tile1-videoA" bandwidth="512000" dependencyId="mosaic-base">
            <EssentialProperty schemeIdUri="urn:mpeg:dash:srd:2014" value="1, 0, 0, 960, 540, 1920 , 1080, 1"/>
            <BaseURL> tile1-videoA.mp4</BaseURL>
            <SegmentBase indexRange="7632" />
```

```xml
        </Representation>
        <Representation id=" mosaic-tile2-videoA" bandwidth="512000" dependencyId="mosaic-base">
            <EssentialProperty schemeIdUri="urn:mpeg:dash:srd:2014" value="1, 960, 0, 960, 540, 1920 , 1080, 1"/>
            <BaseURL> tile2-videoA.mp4</BaseURL>
            <SegmentBase indexRange="7632" />
        </Representation>
        <Representation id="mosaic-tile3- videoA" bandwidth="512000" dependencyId="mosaic-base">
            <EssentialProperty schemeIdUri="urn:mpeg:dash:srd:2014" value="1, 0, 540, 960, 540, 1920 , 1080, 1"/>
            <BaseURL> tile3-videoA.mp4</BaseURL>
            <SegmentBase indexRange="7632" />
        </Representation>
        <Representation id="mosaic-tile4- videoA" bandwidth="512000" dependencyId="mosaic-base">
            <EssentialProperty schemeIdUri="urn:mpeg:dash:srd:2014" value="1, 960, 540, 960, 540, 1920 , 1080, 1"/>
            <BaseURL> tile4-videoA.mp4</BaseURL>
            <SegmentBase indexRange="7632" />
        </Representation>
    </AdaptationSet>
    <AdaptationSet [...]>
        <Representation id=" mosaic-tile1-videoB" bandwidth="512000" dependencyId="mosaic-base">
            <EssentialProperty schemeIdUri="urn:mpeg:dash:srd:2014" value="1, 0, 0, 960, 540, 1920 , 1080, 1"/>
            <BaseURL> tile1-videoB.mp4</BaseURL>
            <SegmentBase indexRange="7632" />
        </Representation>
        <Representation id=" mosaic-tile2-videoB" bandwidth="512000" dependencyId="mosaic-base">
            <EssentialProperty schemeIdUri="urn:mpeg:dash:srd:2014" value="1, 960, 0, 960, 540, 1920 , 1080, 1"/>
            <BaseURL> tile2-videoB.mp4</BaseURL>
            <SegmentBase indexRange="7632" />
        </Representation>
        <Representation id="mosaic-tile3-videoB" bandwidth="512000" dependencyId="mosaic-base">
            <EssentialProperty schemeIdUri="urn:mpeg:dash:srd:2014" value="1, 0, 540, 960, 540, 1920 , 1080, 1"/>
            <BaseURL> tile3-videoB.mp4</BaseURL>
            <SegmentBase indexRange="7632" />
        </Representation>
        <Representation id="mosaic-tile4-videoB" bandwidth="512000" dependencyId="mosaic-base">
            <EssentialProperty schemeIdUri="urn:mpeg:dash:srd:2014" value="1, 960, 540, 960, 540, 1920 , 1080, 1"/>
            <BaseURL> tile4-videoB.mp4</BaseURL>
            <SegmentBase indexRange="7632" />
        </Representation>
    </AdaptationSet>
    <AdaptationSet [...]>
        <Representation id=" mosaic-tile1-videoC" bandwidth="512000" dependencyId="mosaic-base">
            <EssentialProperty schemeIdUri="urn:mpeg:dash:srd:2014" value="1, 0, 0, 960, 540, 1920 , 1080, 1"/>
            <BaseURL> tile1-videoC.mp4</BaseURL>
            <SegmentBase indexRange="7632" />
        </Representation>
        <Representation id=" mosaic-tile2-videoC" bandwidth="512000" dependencyId="mosaic-base">
            <EssentialProperty schemeIdUri="urn:mpeg:dash:srd:2014" value="1, 960, 0, 960, 540, 1920 , 1080, 1"/>
            <BaseURL> tile2-videoC.mp4</BaseURL>
            <SegmentBase indexRange="7632" />
        </Representation>
        <Representation id="mosaic-tile3-videoC" bandwidth="512000" dependencyId="mosaic-base">
            <EssentialProperty schemeIdUri="urn:mpeg:dash:srd:2014" value="1, 0, 540, 960, 540, 1920 , 1080, 1"/>
            <BaseURL> tile3-videoC.mp4</BaseURL>
            <SegmentBase indexRange="7632" />
        </Representation>
        <Representation id="mosaic-tile4-videoC" bandwidth="512000" dependencyId="mosaic-base">
            <EssentialProperty schemeIdUri="urn:mpeg:dash:srd:2014" value="1, 960, 540, 960, 540, 1920 , 1080, 1"/>
            <BaseURL> tile4-videoC.mp4</BaseURL>
            <SegmentBase indexRange="7632" />
        </Representation>
    </AdaptationSet>
    <AdaptationSet [...]>
        <Representation id=" mosaic-tile1-videoD" bandwidth="512000" dependencyId="mosaic-base">
            <EssentialProperty schemeIdUri="urn:mpeg:dash:srd:2014" value="1, 0, 0, 960, 540, 1920 , 1080, 1"/>
            <BaseURL> tile1-videoD.mp4</BaseURL>
            <SegmentBase indexRange="7632" />
```

```
        </Representation>
    <Representation id=" mosaic-tile2-videoD" bandwidth="512000" dependencyId="mosaic-base">
        <EssentialProperty schemeIdUri="urn:mpeg:dash:srd:2014" value="1, 960, 0, 960, 540,
1920 , 1080, 1"/>
        <BaseURL> tile2-videoD.mp4</BaseURL>
        <SegmentBase indexRange="7632" />
    </Representation>
    <Representation id="mosaic-tile3-videoD" bandwidth="512000" dependencyId="mosaic-base">
        <EssentialProperty schemeIdUri="urn:mpeg:dash:srd:2014" value="1, 0, 540, 960,
540, 1920 , 1080, 1"/>
        <BaseURL> tile3-videoD.mp4</BaseURL>
        <SegmentBase indexRange="7632" />
    </Representation>
    <Representation id="mosaic-tile4-videoD" bandwidth="512000" dependencyId="mosaic-base">
        <EssentialProperty schemeIdUri="urn:mpeg:dash:srd:2014" value="1, 960, 540, 960,
540, 1920 , 1080, 1"/>
        <BaseURL> tile4-videoD.mp4</BaseURL>
        <SegmentBase indexRange="7632" />
    </Representation>
  </AdaptationSet>
</Period>
</MPD>
```

This embodiment provides the advantages that the authoring is in line with the syntax of the AdaptationSet and that the tile position is selected via the Representation element, which normally defines different coding and/or quality variants of the media content of an AdaptationSet. Hence, in this embodiment the Representations define tile position variants of the video content associated with an AdaptationSet and thus only represents a relatively small extension of the syntax of the Representation element.

The SegmentTemplate feature, including the object_x and object_y identifier, as described above with reference to the multiple-choice manifest file according to the third embodiment of the invention may be used to reduce the size of the MPD further:

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [...]>
    <Period>
<!—Mosaic -->
<AdaptationSet [...]>
        <EssentialProperty schemeIdUri="urn:mpeg:dash:srd:2014" value="1, 0, 0, 0, 0, 0, 0, 1"/>
        <Representation id="mosaic-base" width=0 height=0 bandwidth="5000000">
            <BaseURL>mosaic-base.mp4</BaseURL>
        </Representation>
    </AdaptationSet>
<!--Video A -->
<AdaptationSet [...]>
        <BaseURL>videoA/</BaseURL>
        <SegmentTemplate timescale="90000" initialization="$RepresentationID$_init.mp4v"
media="$RepresentationID$_$Time$.mp4v">
            <SegmentTimeline>
                <S t="0" d="180180" r="432"/>
            </SegmentTimeline>
        </SegmentTemplate>
        <Representation id="tile1" width="960" height="540" bandwidth="250000
dependencyId="mosaic-base""/>
                <EssentialProperty schemeIdUri="urn:mpeg:dash:srd:2014" value="1, 0, 0, 960, 540,
1920 , 1080, 1"/>
            </Representation>
        <Representation id=" tile2" width="960" height="540" bandwidth="250000
dependencyId="mosaic-base">
                <EssentialProperty schemeIdUri="urn:mpeg:dash:srd:2014" value="1, 960, 0, 960, 540,
1920 , 1080, 1"/>
            </Representation>
        <Representation id="tile3" width="960" height="540" bandwidth="250000
dependencyId="mosaic-base">
                <EssentialProperty schemeIdUri="urn:mpeg:dash:srd:2014" value="1, 0, 540, 960,
540, 1920 , 1080, 1"/>
            </Representation>
        <Representation id="tile4" width="960" height="540" bandwidth="250000
dependencyId="mosaic-base">
                <EssentialProperty schemeIdUri="urn:mpeg:dash:srd:2014" value="1, 960, 540, 960,
540, 1920 , 1080, 1"/>
```

```
        </Representation>
</AdaptationSet>
<!--Video B -->
<AdaptationSet [...]>
        <BaseURL>videoB/</BaseURL>
        <SegmentTemplate timescale="90000" initialization="$RepresentationID$_init.mp4v"
media="$RepresentationID$_$Time$.mp4v">
        <SegmentTimeline>
         <S t="0" d="180180" r="432"/>
        </SegmentTimeline>
       </SegmentTemplate>
       <Representation id="tile1" width="960" height="540" bandwidth="250000
dependencyId="mosaic-base""/>
              <EssentialProperty schemeIdUri="urn:mpeg:dash:srd:2014" value="1, 0, 0, 960, 540,
1920 , 1080, 1"/>
          </Representation>
       <Representation id=" tile2" width="960" height="540" bandwidth="250000
dependencyId="mosaic-base">
              <EssentialProperty schemeIdUri="urn:mpeg:dash:srd:2014" value="1, 960, 0, 960, 540,
1920 , 1080, 1"/>
          </Representation>
       <Representation id="tile3" width="960" height="540" bandwidth="250000
dependencyId="mosaic-base">
              <EssentialProperty schemeIdUri="urn:mpeg:dash:srd:2014" value="1, 0, 540, 960,
540, 1920 , 1080, 1"/>
          </Representation>
       <Representation id="tile4" width="960" height="540" bandwidth="250000
dependencyId="mosaic-base">
              <EssentialProperty schemeIdUri="urn:mpeg:dash:srd:2014" value="1, 960, 540, 960,
540, 1920 , 1080, 1"/>
          </Representation>
</AdaptationSet>
<!--Video C -->
<AdaptationSet [...]>
        <BaseURL>videoC/</BaseURL>
        <SegmentTemplate timescale="90000" initialization="$RepresentationID$_init.mp4v"
media="$RepresentationID$_$Time$.mp4v">
        <SegmentTimeline>
         <S t="0" d="180180" r="432"/>
        </SegmentTimeline>
       </SegmentTemplate>
       <Representation id="tile1" width="960" height="540" bandwidth="250000
dependencyId="mosaic-base""/>
              <EssentialProperty schemeIdUri="urn:mpeg:dash:srd:2014" value="1, 0, 0, 960, 540,
1920 , 1080, 1"/>
          </Representation>
       <Representation id=" tile2" width="960" height="540" bandwidth="250000
dependencyId="mosaic-base">
              <EssentialProperty schemeIdUri="urn:mpeg:dash:srd:2014" value="1, 960, 0, 960, 540,
1920 , 1080, 1"/>
          </Representation>
       <Representation id="tile3" width="960" height="540" bandwidth="250000
dependencyId="mosaic-base">
              <EssentialProperty schemeIdUri="urn:nnpeg:dash:srd:2014" value="1, 0, 540, 960,
540, 1920 , 1080, 1"/>
          </Representation>
       <Representation id="tile4" width="960" height="540" bandwidth="250000
dependencyId="mosaic-base">
              <EssentialProperty schemeIdUri="urn:mpeg:dash:srd:2014" value="1, 960, 540, 960,
540, 1920 , 1080, 1"/>
          </Representation>
</AdaptationSet>
<!--Video D -->
<AdaptationSet [...]>
        <BaseURL>videoD/</BaseURL>
        <SegmentTemplate timescale="90000" initialization="$RepresentationID$_init.mp4v"
media="$RepresentationID$_$Time$.mp4v">
        <SegmentTimeline>
         <S t="0" d="180180" r="432"/>
        </SegmentTimeline>
       </SegmentTemplate>
       <Representation id="tile1" width="960" height="540" bandwidth="250000
dependencyId="mosaic-base""/>
              <EssentialProperty schemeIdUri="urn:mpeg:dash:srd:2014" value="1, 0, 0, 960, 540,
1920 , 1080, 1"/>
          </Representation>
       <Representation id=" tile2" width="960" height="540" bandwidth="250000
dependencyId="mosaic-base">
```

```xml
        <EssentialProperty schemeIdUri="urn:mpeg:dash:srd:2014" value="1, 960, 0, 960, 540,
1920 , 1080, 1"/>
      </Representation>
      <Representation id="tile3" width="960" height="540" bandwidth="250000
dependencyId="mosaic-base">
        <EssentialProperty schemeIdUri="urn:mpeg:dash:srd:2014" value="1, 0, 540, 960,
540, 1920 , 1080, 1"/>
      </Representation>
    <Representation id="tile4" width="960" height="540" bandwidth="250000
dependencyId="mosaic-base">
        <EssentialProperty schemeIdUri="urn:mpeg:dash:srd:2014" value="1, 960, 540, 960,
540, 1920 , 1080, 1"/>
      </Representation>
</AdaptationSet>
</Period>
</MPD>
```

The above-described multiple-choice manifest files define representations (tile streams) that are dependent on metadata for proper decoding and rendering wherein the dependency is signaled to the client device on the basis of an dependencyId attribute in the Representation element as described with reference to FIG. 7C.

As the dependencyId attribute is defined on representation level, a search for through all representations requires indexing of all the representations in the MPD. Especially in media applications wherein the number of representations in an MPD may become substantial, e.g. hundreds of representations, a search through all representations in the manifest file may become processing intensive for the client device. Therefore, in an embodiment, one or more parameters may be provided in the manifest file that enable a client device to perform a more efficient search through the representations in the MPD.

In an embodiment, a representation element may comprise a dependentRepresentationLocation attribute that points (e.g. on the basis of an AdaptationSet@id) to at least one AdaptationSet in which the one or more associated Representations that comprise the dependent Representation can be found. Here, the dependency may a metadata dependency or a decoding dependency. In an embodiment, the value of the dependentRepresentationLocation may be one or more AdaptationSet@id separated by a white-space.

An example of a manifest file that illustrates the use of the dependentRepresentationLocation attribute is provided hereunder:

```xml
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"
 [...]>
 <Period>
<!--Mosaic -->
<AdaptationSet id="main-ad" [...]>
    <EssentialProperty schemeIdUri="urn:mpeg:dash:srd:2014" value="1, 0, 0, 0, 0, 0, 0, 1"/>
    <Representation id="mosaic-base" width=0 height=0 bandwith="5000000">
       <BaseURL>mosaic-base.mp4</BaseURL>
    </Representation>
  </AdaptationSet>
<AdaptationSet [...]>
    <Representation id=" mosaic-tile1-videoA" bandwidth="512000" dependencyId="mosaic-base"
dependentRepresentationLocation="main-ad">
       <EssentialProperty schemeIdUri="urn:mpeg:dash:srd:2014" value="1, 0, 0, 960, 540,
1920 , 1080, 1"/>
       <BaseURL> tile1-videoA.mp4</BaseURL>
       <SegmentBase indexRange="7632" />
    </Representation>
    <Representation id=" mosaic-tile2-videoA" bandwidth="512000" dependencyId="mosaic-base"
dependentRepresentationLocation="main-ad">
       <EssentialProperty schemeIdUri="urn:mpeg:dash:srd:2014" value="1, 960, 0, 960, 540,
1920 , 1080, 1"/>
       <BaseURL> tile2-videoA.mp4</BaseURL>
       <SegmentBase indexRange="7632" />
    </Representation>
    <Representation id="mosaic-tile3- videoA" bandwidth="512000" dependencyId="mosaic-base"
dependentRepresentationLocation="main-ad">
       <EssentialProperty schemeIdUri="urn:mpeg:dash:srd:2014" value="1, 0, 540, 960,
540, 1920 , 1080, 1"/>
       <BaseURL> tile3-videoA.mp4</BaseURL>
       <SegmentBase indexRange="7632" />
    </Representation>
    <Representation id="mosaic-tile4- videoA" bandwidth="512000" dependencyId="mosaic-base"
dependentRepresentationLocation="main-ad">
       <EssentialProperty schemeIdUri="urn:mpeg:dash:srd:2014" value="1, 960, 540, 960,
540, 1920 , 1080, 1"/>
```

```xml
            <BaseURL> tile4-videoA.mp4</BaseURL>
            <SegmentBase indexRange="7632" />
        </Representation>
</AdaptationSet>
<AdaptationSet [...]>
    <Representation id=" mosaic-tile1-videoB" bandwidth="512000" dependencyId="mosaic-base" dependentRepresentationLocation="main-ad">
        <EssentialProperty schemeIdUri="urn:mpeg:dash:srd:2014" value="1, 0, 0, 960, 540, 1920 , 1080, 1"/>
        <BaseURL> tile1-videoB.mp4</BaseURL>
        <SegmentBase indexRange="7632" />
    </Representation>
    <Representation id=" mosaic-tile2-videoB" bandwidth="512000" dependencyId="mosaic-base" dependentRepresentationLocation="main-ad"
        <EssentialProperty schemeIdUri="urn:mpeg:dash:srd:2014" value="1, 960, 0, 960, 540, 1920 , 1080, 1"/>
        <BaseURL> tile2-videoB.mp4</BaseURL>
        <SegmentBase indexRange="7632" />
    </Representation>
    <Representation id="mosaic-tile3- videoB" bandwidth="512000" dependencyId="mosaic-base" dependentRepresentationLocation="main-ad">
        <EssentialProperty schemeIdUri="urn:mpeg:dash:srd:2014" value="1, 0, 540, 960, 540, 1920 , 1080, 1"/>
        <BaseURL> tile3-videoB.mp4</BaseURL>
        <SegmentBase indexRange="7632" />
    </Representation>
    <Representation id="mosaic-tile4- videoB" bandwidth="512000" dependencyId="mosaic-base" dependentRepresentationLocation="main-ad">
        <EssentialProperty schemeIdUri="urn:mpeg:dash:srd:2014" value="1, 960, 540, 960, 540, 1920 , 1080, 1"/>
        <BaseURL> tile4-videoB.mp4</BaseURL>
        <SegmentBase indexRange="7632" />
    </Representation>
</AdaptationSet>
<AdaptationSet [...]>
    <Representation id=" mosaic-tile1-videoC" bandwidth="512000" dependencyId="mosaic-base" dependentRepresentationLocation="main-ad">
        <EssentialProperty schemeIdUri="urn:mpeg:dash:srd:2014" value="1, 0, 0, 960, 540, 1920 , 1080, 1"/>
        <BaseURL> tile1-videoC.mp4</BaseURL>
        <SegmentBase indexRange="7632" />
    </Representation>
    <Representation id=" mosaic-tile2-videoC" bandwidth="512000" dependencyId="mosaic-base" dependentRepresentationLocation="main-ad">
        <EssentialProperty schemeIdUri="urn:mpeg:dash:srd:2014" value="1, 960, 0, 960, 540, 1920 , 1080, 1"/>
        <BaseURL> tile2-videoC.mp4</BaseURL>
        <SegmentBase indexRange="7632" />
    </Representation>
    <Representation id="mosaic-tile3- videoC" bandwidth="512000" dependencyId="mosaic-base" dependentRepresentationLocation="main-ad">
        <EssentialProperty schemeIdUri="urn:mpeg:dash:srd:2014" value="1, 0, 540, 960, 540, 1920 , 1080, 1"/>
        <BaseURL> tile3-videoC.mp4</BaseURL>
        <SegmentBase indexRange="7632" />
    </Representation>
    <Representation id="mosaic-tile4- videoC" bandwidth="512000" dependencyId="mosaic-base" dependentRepresentationLocation="main-ad">
        <EssentialProperty schemeIdUri="urn:mpeg:dash:srd:2014" value="1, 960, 540, 960, 540, 1920 , 1080, 1"/>
        <BaseURL> tile4-videoC.mp4</BaseURL>
        <SegmentBase indexRange="7632" />
    </Representation>
</AdaptationSet>
<AdaptationSet [...]>
    <Representation id=" mosaic-tile1-videoD" bandwidth="512000" dependencyId="mosaic-base" dependentRepresentationLocation="main-ad">
        <EssentialProperty schemeIdUri="urn:mpeg:dash:srd:2014" value="1, 0, 0, 960, 540, 1920 , 1080, 1"/>
        <BaseURL> tile1-videoD.mp4</BaseURL>
        <SegmentBase indexRange="7632" />
    </Representation>
    <Representation id=" mosaic-tile2-videoD" bandwidth="512000" dependeneyId="mosaic-base" dependentRepresentationLocation="main-ad">
        <EssentialProperty schemeIdUri="urn:mpeg:dash:srd:2014" value="1, 960, 0, 960, 540, 1920 , 1080, 1"/>
        <BaseURL> tile2-videoD.mp4</BaseURL>
        <SegmentBase indexRange="7632" />
```

```
    </Representation>
    <Representation id="mosaic-tile3- videoD" bandwidth="512000" dependencyId="mosaic-base"
dependentRepresentationLocation="main-ad">
        <EssentialProperty schemeIdUri="urn:mpeg:dash:srd:2014" value="1, 0, 540, 960,
540, 1920 , 1080, 1"/>
        <BaseURL> tile3-videoD.mp4</BaseURL>
        <SegmentBase indexRange="7632" />
    </Representation>
    <Representation id="mosaic-tile4- videoD" bandwidth="512000" dependencyId="mosaic-base"
dependentRepresentationLocation="main-ad">
        <EssentialProperty schemeIdUri="urn:mpeg:dash:srd:2014" value="1, 960, 540, 960,
540, 1920 , 1080, 1"/>
        <BaseURL> tile4-videoD.mp4</BaseURL>
        <SegmentBase indexRange="7632" />
    </Representation>
  </AdaptationSet>
</Period>
</MPD>
```

As shown in this example, the dependentRepresentationLocation attribute may be used in combination with an dependencyId attribute or a baseTrackdependencyId attribute (e.g. as discussed with reference to FIG. 7C), wherein the dependencyId or baseTrackdependencyId attribute signals the client device that the representation is dependent on another representation and wherein the dependentRepresentationLocation attribute signals the client device that the representation that is needed in order to playout the media data associated with the dependent representation can be found in the AdaptationSet the dependentRepresentationLocation points to.

For example, in the example the AdapationSet comprising the Representation "mosaic-base" of the base stream is identified by an AdaptationSet identifier "main-ad" and every Representation that is dependent on the "mosaic-base" Representation (as signaled by the dependencyId) points to the "main-ad" AdaptationSet using the dependentRepresentation-Location. This way, a client device (e.g. DASH client device) is able to efficiently locate the AdaptationSet of the base stream in a manifest file comprising a large number of Representations.

In an embodiment, if the client device identifies the presence of a dependentRepresentationLocation attribute, it may trigger the search for dependent representations to one or more further adaptation sets beyond the adaptation set of the requested representation in which a dependencyId attribute is present. The search of dependent representations within an adaptation set preferably may be triggered by the dependencyId attribute.

In an embodiment, dependentRepresentationLocation attribute may point to more than one AdaptationSet identifiers. In another embodiment, more than one dependentRepresentationLocation attributes may be used in a manifest file, wherein each parameter points to one or more adaptation sets.

In an alternative embodiment, the dependentRepresentationLocation attribute may be used to trigger yet another scheme for searching one or more representations associated with one or more dependent representations. In this embodiment, the dependentRepresentationLocation attribute may be used to locate other adaptation sets in the manifest file (or one or more different manifest files) that have the same parameter. In that case, dependentRepresentationLocation attribute does not have the value of the adaptation set identifier. Instead, it will have another value that uniquely identifies this group of representations. Hence, the value to be looked up in the adaptation sets, is not the adaptation set id itself, but it is the value of an unique dependentRepresentationLocation parameter. This way, the dependentRepresentationLocation parameter is used as a parameter (a "label") for grouping a set of representations in a manifest file, wherein when the client device identifies a dependent RepresentationLocation associated with a requested dependent representation, it will look in the manifest file for one or more representations in the group of representations identified by the dependentRepresentationLocation parameter. When the dependentRepresentationLocation attribute is present in the AdaptationSet element, it has the same meaning as if the dependentRepresentationLocation attribute with the same value was repeated in each Representation element.

In order to distinguish this client behavior from the client behavior described in other embodiments (e.g. embodiments where the dependentRepresentationLocation parameter points to a specific adaptation set identified by an adaptation set identifier), the dependentRepresentationLocation parameter may also be referred to as dependencyGroupId parameter allowing grouping of representations within a manifest file that enables more efficient searching of representations that are required for playout of one or more dependent representations. In this embodiment, the dependentRepresentationLocation parameter (or dependencyGroupId parameter) may be defined at the level of a representation (i.e. every representation that belongs to the group will be labeled with the parameter). In another embodiment, the parameter may be defined at the adaptation set level. Representation in the one or more adaptation sets that are labeled with the dependentRepresentationLocation parameter (or dependencyGroupId parameter) define a group of representations in which client device may look for representations defining a base stream.

In a further improvement of the invention, the manifest file contains one or more parameters that further indicate a specific property, preferably the mosaic property of the offered content. In embodiments of the invention, this mosaic property is defined in that a plurality of tile video streams, when selected on the basis of representations of a manifest file and having this property in common, are, after being decoded, stitched together into video frames for presentation, each of these video frames constitute a mosaic of subregions with one or more visual intra frame boundaries when rendered. In a preferred embodiment of the invention, the selected tile video streams are input as one bitstream to a decoder, preferably a HEVC decoder.

The manifest file is preferably a Media Presentation Description (MPD) based upon the MPEG DASH standard, and enriched with the above described one or more property parameters.

One use case of signaling a specific property shared by tile video streams referenced in the manifest file, is that it allow a client device to flexibly compose a mosaic of channels displaying a miniature version of the current programs (which current programs, e.g. channels, may be signaled through the manifest file. This differentiates from other types of tiled content providing a continuous view when tile videos are stitched together, e.g. tiled panoramic views. In addition, mosaic contents are different in the sense that the content provider expects the application to display a complete mosaic of a certain arrangement of tile videos as opposed to panoramic video use cases wherein the client application may only present a subset of the tile videos by enabling panning and zooming capabilities though user interaction. As a result, there is a need to convey the characteristic of a mosaic content towards the client application in order to for the client to make a suitable content selection, i.e. selecting as many tile videos as slots in the mosaic. To this end, a parameter 'spatial_set_type' may be added in the SRD descriptor as defined below.

| EssentialProperty@ value or SupplementalProperty@ value parameter | Use | Description |
| --- | --- | --- |
| . . . | | |
| spatial_set_id | O | optional non-negative integer in decimal representation providing an identifier for a group of Spatial Object. When not present, the Spatial Object associated to this descriptor does not belong to any spatial set and no spatial set information is given. When the value of spatial_set_id is present, the value of total_width and total_height shall be present. |
| spatial_set_type | O | optional non-negative integer in decimal representation determining the type of spatial sert: Value of 0 defines a continuous spatial set Value of 1 defines a mosaic spatial set |

NOTE -
Alternatively the 'spatial_set_type' may directly hold string values of "continuous" or "mosaic" instead of numeric values.

The following MPD example illustrates the usage of the 'spatial_set_type' as described above.

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [...]>
    <Period>
<!—Mosaic -->
    <AdaptationSet [...]>
        <EssentialProperty schemeIdUri="urn:mpeg:dash:srd:2014" value="1, 0, 0, 0, 0, 0, 0, 1"/>
        <Representation width=0 height=0 id="mosaic-base" bandwidth="5000000">
            <BaseURL>mosaic-base.mp4</BaseURL>
        </Representation>
     </AdaptationSet>
<AdaptationSet [...]>
    <SupplementalProperty schemeIdUri="urn:mpeg:dash:srd:2014" value="1, 0, 0, 960, 540, 1920 , 1080, 1, 1"/>
        <Representation id="mosaic-tile1-videoA" bandwidth="512000" dependencyId="mosaic-base">
            <BaseURL> tile1-videoA.mp4</BaseURL>
            <SegmentBase indexRange="7632" />
        </Representation>
        <Representation id="mosaic-tile1-videoB" bandwidth="512000" dependencyId="mosaic-base">
            <BaseURL> tile1-videoB.mp4</BaseURL>
            <SegmentBase indexRange="7632" />
        </Representation>
        <Representation id="mosaic-tile1-videoC" bandwidth="512000" dependencyId="mosaic-base">
            <BaseURL> tile1-videoC. mp4</BaseURL>
            <SegmentBase indexRange="7632" />
        </Representation>
        <Representation id="mosaic-tile1- videoD" bandwidth="512000" dependencyId="mosaic-base">
            <BaseURL> tile1-videoD.mp4</BaseURL>
            <SegmentBase indexRange="7632" />
        </Representation>
     </AdaptationSet>
<AdaptationSet [...]>
    <SupplementalProperty schemeIdUri="urn:mpeg:dash:srd:2014" value="1, 960, 0, 960, 540, 1920 , 1080, 1, 1"/>
        <Representation id="mosaic-tile2-videoA" bandwidth="512000" dependencyId="mosaic-base">
            <BaseURL> tile2-videoA.mp4</BaseURL>
            <SegmentBase indexRange="7632" />
        </Representation>
        <Representation id="mosaic-tile2-videoB" bandwidth="512000" dependencyId="mosaic-base">
            <BaseURL> tile2-videoB.mp4</BaseURL>
            <SegmentBase indexRange="7632" />
        </Representation>
        <Representation id="mosaic-tile2-videoC" bandwidth="512000" dependencyId="mosaic-base">
            <BaseURL> tile2-videoC.mp4</BaseURL>
            <SegmentBase indexRange="7632" />
```

```xml
        </Representation>
        <Representation id="mosaic-tile2-videoD" bandwidth="512000" dependencyId="mosaic-base">
            <BaseURL> tile2-videoD.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="1, 0, 540, 960, 540,
1920 , 1080, 1, 1"/>
        <Representation id="mosaic-tile3-videoA" bandwidth="512000" dependencyId="mosaic-base">
            <BaseURL> tile3-videoA.mp4</BaseURL>
            <SegmentBase indexRange="7632" />
        </Representation>
        <Representation id="mosaic-tile3-videoB" bandwidth="512000" dependencyId="mosaic-base">
            <BaseURL> tile3-videoB.mp4</BaseURL>
            <SegmentBase indexRange="7632" />
        </Representation>
        <Representation id="mosaic-tile3-videoC" bandwidth="512000" dependencyId="mosaic-base">
            <BaseURL> tile3-videoC.mp4</BaseURL>
            <SegmentBase indexRange="7632" />
        </Representation>
        <Representation id="mosaic-tile3-videoD" bandwidth="512000" dependencyId="mosaic-base">
            <BaseURL> tile3-videoD.mp4</BaseURL>
            <SegmentBase indexRange="7632" />
        </Representation>
    </AdaptationSet>
<AdaptationSet [...]>
        <SupplementalProperty schemeIdUri="urn:mpeg:dash:srd:2014" value="1, 960, 540, 960, 540,
1920, 1080, 1, 1"/>
        <Representation id="mosaic-tile4-videoA" bandwidth="512000" dependencyId="mosaic-base">
            <BaseURL> tile4-videoA.mp4</BaseURL>
            <SegmentBase indexRange="7632" />
        </Representation>
        <Representation id="mosaic-tile4-videoB" bandwidth="512000" dependencyId="mosaic-base">
            <BaseURL> tile4-videoB.mp4</BaseURL>
            <SegmentBase indexRange="7632" />
        </Representation>
        <Representation id="mosaic-tile4-videoC" bandwidth="512000" dependencyId="mosaic-base">
            <BaseURL> tile4-videoC.mp4</BaseURL>
            <SegmentBase indexRange="7632" />
        </Representation>
        <Representation id="mosaic-tile4-videoD" bandwidth="512000" dependencyId="mosaic-base">
            <BaseURL> tile4-videoD.mp4</BaseURL>
            <SegmentBase indexRange="7632" />
        </Representation>
    </AdaptationSet>
</Period>
</MPD>
```

This example defines the same 'source_id' for all SRD descriptors, meaning that all the Representations have a spatial relationship with one another.

The second to last SRD parameter in the comma-separated list contained in the @value attribute of the SRD descriptor, i.e. the 'spatial_set_id', indicates that the Representations in each of the AdpatationSets belong to the same spatial set. In addition, the last SRD parameter in this same comma-separated list, i.e. the 'spatial_set_type, indicates that this spatial set constitutes a mosaic arrangement of tile videos. This way, the MPD author can express the specific nature of this mosaic content. That is that when a plurality of selected tile video streams of the mosaic content are rendered synchronously, preferably after being input as one bitstream to a decoder, preferably a HEVC decoder, visual boundaries between one or more tile video stream, appear in the rendered frames, since according to the invention tile video streams of at least two different contents are selected. As a result, the client application should follow the recommendation of building a complete of mosaic set, i.e. selecting a tile video stream for each of the (in the present example four) positions indicated in the manifest file (as denoted by the in the present example four different SRD descriptors.)

Additionally, according to an embodiment of the invention, the semantic of the 'spatial_set_type' may express that the 'spatial_set_id' value is valid for the entire manifest file and not only bound to other SRD descriptors with the same 'source_id' value. This enables the possibility to use SRD descriptors with different 'source_id' values for different visual content but supersedes the current semantic of the 'source_id'. In this case, Representations with SRD descriptors have a spatial relationship as long as they share the same "spatial_set_id" with their 'spatial_set_type' of value "mosaic", regardless of the 'source_id' value.

Figure 14:
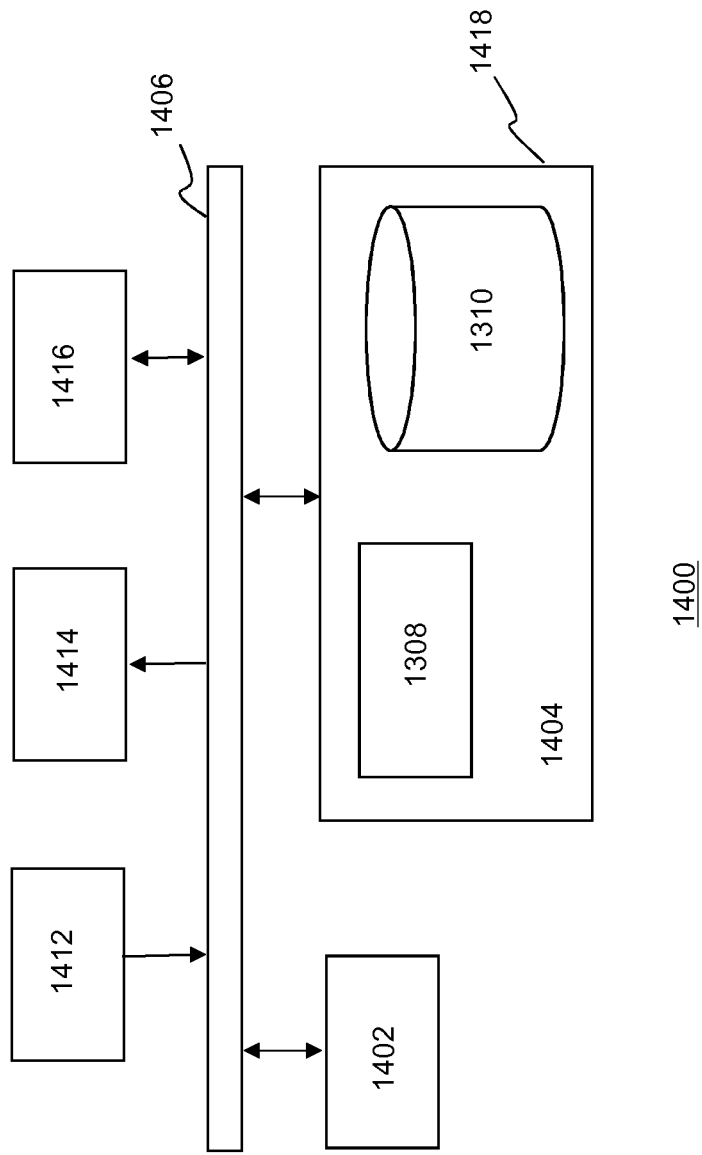
FIG. 14 is a block diagram illustrating an exemplary data processing system that may be used in as described in this disclosure.

FIG. 14 is a block diagram illustrating an exemplary data processing system that may be used in as described in this disclosure. Such data processing systems include data processing entities described in this disclosure, including servers, client computers, encoders and decoders, etc. Data processing system 1400 may include at least one processor 1402 coupled to memory elements 1404 through a system bus 1406. As such, the data processing system may store program code within memory elements 1404. Further, processor 1402 may execute the program code accessed from memory elements 1404 via system bus 1406. In one aspect, data processing system may be implemented as a computer that is suitable for storing and/or executing program code. It should be appreciated, however, that data processing system 1400 may be implemented in the form of any system including a processor and memory that is capable of performing the functions described within this specification.

Memory elements 1404 may include one or more physical memory devices such as, for example, local memory 1408 and one or more bulk storage devices 1410. Local memory may refer to random access memory or other non-persistent memory device(s) generally used during actual execution of the program code. A bulk storage device may be implemented as a hard drive or other persistent data storage device. The processing system 1400 may also include one or more cache memories (not shown) that provide temporary storage of at least some program code in order to reduce the number of times program code must be retrieved from bulk storage device 1410 during execution.

Input/output (I/O) devices depicted as input device 1412 and output device 1414 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1416 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1450.

As pictured in FIG. 14, memory elements 1404 may store an application 1418. It should be appreciated that data processing system 1400 may further execute an operating system (not shown) that can facilitate execution of the application. Application, being implemented in the form of executable program code, can be executed by data processing system 1400, e.g., by processor 1402. Responsive to executing application, data processing system may be configured to perform one or more operations to be described herein in further detail.

In one aspect, for example, data processing system 1400 may represent a client data processing system. In that case, application 1418 may represent a client application that, when executed, configures data processing system 1400 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1418, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method of forming one or more tile streams comprising:

an input of at least one encoder, receiving media data of at least one composite video stream, the media data of said composite video stream representing video frames comprising an image region having a plurality of subregions, each of said plurality of subregions comprising visual content of a video stream;

an input of said encoder receiving encoder information for configuring said encoder to generate encoded media data representing tiled video frames, a tile in said tiled video frames matching at least one of said one or more subregions;

encoding media data of said composite video stream on the basis of said encoder information, wherein media data associated with a subregion of a video frame are encoded into independently encoded media data that have no spatial decoding dependency on media data of other subregions in said video frame, said independently encoded media data forming a tile of a tiled video frame; and, storing encoded media data, provided by an output of said encoder as one or more tile streams on a storage medium of one or more network nodes, a tile stream comprising media data of at least one tile and tile position information for signaling a decoder to decode the media data of said tile stream into tiled video frames comprising a tile at a position as indicated by the tile position information;

the method further comprising providing at least one manifest file comprising one or more sets of tile stream identifiers or information for determining one or more sets of tile stream identifiers, a set of tile stream identifiers being associated with tile streams of a video content and with multiple tile positions; said manifest file being arranged for enabling a client computer to request at least one of said one or more network nodes transmission of media data of one or more tile streams to said client computer, wherein said manifest file further comprises one or more dependency parameters associated with one or more tile stream identifiers, a dependency parameter signaling said client computer that the decoding of media data of a tile stream associated with said dependency parameter is dependent on metadata of at least one base stream, wherein said one or more dependency parameters point to one or more representations defining said at least one base stream, said one or more representations defining said at least one base stream being identified by one or more representation IDs; or, wherein said one or more dependency parameters point to one or more adaptation sets, at least one of said one or more adaptation sets comprising a representation defining said at least one base stream, said one or more adaptation sets being identified by one or more adaptation set IDs, at least one of said one or more adaptation sets comprising a representation defining said at least one base stream.

2. Method according to claim 1, wherein media data of said one or more tile streams are stored as one or more tile tracks and at least one base track, said at least one base track comprising metadata for enabling said decoder to decode media data stored in said tile tracks.

3. Method according to claim 1 wherein said manifest file comprises one or more adaptation sets, an adaptation set defining a set of representations, each representation in said set of representations being associated with a tile stream identifier;
wherein each tile stream identifier in an adaptation set is associated with a spatial relationship description (SRD) descriptor, said spatial relationship descriptor signaling said client computer information on the tile position of a tile in video frames of a tile stream associated with said tile stream identifier; or,
wherein all tile stream identifiers in an adaptation set are associated with one spatial relationship description (SRD) descriptor, said spatial relationship descriptor signaling said client computer about the tile positions of the tiles in video frames of the tile streams identified in said adaptation set.

4. Method according to claim 1 wherein a tile stream identifier is (part of a) a uniform resource locator (URL), wherein information on the tile position of the at least one tile in the video frames of said tile stream is embedded in said tile stream identifier.

5. Method according to claim 1 wherein said manifest file further comprises a tile stream identifier template for enabling said client computer to generate tile stream identifiers in which information on the tile position of the at least one tile in the video frames of said tile stream is embedded.

6. Method according to claim 1 wherein said manifest file further comprises one or more dependency location parameters, a dependency location parameter signaling said client computer at least one location in said manifest file in which at least one base stream is defined.

7. Method according to claim 1 wherein said manifest file further comprises one or more group dependency parameters associated with one or more representations or with one or more adaptation sets comprising one or more representations, a group dependency parameter signaling said client computer about a group of representations defined in said manifest file, wherein said group of representations comprises at least one representation defining said at least one base stream.

8. Method according to claim 1 wherein said one or more tile streams are formatted on the basis of a data container of a media streaming protocol or media transport protocol, an (HTTP) adaptive streaming protocol or a transport protocol for packetized media data, such as the RTP protocol; and/or, wherein media data of said tile streams are encoded on the basis of a codec supporting an encoder module for encoding media data into tiled video frames; and/or, wherein media data associated with a tile in a tiled video frame are formatted as an addressable data structure defined at bitstream level.

9. Method according to claim 1 wherein said encoder information is embedded in said composite video stream; or, wherein said encoder information is provided in a separate communication channel to the encoder.

10. Method according to claim 1, wherein at least two of the plurality of subregions comprises the same visual content.

11. Method according to claim 1, wherein said subregions are arranged according to a grid of subregions.

12. Method according to claim 11, wherein said tile is being arranged in an image region of said tiled video frame on the basis of a tile grid, said tile grid matching the grid of subregions.

13. Method according to claim 1, wherein said base stream comprises sequence information for signaling the client computer the order in which media data of tile streams defined by said tile stream identifiers in said manifest file need to be combined into a bitstream for said decoder.

14. An encoder device comprising:
a computer readable storage medium having computer readable program code embodied therewith, and a processor coupled to the computer readable storage medium, wherein responsive to executing the computer readable program code, the processor is configured to perform executable operations comprising:
receiving media data of at least one composite video stream at an input of said encoder device, the media data of said composite video stream representing video frames comprising an image region having a plurality of subregion said subregions arranged according to a grid of subregions, each of said plurality of subregions comprising visual content of a video stream;
receiving encoder information at the input of said encoder device for configuring said encoder device to generate encoded media data representing tiled video frames, a tile in said tiled video frames matching at least one of said one or more subregions;
encoding media data of said composite video stream on the basis of said encoder information, wherein media data associated with a subregion of a video frame are encoded into independently encoded media data that have no spatial decoding dependency on media data of other subregions in said video frame, said independently encoded media data forming a tile of a tiled video frame, said tile being arranged in an image region of said tiled video frame on the basis of a tile grid, said tile grid matching said grid of subregions; and,
generating at least part of tile position information, wherein tile position information is arranged for signaling a decoder to decode the media data of a tile into tiled video frames comprising a tile at a position as indicated by the tile position information.

15. Encoder device according to claim 14, wherein all of the plurality of subregions contain similar visual content.

16. Encoder device according to claim 14, wherein the composite video stream is generated on the basis of said video stream.

17. Encoder device according to claim 14, wherein said generating comprises multiplicating visual content from said video stream, whereby said multiplicating causes said visual content to be comprised in said plurality of subregions.

18. Encoder device according to claim 14, wherein the image region of the tiled video frame is the same as the image region of a video frame of the composite video stream.

* * * * *